(12) United States Patent
Li et al.

(10) Patent No.: US 12,092,796 B2
(45) Date of Patent: Sep. 17, 2024

(54) OPTICAL IMAGING LENS ASSEMBLY

(71) Applicant: Zhejiang Sunny Optical Co., Ltd, Ningbo (CN)

(72) Inventors: Long Li, Ningbo (CN); Saifeng Lyu, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 838 days.

(21) Appl. No.: 17/010,583

(22) Filed: Sep. 2, 2020

(65) Prior Publication Data

US 2021/0048645 A1 Feb. 18, 2021

Related U.S. Application Data

(63) Continuation of application No. PCT/CN2019/099384, filed on Aug. 6, 2019.

(30) Foreign Application Priority Data

Oct. 30, 2018 (CN) .......................... 201811278061.9

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
CPC .. G02B 13/0045; G02B 13/002; G02B 13/02; G02B 9/64
See application file for complete search history.

(56) References Cited

U.S. PATENT DOCUMENTS 9,097,877 B2 * 8/2015 Tsai .................... G02B 13/0045
10,996,425 B2 * 5/2021 Cho ......................... G03B 3/10
(Continued)

FOREIGN PATENT DOCUMENTS

CN 107817576 3/2018
CN 107957619 A * 4/2018 ......... G02B 13/0045
(Continued)

OTHER PUBLICATIONS

Ji-yan Zhang et al., Design of 10 Mega-pixel Mobile Phone Lens, 2013 Third Internatoinal Conference on Instrumentation, Measurement, Computer, Communication and Control 569-573 (2013). (Year: 2013).*

(Continued)

*Primary Examiner* — Kara E Rakowski
*Assistant Examiner* — Wesley Scott Ashton
(74) *Attorney, Agent, or Firm* — HAUPTMAN HAM, LLP

(57) ABSTRACT

The present disclosure discloses an optical imaging lens assembly. The optical imaging lens assembly includes, sequentially from an object side to an image side along an optical axis, the first lens, the second lens, the third lens, the fourth lens, the fifth lens, and the seven lens having refractive power. The first lens has positive refractive power, an object-side surface thereof is a convex surface, and an image-side surface thereof is a convex surface; the second lens has negative refractive power, an object-side surface thereof is a convex surface; and an object-side surface of the fourth lens is a concave surface. A distance TTL along the optical axis from the object-side surface of the first lens to an imaging plane of the optical imaging lens assembly and a total effective focal length f of the optical imaging lens assembly satisfy TTL/f<1.

18 Claims, 28 Drawing Sheets

(56) References Cited

U.S. PATENT DOCUMENTS

| | | | |
|---|---|---|---|
| 11,112,586 B2* | 9/2021 | Xu | G02B 13/0045 |
| 11,747,594 B2* | 9/2023 | Lyu | H04N 23/55 |
| | | | 359/751 |
| 2012/0212836 A1* | 8/2012 | Hsieh | G02B 13/0045 |
| | | | 359/708 |
| 2014/0376105 A1* | 12/2014 | Sekine | G02B 3/02 |
| | | | 359/708 |
| 2015/0198787 A1* | 7/2015 | Kubota | G02B 9/64 |
| | | | 359/755 |
| 2016/0033742 A1* | 2/2016 | Huang | G02B 9/64 |
| | | | 359/708 |
| 2016/0124191 A1* | 5/2016 | Hashimoto | G02B 13/0045 |
| | | | 359/708 |
| 2016/0187622 A1* | 6/2016 | Huang | G02B 13/0045 |
| | | | 359/713 |
| 2017/0045714 A1* | 2/2017 | Huang | G02B 13/0045 |
| 2017/0227734 A1* | 8/2017 | Huang | G02B 13/0045 |
| 2018/0074298 A1* | 3/2018 | Jung | G02B 13/0045 |
| 2018/0188484 A1* | 7/2018 | Gong et al. | G02B 9/64 |
| 2018/0364457 A1* | 12/2018 | Yao | G02B 9/64 |
| 2020/0233188 A1* | 7/2020 | Lyu | H04N 23/55 |
| 2020/0257086 A1* | 8/2020 | Im | G02B 13/0045 |
| 2020/0355890 A1* | 11/2020 | Kong | G02B 13/0045 |
| 2020/0393654 A1* | 12/2020 | Shin et al. | G02B 9/64 |
| 2020/0393657 A1* | 12/2020 | Li | G02B 13/18 |
| 2021/0048645 A1* | 2/2021 | Li | G02B 13/0045 |

FOREIGN PATENT DOCUMENTS

| | | | | |
|---|---|---|---|---|
| CN | 108089317 A | * | 5/2018 | G02B 13/0045 |
| CN | 108227151 | | 6/2018 | |
| CN | 108279471 A | | 7/2018 | |
| CN | 207663138 U | | 7/2018 | |
| CN | 108427174 A | | 8/2018 | |
| CN | 207764467 U | * | 8/2018 | G02B 13/0045 |
| CN | 108490582 A | | 9/2018 | |
| CN | 108490587 | | 9/2018 | |
| CN | 108873252 A | * | 11/2018 | G02B 13/0045 |
| CN | 209044157 U | | 6/2019 | |
| JP | 2015072405 | | 4/2015 | |
| JP | 2015114505 | | 6/2015 | |
| WO | WO-2018209855 A1 | * | 11/2018 | G02B 13/0045 |

OTHER PUBLICATIONS

Simon Thibault et al., Consumer Electronic Optics: How Small a Lens can be? The Case of Panomorph Lenses, 9192 Proceedings of SPIE 91920H-1 to 91920H-7 (2014). (Year: 2014).*

Alyson M. De C. Souza et al., Investigating the Distance Compression on Virtual Environments by Comparing Visualization Devices , 2015, pp. 33-41 [online], [retrieved Aug. 28, 2023], retrieved from the Internet <URL: https://ieeexplore.ieee.org/stamp/stamp.jsp?tp=&arnumber=7300725>. (Year: 2015).*

Focal Lengths, Apertures and F/Numbers, 2016, pp. 1-2 [online], [retrieved May 3, 2023], retrieved from the Internet <URL: https://spacemath.gsfc.nasa.gov/weeky/10Page30.pdf>. (Year: 2016).*

Machine English translation of CN 209044157 U obtained from Patent Translate, along with a copy of CN 209044157 U. (Year: 2024).*

International Search Report in Corresponding International Application No. PCT/CN2019/099384, dated Oct. 30, 2019; 6 pgs.

* cited by examiner

OPTICAL IMAGING LENS ASSEMBLY

CROSS-REFERENCE TO RELATED APPLICATIONS

The present patent application is a continuation of International Application No. PCT/CN2019/099384, filed on Aug. 6, 2019, which claims the priority from and the benefit of Chinese Patent Application No. 201811278061.9, filed before the National Intellectual Property Administration (CNIPA) on Oct. 30, 2018. Both of the aforementioned patent applications are hereby incorporated by reference in their entireties.

TECHNICAL FIELD

The present disclosure relates to an optical imaging lens assembly, and specifically to an optical imaging lens assembly including seven lenses.

BACKGROUND

Telephoto lens assembly is mainly used for photographing distant scenes, and has a better processing effect on the details of distant scenes. However, compared to standard lens assembly, the image photographed by the telephoto lens assembly is larger when scenes at the same distance are photographed, that is, a so-called "distance compression" effect is produced. This effect is usually measured by the ration of the total optical length TTL of a lens assembly with respect to the total effective focal length f of the lens assembly (i.e., the value of TTL/f).

In recent years, the portable electronic products, such as smart phones, have developed rapidly, and the demands for the imaging effect thereof have gradually increased. Many mobile phone cameras use the dual camera lens assembly which is equipped with a telephoto lens assembly as a sub camera, so that the mobile phone can have a more professional photographing effect. However, since the conventional telephoto lens assembly usually has a larger size and a small aperture, it is impossible to achieve a good photographing effect. Therefore, how to reduce the ratio of the total optical length TTL with respect to the total optical length f as much as possible and maintain a smaller F-number while improving the imaging quality is a problem to be solved urgently for the telephoto lens assembly installed in mobile phones.

SUMMARY

The present disclosure provides an optical imaging lens assembly such as a telephoto lens assembly, which is applicable to portable electronic products, can at least solve or partially solve at least one of the above technical problems in the prior art.

In one aspect, the present disclosure provides an optical imaging lens assembly which includes sequentially from an object side to an image side along an optical axis, a first lens, a second lens, a third lens, a fourth lens, a fifth lens, a sixth lens and a seventh lens, each of which has refractive power. The first lens may have positive refractive power, an object-side surface thereof may be a convex surface, and an image-side surface thereof may be a convex surface; the second lens has negative refractive power, and an object-side surface thereof may be a convex surface; and an image-side surface of the fourth lens may be a concave surface.

In one implementation, a distance TTL along the optical axis from the object-side surface of the first lens to an imaging plane of the optical imaging lens assembly and a total effective focal length f of the optical imaging lens assembly may satisfy TTL/f<1.

In one implementation, the total effective focal length f of the optical imaging lens assembly and an entrance pupil diameter EPD of the optical imaging lens assembly may satisfy f/EPD<2.2.

In one implementation, a center thickness CT5 along the optical axis of the fifth lens, a center thickness CT6 along the optical axis of the sixth lens, a spaced interval T45 along the optical axis between the fourth lens and the fifth lens, and a spaced interval T56 along the optical axis between the fifth lens and the sixth lens may satisfy 1.3<(T56+CT6)/(T45+CT5)<2.

In one implementation, a maximum effective radius DT51 of an object-side surface of the fifth lens and a maximum effective radius DT71 of an object-side surface of the seventh lens may satisfy 1.7<DT71/DT51<2.2.

In one implementation, a distance SAG41 along the optical axis from an intersection of an object-side surface of the fourth lens and the optical axis to a vertex of an effective radius of the object-side surface of the fourth lens, and a center thickness CT4 along the optical axis of the fourth lens may satisfy 0.8<SAG41/CT4<1.3.

In one implementation, a radius of curvature R8 of the image-side surface of the fourth lens and a radius of curvature R11 of an object-side surface of the sixth lens may satisfy $-1.8 \leq R8/R11 \leq -0.9$.

In one implementation, the total effective focal length f of the optical imaging lens assembly, a radius of curvature R1 of the object-side surface of the first lens, and a radius of curvature R4 of the image-side surface of the second lens may satisfy 0.1<f/(R1+R4)<1.5.

In one implementation, a radius of curvature R2 of the image-side surface of the first lens, and a radius of curvature R3 of the object-side surface of the second lens may satisfy $|(R2+R3)/(R2-R3)| \leq 0.7$.

In one implementation, a distance SAG11 along the optical axis from an intersection of the object-side surface of the first lens and the optical axis to a vertex of an effective radius of the object-side surface of the first lens, and a distance SAG72 along the optical axis from an intersection of an image-side surface of the seventh lens and the optical axis to a vertex of an effective radius of the image-side surface of the seventh lens may satisfy $-1.6<SAG11/SAG72<-0.9$.

In one implementation, the total effective focal length f of the optical imaging lens assembly, an effective focal length f1 of the first lens and an effective focal length f2 of the second lens may satisfy 0.5<f1/f+|f/f2|<1.5.

In one implementation, a combined focal length f1234 of the first lens, the second lens, the third lens and the fourth lens, and a combined focal length f67 of the sixth lens and the seventh lens may satisfy 0.7<f1234/|f67|<1.7.

In one implementation, a center thickness CT2 along the optical axis of the second lens and a spaced interval T23 along the optical axis between the second lens and the third lens may satisfy 1.1<CT2/T23<2.8.

In one implementation, a center thickness CT1 along the optical axis of the first lens, a center thickness CT2 along the optical axis of the second lens, a center thickness CT3 along the optical axis of the third lens, and a center thickness CT7 along the optical axis of the seventh lens may satisfy 1.2<(CT1+CT2)/(CT3+CT7)<1.8.

The present disclosure employs seven lenses, and the optical imaging lens assembly described above has at least one advantageous effect such as long-focus length, miniaturization, large-aperture, high image quality, and the like by properly configuring the refractive power, the surface shape, the center thickness of each lens and the spaced interval along the optical axis between the lenses.

BRIEF DESCRIPTION OF THE DRAWINGS

Other features, purpose and advantages of the present disclosure will become apparent through detailed description of the non-limiting implementations given in conjunction with the accompanying drawings. In the drawings.

DETAILED DESCRIPTION OF EMBODIMENTS

Figure 1:
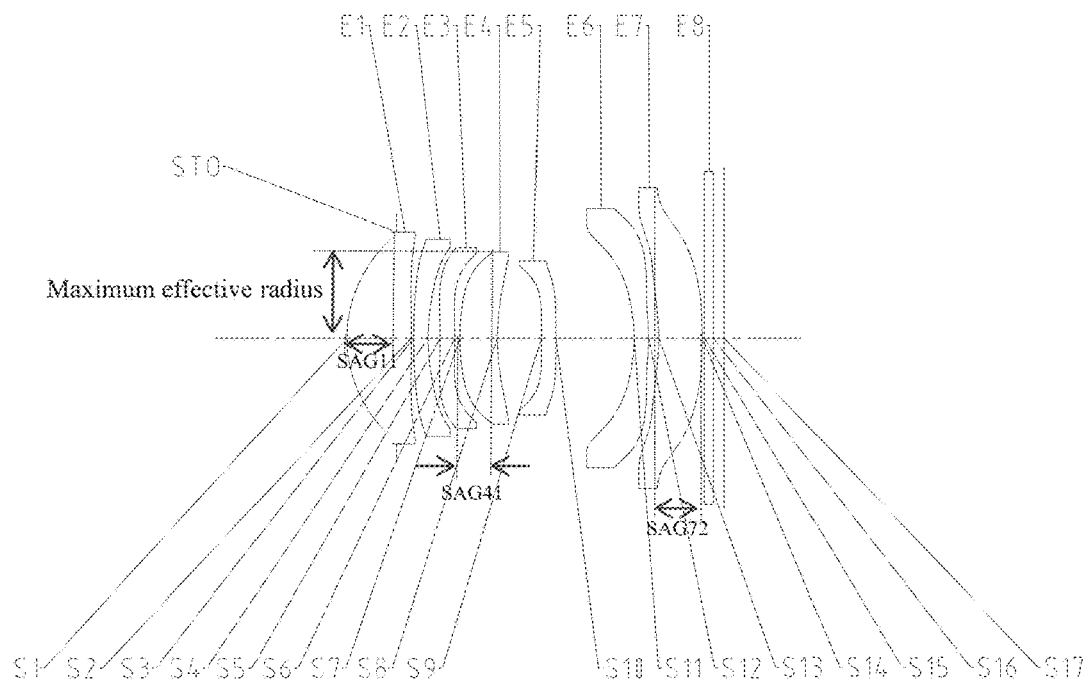
FIG. 1 is a schematic structural view of an optical imaging lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region. If a surface of a lens is a concave surface and the position of the concave is not defined, it indicates that the surface of the lens is concave at least in the paraxial region. The surface of each lens closest to the object side is referred to as an object-side surface, and the surface of each lens closest to the image side is referred to as an image-side surface.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An optical imaging lens assembly according to exemplary implementations of the present disclosure may include, for example, seven lenses (i.e., a first lens, a second lens, a third lens, a fourth lens, a fifth lens, sixth lens and seventh lens) having refractive power. The seven lenses are sequentially arranged from an object side to an image side along an optical axis, and there may be an air gap between adjacent lenses.

In an exemplary implementation, the first lens may have positive refractive power, and an object-side surface thereof may be a convex surface, and an image-side surface thereof may also be a convex surface. The second lens may have negative refractive power, and an object-side surface thereof may be a convex surface. The third lens has positive or negative refractive power. The fourth lens has positive or negative refractive power, and an image-side surface thereof may be a concave surface. The fifth lens has positive or negative refractive power. The sixth lens has positive or negative refractive power. The seventh lens has positive or negative refractive power. The first lens is configured to have positive refractive power and both the object-side surface and the image-side surface thereof are convex surfaces, such that the first lens can converge the light. When the first lens is used with the second lens to the seventh lens, the focal length can be maximized while maintaining good light convergence, and at the same time, the size of the lens assembly is advantageously reduced, so that the ratio of the total optical length TTL with respect to the total effective focal length f becomes smaller. The object-side surface of the second lens is configured to be a convex surface, such that light can be further converged when passing through the object-side surface of the second lens, and the value of TTL/f is also advantageously minimized while the system has better imaging quality.

In an exemplary implementation, the optical imaging lens assembly of the present disclosure may satisfy $TTL/f<1$, where TTL is a distance along the optical axis from the object-side surface of the first lens to an imaging plane of the optical imaging lens assembly, and f is a total effective focal length of the optical imaging lens assembly. More specifically, TTL and f may further satisfy $0.5<TTL/f<1$, e.g., $0.87 \leq TTL/f \leq 0.96$. Satisfying $TTL/f<1$ is beneficial for the system to capture images at a long distance, and is beneficial to ensuring the captured images have good imaging details, which enabling the lens assembly to have long-focus characteristics.

In an exemplary implementation, the optical imaging lens assembly of the present disclosure may satisfy formula $f/EPD<2.2$, where f is the total effective focal length of the optical imaging lens assembly, and EPD is an entrance pupil diameter of the optical imaging lens assembly. More specifically, f and EPD may further satisfy $1.5<f/EPD<2.2$, e.g., $1.75 \leq f/EPD \leq 2.15$. Satisfying $f/EPD<2$ can effectively increase the amount of light entering the lens assembly per unit time, so that the lens assembly has higher relative illumination, and can effectively improve the imaging quality of the lens assembly in a dark environment, so that the lens assembly is more practical.

In an exemplary implementation, the optical imaging lens assembly of the present disclosure may satisfy $1.3<(T56+CT6)/(T45+CT5)<2$, where CT5 is a center thickness along the optical axis of the fifth lens, CT6 is a center thickness along the optical axis of the sixth lens, T45 is a spaced interval along the optical axis between the fourth lens and the fifth lens, and T56 is a spaced interval along the optical axis between the fifth lens and the sixth lens. More specifically, T56, CT6, T45 and CT5 may further satisfy $1.36 \leq (T56+CT6)/(T45+CT5) \leq 1.93$. Controlling the values of CT5, CT6, T45 and T56 to be within an appropriate range can achieve the following beneficial effects: first, the lens assembly is enabled to better compensate the chromatic aberration of the system, so that the amount of distortion generated by the lens assembly is controlled effectively; second, the difficulties in processing due to the fifth lens being too thin are avoided; third, the size of the system can be reduced, and the effective focal length thereof can be increased so that the value of TTL/f of the system becomes smaller; and fourth, the probability of ghost image generated by the fifth lens and the sixth lens can be reduced.

In an exemplary implementation, the optical imaging lens assembly of the present disclosure may satisfy $1.7<DT71/DT51<2.2$, wherein DT51 is a maximum effective radius of an object-side surface of the fifth lens, and DT71 is a maximum effective radius of an object-side surface of the seventh lens. More specifically, DT71 and DT51 may further satisfy $1.84 \leq DT71/DT51 \leq 2.01$. Satisfying $1.7<DT71/DT51<2.2$ may achieve the following beneficial effects: first, the height of the imaging plane and the effective focal length of the system are advantageously increased; second, the system is enabled to better compensate the aberration at the edge of field-of-view; and third, the processability of the fifth lens and the seventh lens is advantageously improved, so that the lens assembly is more practical.

In an exemplary implementation, the optical imaging lens assembly of the present disclosure may satisfy $0.8<SAG41/CT4<1.3$, where SAG41 is a distance along the optical axis from an intersection of an object-side surface of the fourth lens and the optical axis to a vertex of an effective radius of the object-side surface of the fourth lens, and CT4 is a center thickness along the optical axis of the fourth lens. More specifically, SAG41 and CT4 may further satisfy $0.91 \leq SAG41/CT4 \leq 1.12$. Satisfying $0.8<SAG41/CT4<1.3$ may achieve the following beneficial effects: first, lights can be converged when passing through the object-side surface of the fourth lens, which is beneficial to reducing the ratio of TTL/f while maintaining the imaging quality of the system; second, a smaller F-number for the system is advantageously obtained; and third, the technological problem, such as the difficulty in processability due to the value of SAG41 is too large, may be avoided by controlling SAG41/CT4<1.3.

In an exemplary implementation, the optical imaging lens assembly of the present disclosure may satisfy $0.7<f1234/|f67|<1.7$, where f1234 is a combined focal length of the first lens, the second lens, the third lens and the fourth lens, and f67 is a combined focal length of the sixth lens and the seventh lens. More specifically, f1234 and f67 may further satisfy $0.91 \leq f1234/|f67| \leq 1.49$. Satisfying $0.7<f1234/|f67|<1.7$ may avoid excessive concentration of the refractive power and may better improve the system's ability to correct aberrations by properly adjusting the combined focal length of the first lens to the fourth lens. At the same time, the size of the imaging lens assembly may be effectively reduced, and the telephoto characteristics of the lens assembly may be highlighted.

In an exemplary implementation, the optical imaging lens assembly of the present disclosure may satisfy $0.1<f/(R1+R4)<1.5$, where f is the total effective focal length of the optical imaging lens assembly, R1 is a radius of curvature of the object-side surface of the first lens, and R4 is a radius of curvature of the image-side surface of the second lens. More specifically, f, R1 and R4 may further satisfy $0.18 \leq f/(R1+R4) \leq 1.48$. By properly controlling the radius of curvature of object-side surface of the first lens, the radius of curvature of the image-side surface of the second lens and the total effective focal length of the system, the size of the system can be reduced effectively, and the refractive power of the system can be appropriately distributed so as to avoid the refractive power being excessively concentrated on the first lens and the second lens. In addition, by doing so, the aberrations at the third lens to the seventh lens are advantageously corrected. Moreover, good processability of the first lens and the second lens can be maintained. Alternatively, the image-side surface of the second lens may be a concave surface.

In an exemplary implementation, the optical imaging lens assembly of the present disclosure may satisfy $0.5<f1/f+|f/f2|<1.5$, where f is the total effective focal length of the optical imaging lens assembly, f1 is an effective focal length of the first lens and f2 is an effective focal length of the second lens. More specifically, f1, f2 and f may further satisfy $0.62 \leq f1/f+|f/f2| \leq 1.49$. Properly controlling the effective focal lengths of the first lens and the second lens as well as the total effective focal length of the system may achieve the following beneficial effects: first, the size of the system can be reduced effectively; second, the refractive powers of the system can be avoid being excessively concentrated on the first lens and the second lens; and third, the contribution of the first lens and the second lens to the spherical aberrations can be controlled to be within an appropriate range, so that the system may have better image quality.

In an exemplary implementation, the optical imaging lens assembly of the present disclosure may satisfy $1.1<CT2/T23<2.8$, where CT2 is a center thickness along the optical axis of the second lens, T23 is a spaced interval along the optical axis between the second lens and the third lens. More specifically, CT2 and T23 may further satisfy $1.17 \leq CT2/T23 \leq 2.70$. Controlling the ratio of CT2 with respect to T23 is beneficial to minimizing of the system, reducing the probability of ghost image generated by the image-side surface of the second lens, and effectively reducing aberrations of the system when used together with the third lens and fourth lens. At the same time, the difficulty of processability due to the second lens being too thin may be avoided.

In an exemplary implementation, the optical imaging lens assembly of the present disclosure may satisfy $1.2<(CT1+CT2)/(CT3+CT7)<1.8$, where CT1 is a center thickness along the optical axis of the first lens, CT2 is a center thickness along the optical axis of the second lens, CT3 is a center thickness along the optical axis of the third lens, and CT7 is a center thickness along the optical axis of the seventh lens. More specifically, CT1, CT2, CT3 and CT7 may further satisfy $1.28 \leq (CT1+CT2)/(CT3+CT7)<1.79$. Satisfying the $1.2<(CT1+CT2)/(CT3+CT7)<1.8$ may achieve the following beneficial effects: first, the size of the system is advantageously reduced so that the system has a smaller value of TTL/f; second, the spherical aberration of the system is also advantageously reduced; and third, the amount of distortion of the system and probability of ghost image generated due the internal reflection of light can be reduced.

In an exemplary implementation, the optical imaging lens assembly of the present disclosure may satisfy $-1.8<R8/R11 \leq -0.9$, where R8 is a radius of curvature of the image-side surface of the fourth lens, and R11 is a radius of curvature of an object-side surface of the sixth lens. More specifically, R8 and R11 may further satisfy $-1.80 \leq R8/R11 \leq -0.90$. Properly controlling the radius of curvature of the image-side surface of the fourth lens and the radius of curvature of an object-side surface of the sixth lens may achieve the following beneficial effects: first, the system's ability to correct aberrations at the edge of field-of-view is advantageously improved; second, the height of the imaging plane is advantageously increased so that the imaging range of the system is enlarged; and third, the processability of the fourth lens and the sixth lens is advantageously improved. Alternatively, the object-side surface of the sixth lens may be a concave surface.

In an exemplary implementation, the optical imaging lens assembly of the present disclosure may satisfy $|(R2+R3)/(R2-R3)| \leq 0.7$, where R2 is a radius of curvature of the image-side surface of the first lens, and R3 is a radius of curvature of the object-side surface of the second lens. More specifically, R2 and R3 may further satisfy $0.04 \leq |(R2+R3)/(R2-R3)| \leq 0.70$. Satisfying the $|(R2+R3)/(R2-R3)| \leq 0.7$ is beneficial to reducing the refractive power of the first lens and improving light convergence at the first lens, so that not only the imaging quality of the system but also the system's relative illumination can be advantageously improved. At the same time, good processability of the first lens can be ensured, and thereby improving the practicability of the imaging lens assembly.

In an exemplary implementation, the optical imaging lens assembly of the present disclosure may satisfy $-1.6<SAG11/SAG72<-0.9$, where SAG11 is a distance along the optical axis from an intersection of the object-side surface of the first lens and the optical axis to a vertex of an effective radius of the object-side surface of the first lens, and SAG72 is a distance along the optical axis from an intersection of an image-side surface of the seventh lens and the optical axis to a vertex of an effective radius of the image-side surface of the seventh lens. More specifically, SAG11 and SAG72 may further satisfy $-1.53 \leq SAG11/SAG72 \leq -0.94$. Satisfying the $-1.6<SAG11/SAG72<-0.9$ may achieve the following beneficial effects: first, the total effective focal length of the system is advantageously increased while the imaging quality of the imaging system is maintained, so that the telephoto characteristics of the system is highlighted; second, the spherical aberrations at the middle of the field-of-view and the coma at the edge of the field-of-view are advantageously reduced, so that the system has a better ability to correct the aberrations; and third, the system's relative illumination is advantageously increased, and the imaging quality of the lens assembly is improved even in a relative dark environment.

In an exemplary implementation, the optical system described above may further include a stop to improve the imaging quality of the lens assembly. Alternatively, the stop may disposed between the objet side and the first lens.

Alternatively, the optical imaging lens assembly described above may further include an optical filter to correct chromatic aberration and/or a protective glass for protecting a photosensitive element on the imaging plane.

The optical imaging lens assembly according to the above implementations of the present disclosure may employ a plurality of lenses, such as seven lenses as described above. By properly configuring the refractive power, the surface shape, the center thickness of each lens, and spaced distances along the optical axis between the lenses, the size and the sensitivity of the optical imaging lens assembly can be effectively reduced, and the processability of the optical imaging lens assembly can be improved, such that the optical imaging lens assembly is more advantageous for production processing and can be applied to portable electronic products. The optical imaging lens assembly configured as described above may further have advantageous effects such as long focal length, miniaturization, large aperture, and high imaging quality.

In the implementations of the present disclosure, at least one of the surfaces of each lens is aspheric, i.e., at least one of the object-side surface and the image-side surface of each of the first lens, the second lens, the third lens, the fourth lens, the fifth lens, the sixth lens and the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better radius of curvature characteristic, and has the advantages of improving distortion aberration and improving astigmatic aberration. By using an aspheric lens, the aberrations that occur during imaging can be eliminated as much as possible, and thus improving imaging quality. Alternatively, both the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging lens assembly can be varied to achieve the various results and advantages described in this specification without departing from the technical solution claimed by the present disclosure. For example, although the implementation are described by taking seven lenses as an example, the optical imaging lens assembly is not limited to including seven lenses. The optical imaging lens assembly can also include other numbers of lenses if desired.

Specific embodiments applicable to the optical imaging lens assembly of the above implementations will be further described below with reference to the accompanying drawings.

Embodiment 1

An optical imaging lens assembly according to embodiment 1 of the present disclosure is described below with reference to FIG. 1 to FIG. 2D. FIG. 1 is a schematic structural view of an optical imaging lens assembly according to embodiment 1 of the present disclosure.

As shown in FIG. 1, the optical imaging lens assembly according to an exemplary implementation of the present disclosure includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a concave surface, and an image-side surface S10 thereof is a concave surface. The sixth lens E6 has negative refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a convex surface. The optical filter E8 has an object-side surface S15 and an image-side surface S16. Light from an object sequentially passes through the respective surfaces S1 to S16 and is finally imaged on the imaging plane S17.

Table 1 shows surface type, radius of curvature, thickness, material and conic coefficient of each lens of the optical imaging lens assembly in embodiment 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.6861 | | | |
| S1 | aspheric | 1.7680 | 0.8901 | 1.55 | 56.1 | −0.0296 |
| S2 | aspheric | −14.8529 | 0.0300 | | | −99.0000 |
| S3 | aspheric | 5.6268 | 0.2000 | 1.67 | 20.4 | 7.9321 |
| S4 | aspheric | 2.5165 | 0.1710 | | | 0.2399 |
| S5 | aspheric | −5.9226 | 0.2000 | 1.67 | 20.4 | −92.3299 |
| S6 | aspheric | −6.9963 | 0.0707 | | | −99.0000 |
| S7 | aspheric | 3.3522 | 0.5151 | 1.55 | 56.1 | 5.7380 |
| S8 | aspheric | 2.9851 | 0.6034 | | | −2.9512 |
| S9 | aspheric | −500.0000 | 0.2000 | 1.61 | 28.3 | 99.0000 |
| S10 | aspheric | 500.0000 | 1.0800 | | | −99.0000 |
| S11 | aspheric | −1.9793 | 0.2000 | 1.55 | 56.1 | 0.1675 |
| S12 | aspheric | −2.3351 | 0.1412 | | | −59.4912 |
| S13 | aspheric | −2.1943 | 0.5985 | 1.67 | 20.4 | −52.5367 |
| S14 | aspheric | −11.9689 | 0.0303 | | | −15.2952 |

TABLE 1-continued

| Surface number | Surface type | Radius of curvature | Thickness | Material Refractive index | Abbe number | Conic coefficient |
|---|---|---|---|---|---|---|
| S15 | spherical | infinite | 0.1200 | 1.52 | 64.2 | |
| S16 | spherical | infinite | 0.1497 | | | |
| S17 | spherical | infinite | | | | |

As can been seen in Table 1, the object-side surface and the image-side surface of any one of the first lens E1 to the seventh lens E7 are aspheric, and the surface shape x of each aspheric lens can be defined by using, but not limited to, the following aspheric formula:

$$x = \frac{ch^2}{1 + \sqrt{1 - (k+1)c^2h^2}} + \sum A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature R in the above Table 1); k is the conic coefficient (given in Table 1); Ai is a correction coefficient for the i-th order of the aspheric surface. Table 2 below shows high-order coefficients $A_4, A_6, A_8, A_{10}, A_{12}, A_{14}, A_{16}, A_{18}$ and $A_{20}$ applicable to each aspheric surface S1-S14 in embodiment 1.

TABLE 2

| Surface number | A4 | A6 | A8 | A10 | A12 | A14 | A16 | A18 | A20 |
|---|---|---|---|---|---|---|---|---|---|
| S1 | −1.1000E−03 | −1.1980E−02 | 2.5248E−02 | −4.1140E−02 | 4.4546E−02 | −3.5270E−02 | 1.8573E−02 | −5.5800E−03 | 7.0700E−04 |
| S2 | −3.9700E−03 | 2.0556E−01 | −3.5230E−01 | 2.1754E−01 | 5.5226E−02 | −1.5030E−01 | 8.1630E−02 | −1.8860E−02 | 1.5900E−03 |
| S3 | −1.3506E−01 | 2.4846E−01 | 6.7086E−02 | −1.0046E+00 | 1.7665E+00 | −1.5208E+00 | 7.1572E−01 | −1.7614E−01 | 1.7749E−02 |
| S4 | −1.4668E−01 | 1.3515E−01 | 7.0332E−02 | 2.4212E−01 | −1.5225E+00 | 2.3299E+00 | −1.6233E+00 | 5.4224E−01 | −7.0540E−02 |
| S5 | 1.4860E−01 | −1.8617E−01 | 4.4991E−01 | 2.8295E−01 | −2.6089E+00 | 4.0491E+00 | −2.8652E+00 | 9.8303E−01 | −1.3306E−01 |
| S6 | 1.9438E−01 | −1.3486E−01 | 3.7764E−01 | 4.2625E−01 | −3.1009E+00 | 5.2551E+00 | −4.2424E+00 | 1.6962E+00 | −2.7174E−01 |
| S7 | −3.8000E−04 | −4.5560E−02 | 6.1863E−01 | −1.3908E+00 | 1.6537E+00 | −1.0667E+00 | 3.0740E−01 | 1.6650E−03 | −1.3310E−02 |
| S8 | −6.0530E−02 | 6.6609E−02 | −6.8270E−02 | 3.1964E−01 | −1.0512E+00 | 1.8011E+00 | −1.7133E+00 | 8.5466E−01 | −1.7413E−01 |
| S9 | −1.9429E−01 | −7.4310E−02 | −4.0807E−01 | 2.0844E+00 | −6.4562E+00 | 1.2338E+01 | −1.4328E+01 | 9.1508E+00 | −2.4071E+00 |
| S10 | −1.1971E−01 | −2.2860E−02 | −3.1676E−01 | 1.2761E+00 | −2.6125E+00 | 3.3239E+00 | −2.5759E+00 | 1.1375E+00 | −2.1593E−01 |
| S11 | 2.4430E−01 | −5.4081E−01 | 8.9995E−01 | −1.4388E+00 | 1.6704E+00 | −1.1980E+00 | 4.9790E−01 | −1.0959E−01 | 9.8740E−03 |
| S12 | 1.6434E−01 | −1.9157E−01 | 2.1968E−01 | −3.0702E−01 | 2.7467E−01 | −1.4409E−01 | 4.3894E−02 | −7.2400E−03 | 5.0100E−04 |
| S13 | −5.4310E−02 | 1.2102E−01 | −9.1500E−03 | −1.2151E−01 | 1.0521E−01 | −4.0590E−02 | 8.3470E−03 | −8.9000E−04 | 3.9300E−05 |
| S14 | −1.9131E−01 | 2.9798E−01 | −3.7770E−01 | 3.2676E−01 | −1.8310E−01 | 6.3656E−02 | −1.3110E−02 | 1.4630E−03 | −6.8000E−05 |

Table 3 shows effective focal lengths f1 to f7 of the lenses, a total effective focal length f, a total optical length TTL (a distance along the optical axis from the object-side surface S1 of the first lens E1 to the imaging plane S7), half of a diagonal length ImgH of an effective pixel area on the imaging plane S17 and half of a maximal field-of-view angle HFOV of the optical imaging lens assembly in embodiment 1.

TABLE 3

| | |
|---|---|
| f1 (mm) | 2.95 |
| f2 (mm) | −7.01 |
| f3 (mm) | −62.57 |
| f4 (mm) | −99.01 |
| f5 (mm) | −411.84 |

TABLE 3-continued

| | |
|---|---|
| f6 (mm) | −29.69 |
| f7 (mm) | −4.13 |
| f (mm) | 5.53 |
| TTL (mm) | 5.20 |
| ImgH (mm) | 2.35 |
| HFOV (°) | 22.8 |

Figure 2A:
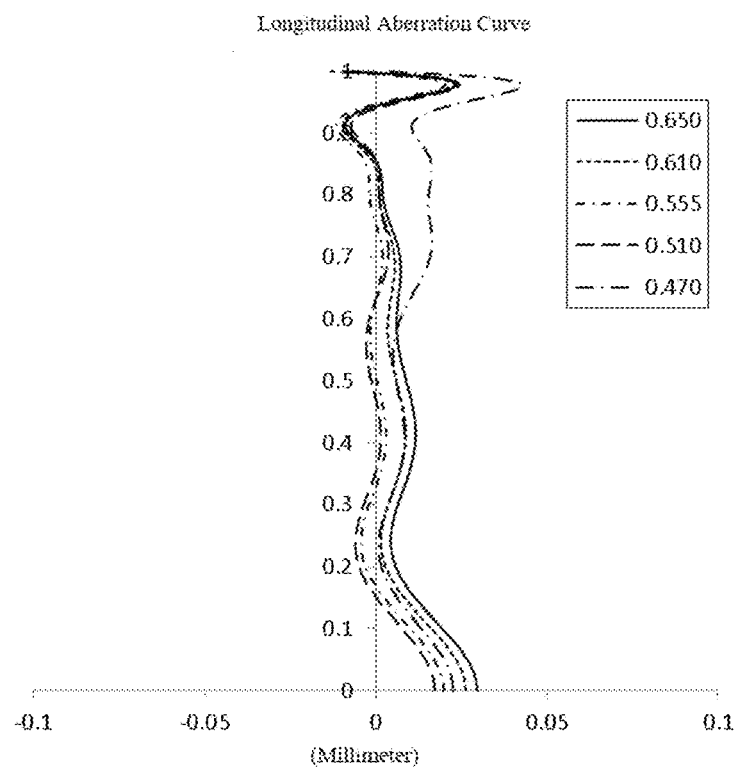
FIGS. 2A-2D illustrate a longitudinal aberration curve, an astigmatic curve, a distortion curve and a lateral color curve of the optical imaging lens assembly according to embodiment 1, respectively.
Figure 2B:
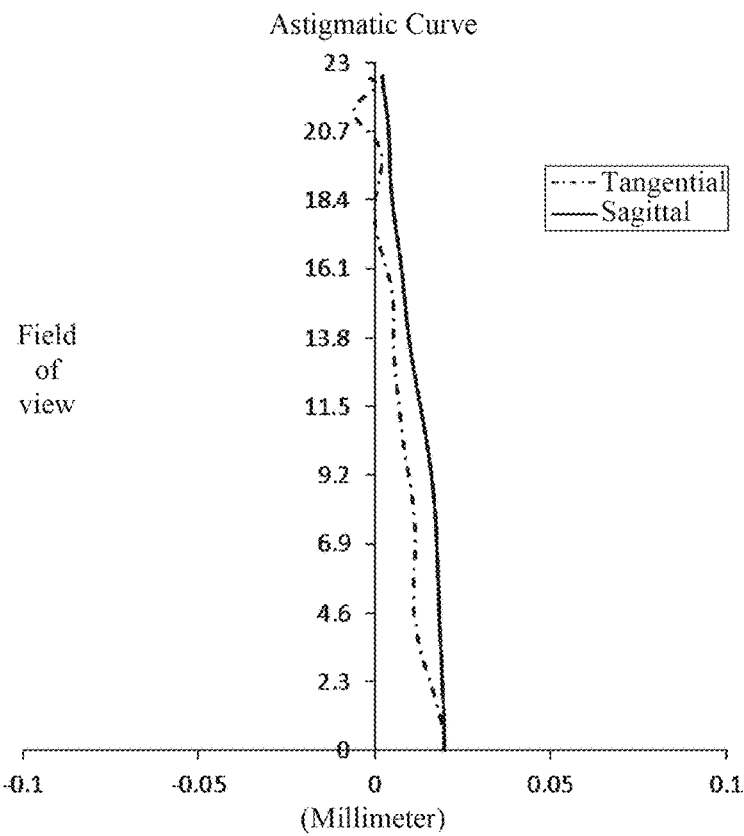
Figure 2C:
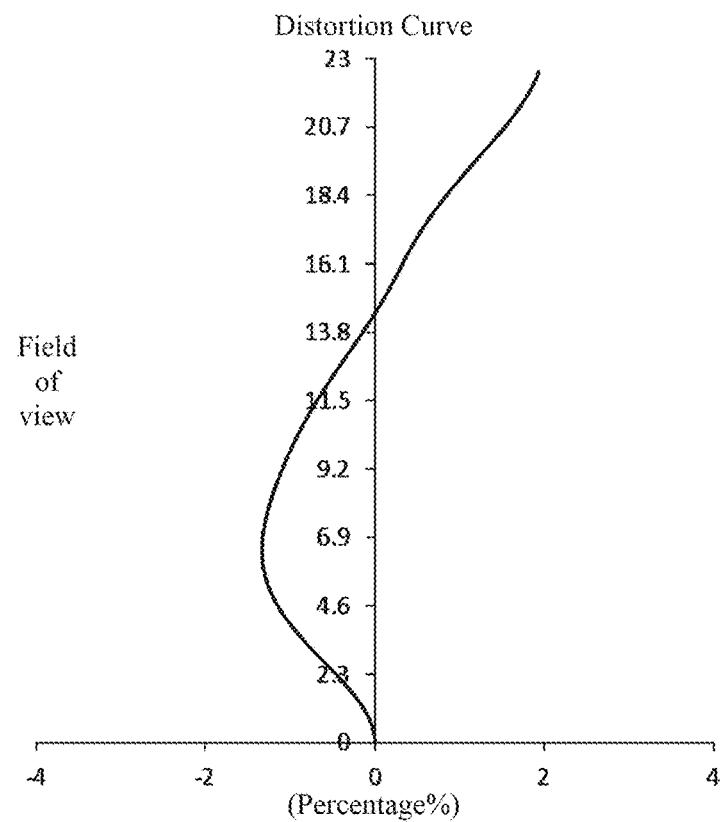
Figure 2D:
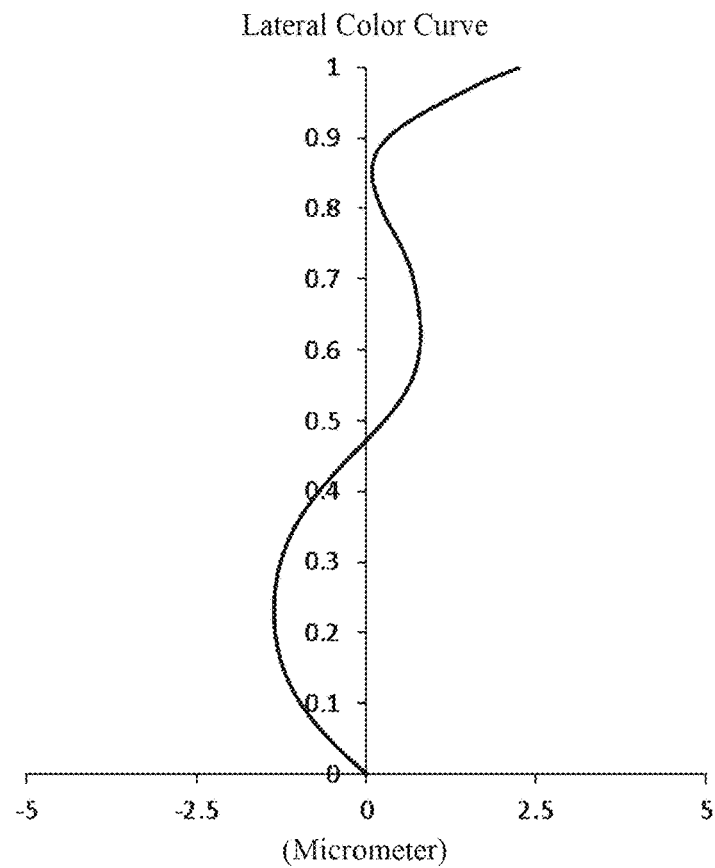

FIG. 2A illustrates a longitudinal aberration curve of the optical imaging lens assembly according to embodiment 1, representing deviations of focal points converged by light of different wavelengths after passing through the optical imaging lens assembly. FIG. 2B illustrates an astigmatic curve of the optical imaging lens assembly according to embodiment 1, representing a curvature of a tangential plane and a curvature of a sagittal plane. FIG. 2C illustrates a distortion curve of the optical imaging lens assembly according to embodiment 1, representing amounts of distortion corresponding to different field-of-view angle. FIG. 2D illustrates a lateral color curve of the optical imaging lens assembly according to embodiment 1, representing deviations of different image heights on an imaging plane after light passes through the optical imaging lens assembly. It can be seen from FIG. 2A to FIG. 2D that the optical imaging lens assembly provided in embodiment 1 can achieve good image quality.

Embodiment 2

Figure 3:
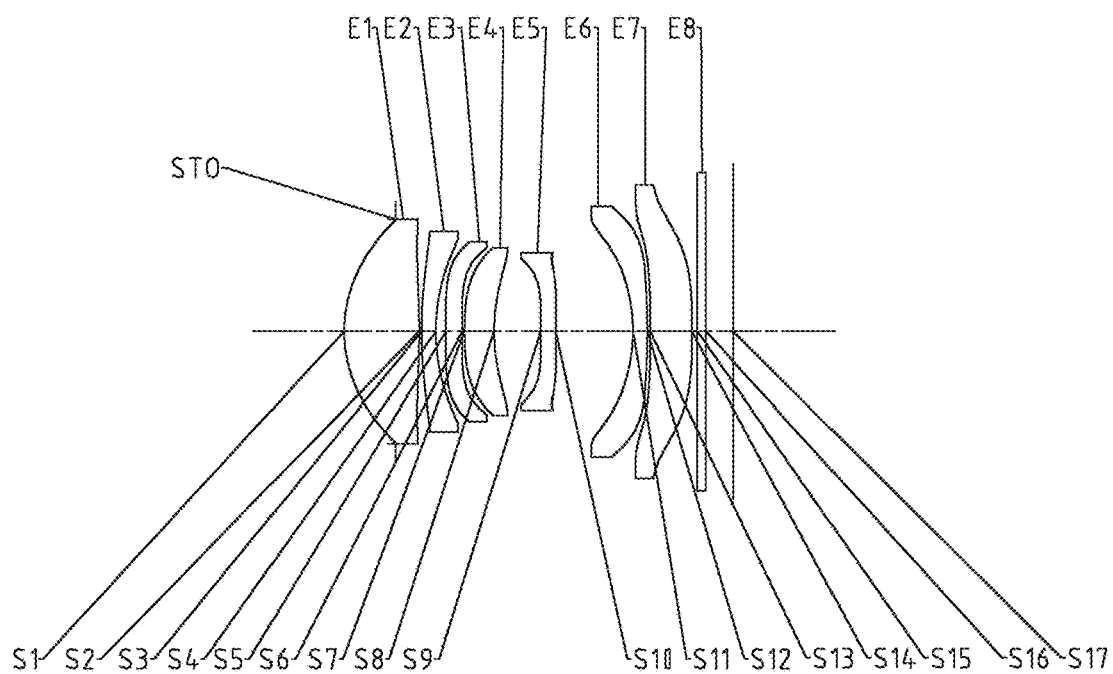
FIG. 3 is a schematic structural view of an optical imaging lens assembly according to embodiment 2 of the present disclosure.

An optical imaging lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the optical imaging lens assembly according to embodiment 2 of the present disclosure.

As shown in FIG. 3, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has negative refractive power, an object-side surface S11 thereof is a concave surface, and an image-side surface S12 thereof is a convex surface. The seventh lens E7 has positive refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 4 shows surface type, radius of curvature, thickness, material and conic coefficient of each lens of the optical imaging lens assembly in embodiment 2, wherein the units for the radius of curvature and the thickness are millimeter (mm).

TABLE 4

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.7195 | | | |
| S1 | aspheric | 1.8649 | 1.0472 | 1.55 | 56.1 | −0.0100 |
| S2 | aspheric | −8.9591 | 0.0300 | | | −13.4750 |
| S3 | aspheric | 6.1439 | 0.2000 | 1.67 | 20.4 | 6.8727 |
| S4 | aspheric | 2.9354 | 0.1384 | | | 0.2324 |
| S5 | aspheric | −23.3606 | 0.2258 | 1.67 | 20.4 | 99.0000 |
| S6 | aspheric | −21.8541 | 0.0300 | | | 90.0836 |
| S7 | aspheric | 4.5026 | 0.4121 | 1.55 | 56.1 | 8.8556 |
| S8 | aspheric | 2.5655 | 0.6488 | | | −1.3743 |
| S9 | aspheric | 27.8668 | 0.2000 | 1.61 | 28.3 | −99.0000 |
| S10 | aspheric | 11.0702 | 1.0759 | | | −54.1731 |
| S11 | aspheric | −2.0129 | 0.2000 | 1.55 | 56.1 | 0.0858 |
| S12 | aspheric | −7.9235 | 0.0368 | | | 15.1686 |
| S13 | aspheric | 15.6247 | 0.5785 | 1.67 | 20.4 | 58.3066 |
| S14 | aspheric | 16.6983 | 0.0787 | | | 62.8922 |
| S15 | spherical | infinite | 0.1200 | 1.52 | 64.2 | |
| S16 | spherical | infinite | 0.3778 | | | |
| S17 | spherical | infinite | | | | |

As can be seen from Table 4, in embodiment 2, the object-side surface and the image-side surface of any one of the first lens E1 to the seventh lens E7 are aspheric. Table 5 below shows high-order coefficients applicable to each aspheric surface in embodiment 2, wherein the surface type of each aspheric surface may be defined by the formula (1) given above in embodiment 1.

TABLE 5

| Surface number | A4 | A6 | A8 | A10 | A12 | A14 | A16 | A18 | A20 |
|---|---|---|---|---|---|---|---|---|---|
| S1 | −8.6100E−03 | 8.5400E−03 | −3.7840E−02 | 7.2084E−02 | −8.1630E−02 | 5.5090E−02 | −2.1810E−02 | 4.6430E−03 | −4.1000E−04 |
| S2 | −2.7650E−02 | 2.4459E−01 | −5.0489E−01 | 6.0039E−01 | −4.4705E−01 | 2.0748E−01 | −5.7150E−02 | 8.3030E−03 | −4.6000E−04 |
| S3 | −5.6210E−02 | 1.6742E−01 | −2.5930E−01 | 1.7461E−01 | 2.5473E−02 | −1.4701E−01 | 1.1574E−01 | −4.0010E−02 | 5.3000E−03 |
| S4 | 1.2647E−02 | 2.3894E−01 | −1.5184E+00 | 4.3063E+00 | −6.7329E+00 | 6.1278E+00 | −3.2301E+00 | 9.1371E−01 | −1.0727E−01 |
| S5 | 1.3363E−01 | 3.8622E−01 | −2.5223E+00 | 7.2998E+00 | −1.1717E+01 | 1.1114E+01 | −6.1868E+00 | 1.8700E+00 | −2.3735E−01 |
| S6 | 1.3486E−01 | 7.9411E−01 | −4.4067E+00 | 1.3129E+01 | −2.3388E+01 | 2.5608E+01 | −1.6853E+01 | 6.1259E+00 | −9.4789E−01 |
| S7 | 6.1020E−02 | 6.0709E−01 | −2.9545E+00 | 8.3641E+00 | −1.4786E+01 | 1.6407E+01 | −1.1064E+01 | 4.1398E+00 | −6.5919E−01 |
| S8 | −2.0720E−02 | −5.7680E−02 | 5.9529E−01 | −2.2614E+00 | 4.8726E+00 | −6.4716E+00 | 5.2053E+00 | −2.3274E+00 | 4.4338E−01 |
| S9 | −1.9245E−01 | −7.3300E−02 | −4.4026E−01 | 2.6567E+00 | −8.0664E+00 | 1.4128E+01 | −1.4427E+01 | 7.9557E+00 | −1.8119E+00 |
| S10 | −1.2769E−01 | 7.9888E−02 | −6.7678E−01 | 2.4095E+00 | −4.7609E+00 | 5.8334E+00 | −4.3077E+00 | 1.7633E+00 | −3.0635E−01 |
| S11 | 2.1730E−01 | −6.1857E−01 | 1.3125E+00 | −1.9778E+00 | 1.9436E+00 | −1.1922E+00 | 4.3642E−01 | −8.6750E−02 | 7.1870E−03 |
| S12 | −2.0950E−02 | 1.9435E−01 | −2.1951E−01 | −3.5220E−02 | 2.0470E−01 | −1.5522E−01 | 5.5945E−02 | −1.0170E−02 | 7.5300E−04 |
| S13 | −3.2413E−01 | 7.5750E−01 | −1.0204E+00 | 8.1860E−01 | −4.1752E−01 | 1.3764E−01 | −2.8400E−02 | 3.3330E−03 | −1.7000E−04 |
| S14 | −3.0635E−01 | 4.6822E−01 | −5.4170E−01 | 4.1110E−01 | −2.0224E−01 | 6.3541E−02 | −1.2240E−02 | 1.3180E−03 | −6.1000E−05 |

Table 6 shows effective focal lengths f1 to f7 of the lenses, a total effective focal length f, a total optical length TTL, half of a diagonal length ImgH of an effective pixel area on the imaging plane S17 and half of a maximal field-of-view angle HFOV of the optical imaging lens assembly in embodiment 2.

TABLE 6

| | |
|---|---|
| f1 (mm) | 2.93 |
| f2 (mm) | −8.65 |
| f3 (mm) | 500.00 |
| f4 (mm) | −11.81 |
| f5 (mm) | −30.39 |
| f6 (mm) | −5.00 |
| f7 (mm) | 300.00 |
| f (mm) | 5.87 |
| TTL (mm) | 5.40 |
| ImgH (mm) | 2.32 |
| HFOV (°) | 21.4 |

Figure 4A:
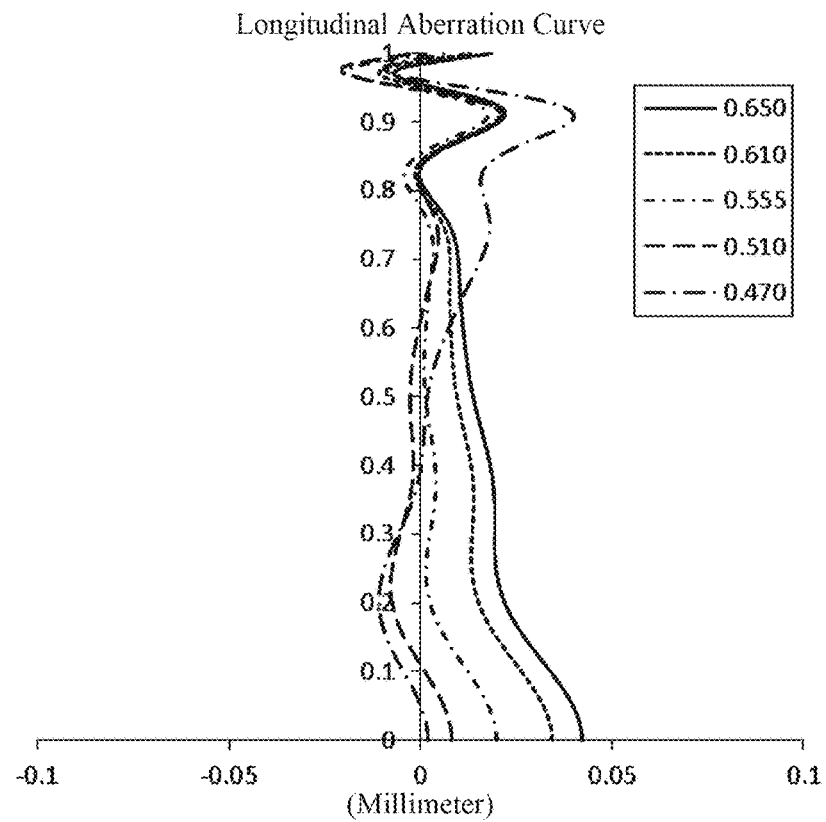
FIGS. 4A-4D illustrate a longitudinal aberration curve, an astigmatic curve, a distortion curve and a lateral color curve of the optical imaging lens assembly according to embodiment 2, respectively.
Figure 4B:
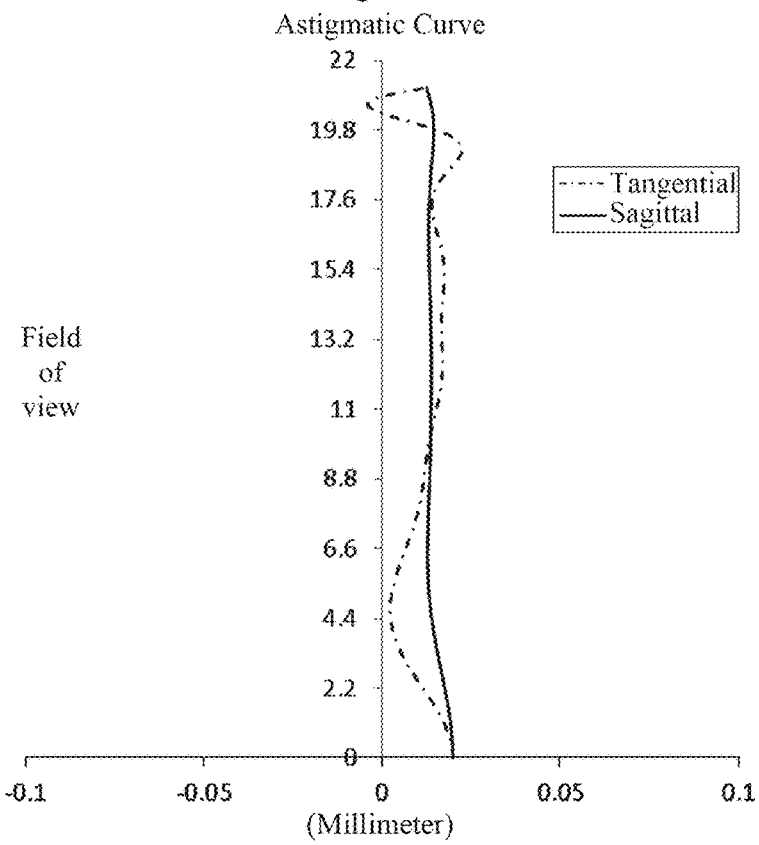
Figure 4C:
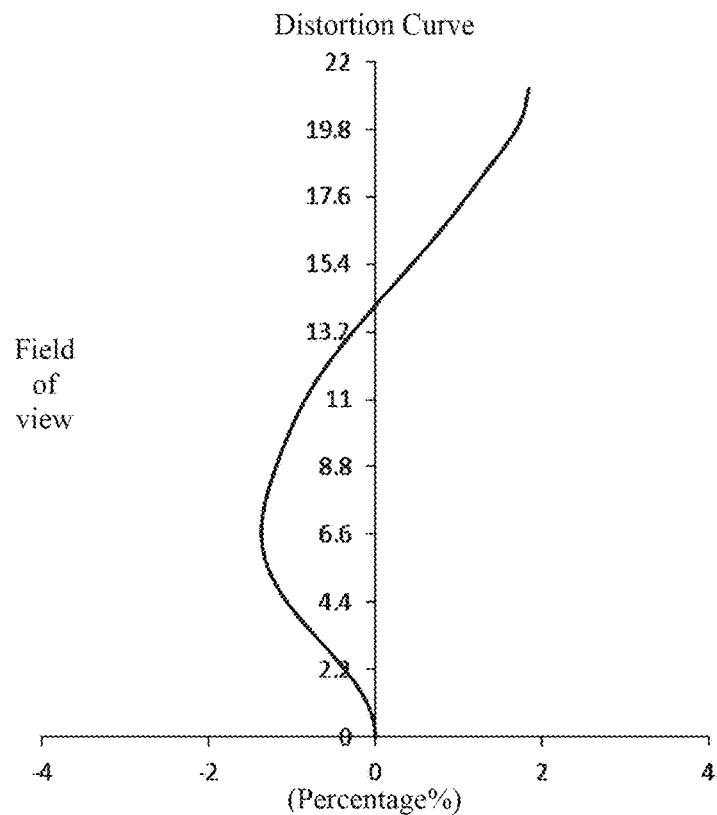
Figure 4D:
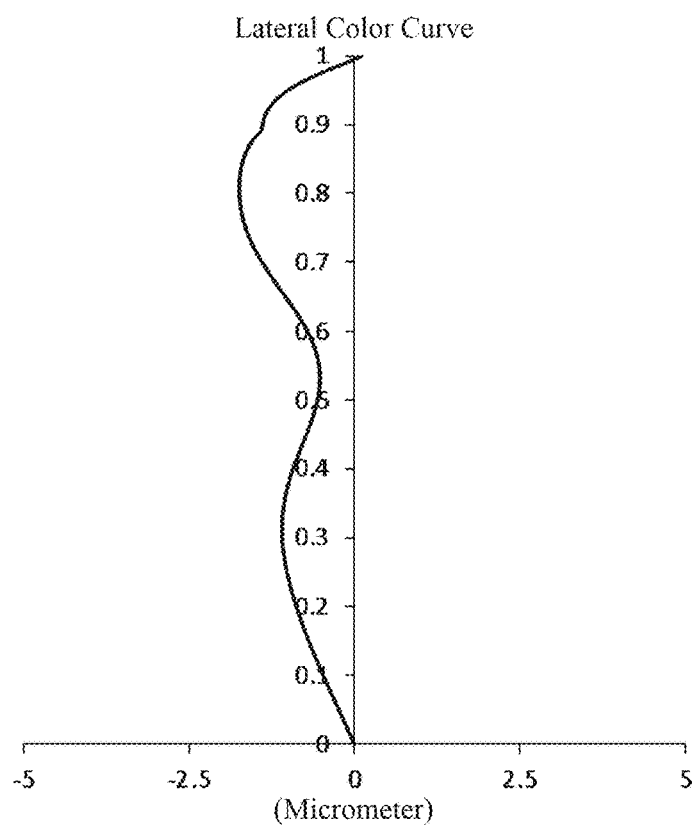

FIG. 4A illustrates a longitudinal aberration curve of the optical imaging lens assembly according to embodiment 2, representing deviations of focal points converged by light of different wavelengths after passing through the optical imaging lens assembly. FIG. 4B illustrates an astigmatic curve of the optical imaging lens assembly according to embodiment 2, representing a curvature of a tangential plane and a curvature of a sagittal plane. FIG. 4C illustrates a distortion curve of the optical imaging lens assembly according to embodiment 2, representing amounts of distortion corresponding to different field-of-view angle. FIG. 4D illustrates a lateral color curve of the optical imaging lens assembly according to embodiment 2, representing deviations of different image heights on an imaging plane after light passes through the optical imaging lens assembly. It can be seen from FIG. 4A to FIG. 4D that the optical imaging lens assembly provided in embodiment 2 can achieve good image quality.

Embodiment 3

Figure 5:
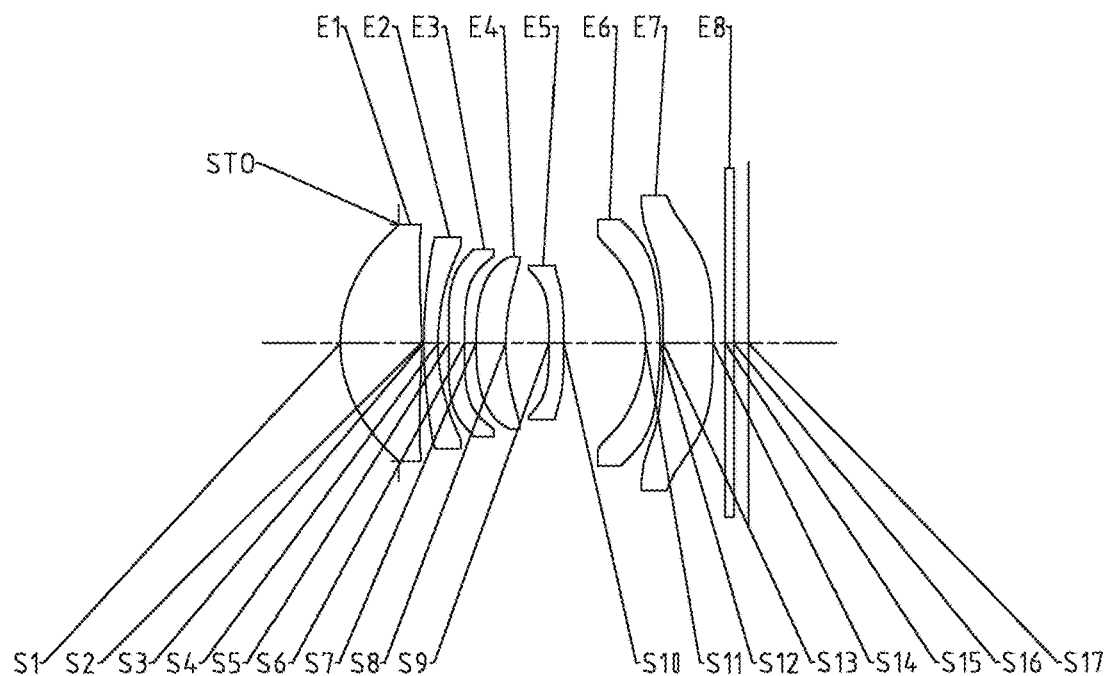
FIG. 5 is a schematic structural view of an optical imaging lens assembly according to embodiment 3 of the present disclosure.

An optical imaging lens assembly according to embodiment 3 of the present disclosure is described below with reference to FIG. 5 to FIG. 6D. FIG. 5 is a schematic structural view of the optical imaging lens assembly according to embodiment 3 of the present disclosure.

As shown in FIG. 5, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a concave surface, and an image-side surface S10 thereof is a convex surface. The sixth lens E6 has negative refractive power, an object-side surface S11 thereof is a concave surface, and an image-side surface S12 thereof is a convex surface. The seventh lens E7 has positive refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 7 shows surface type, radius of curvature, thickness, material and conic coefficient of each lens of the optical imaging lens assembly in embodiment 3, wherein the units for the radius of curvature and the thickness are millimeter (mm).

TABLE 7

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.8253 | | | |
| S1 | aspheric | 1.9473 | 1.1484 | 1.55 | 56.1 | 0.0100 |
| S2 | aspheric | −9.1762 | 0.0300 | | | −5.7496 |
| S3 | aspheric | 6.6446 | 0.2000 | 1.67 | 20.4 | 8.3586 |
| S4 | aspheric | 3.2826 | 0.1513 | | | 0.5569 |
| S5 | aspheric | −13.8454 | 0.2255 | 1.66 | 21.5 | 99.0000 |
| S6 | aspheric | 196.5728 | 0.1580 | | | 99.0000 |
| S7 | aspheric | 4.2789 | 0.4194 | 1.55 | 56.1 | 6.1082 |
| S8 | aspheric | 3.0561 | 0.6104 | | | 1.4200 |
| S9 | aspheric | −30.1908 | 0.2000 | 1.64 | 23.8 | −78.4540 |
| S10 | aspheric | −131.5282 | 1.1543 | | | 99.0000 |
| S11 | aspheric | −1.9473 | 0.2000 | 1.55 | 56.1 | 0.1581 |
| S12 | aspheric | −12.7351 | 0.0492 | | | 43.0871 |
| S13 | aspheric | 20.4011 | 0.7000 | 1.67 | 20.4 | −99.0000 |
| S14 | aspheric | 21.4334 | 0.1768 | | | 99.0000 |
| S15 | spherical | infinite | 0.1200 | 1.52 | 64.2 | |
| S16 | spherical | infinite | 0.2066 | | | |
| S17 | spherical | infinite | | | | |

As can be seen from Table 7, in embodiment 3, the object-side surface and the image-side surface of any one of the first lens E1 to the seventh lens E7 are aspheric. Table 8 below shows high-order coefficients applicable to each aspheric surface in embodiment 3, wherein the surface type of each aspheric surface may be defined by the formula (1) given above in embodiment 1.

TABLE 8

| Surface number | A4 | A6 | A8 | A10 | A12 | A14 | A16 | A18 | A20 |
|---|---|---|---|---|---|---|---|---|---|
| S1 | −4.5906E−03 | −1.2720E−02 | 6.5212E−02 | −1.5221E−01 | 2.0787E−01 | −1.7381E−01 | 8.7978E−02 | −2.4627E−02 | 2.9287E−03 |
| S2 | −9.0484E−02 | −3.4359E−02 | 1.3787E+00 | −4.5297E+00 | 7.3528E+00 | −6.7359E+00 | 3.5098E+00 | −9.6315E−01 | 1.0680E−01 |
| S3 | −2.9630E−02 | −3.3744E−01 | 2.7773E+00 | −8.8280E+00 | 1.5185E+01 | −1.5308E+01 | 9.0472E+00 | −2.9062E+00 | 3.9208E−01 |
| S4 | −8.3540E−02 | 6.3759E−01 | −2.4061E+00 | 7.2951E+00 | −1.7894E+01 | 3.0427E+01 | −3.1944E+01 | 1.8459E+01 | −4.4820E+00 |
| S5 | 5.7818E−02 | −3.1074E−01 | 3.6221E+00 | −1.9598E+01 | 5.9347E+01 | −1.0831E+02 | 1.1871E+02 | −7.1812E+01 | 1.8417E+01 |
| S6 | −8.2594E−02 | 3.4075E−01 | −1.0821E+00 | −5.6381E−01 | 1.2692E+01 | −3.7715E+01 | 5.5748E+01 | −4.2118E+01 | 1.2935E+01 |
| S7 | −8.2378E−02 | −1.6853E−01 | 1.3909E+00 | −7.4355E+00 | 2.2885E+01 | −4.1561E+01 | 4.5424E+01 | −2.7735E+01 | 7.2223E+00 |
| S8 | −3.8033E−02 | 1.5934E−01 | −7.2570E−01 | 2.5427E+00 | −5.5125E+00 | 7.9968E+00 | −7.3244E+00 | 3.6901E+00 | −7.7220E−01 |
| S9 | −5.8187E−03 | −1.3829E−01 | 1.6470E−01 | −7.8639E−02 | −3.1641E−02 | 4.7672E−02 | −1.7958E−02 | 2.6407E−03 | −1.0272E−04 |
| S10 | 9.6440E−02 | −2.6862E−01 | 3.1670E−01 | −2.7279E−01 | 1.8280E−01 | −8.9711E−02 | 2.8467E−02 | −5.0338E−03 | 3.7177E−04 |
| S11 | 9.2704E−02 | −1.5560E−01 | 1.8399E−01 | −1.3872E−01 | 6.6178E−02 | −1.9374E−02 | 3.3725E−03 | −3.2100E−04 | 1.2884E−05 |
| S12 | −6.3141E−02 | 7.4482E−02 | −4.2542E−02 | 1.0920E−02 | −2.6630E−04 | −5.6059E−04 | 1.4178E−04 | −1.4622E−05 | 5.7090E−07 |
| S13 | 9.2970E−02 | −1.5610E−01 | 1.1926E−01 | −5.3847E−02 | 1.5062E−02 | −2.6029E−03 | 2.6665E−04 | −1.4523E−05 | 3.1125E−07 |
| S14 | −5.7844E−02 | 1.3788E−02 | 6.7876E−03 | −6.9178E−03 | 2.5183E−03 | −4.7745E−04 | 4.9222E−05 | −2.5366E−06 | 4.7090E−08 |

Table 9 shows effective focal lengths f1 to f7 of the lenses, a total effective focal length f, a total optical length TTL, half of a diagonal length ImgH of an effective pixel area on the imaging plane S17 and half of a maximal field-of-view angle HFOV of the optical imaging lens assembly in embodiment 3.

TABLE 9

| | |
|---|---|
| f1 (mm) | 3.05 |
| f2 (mm) | −9.97 |
| f3 (mm) | −19.70 |
| f4 (mm) | −22.29 |
| f5 (mm) | −61.25 |
| f6 (mm) | −4.24 |
| f7 (mm) | 500.00 |
| f (mm) | 6.31 |
| TTL (mm) | 5.75 |
| ImgH (mm) | 2.55 |
| HFOV (°) | 21.8 |

Figure 6A:
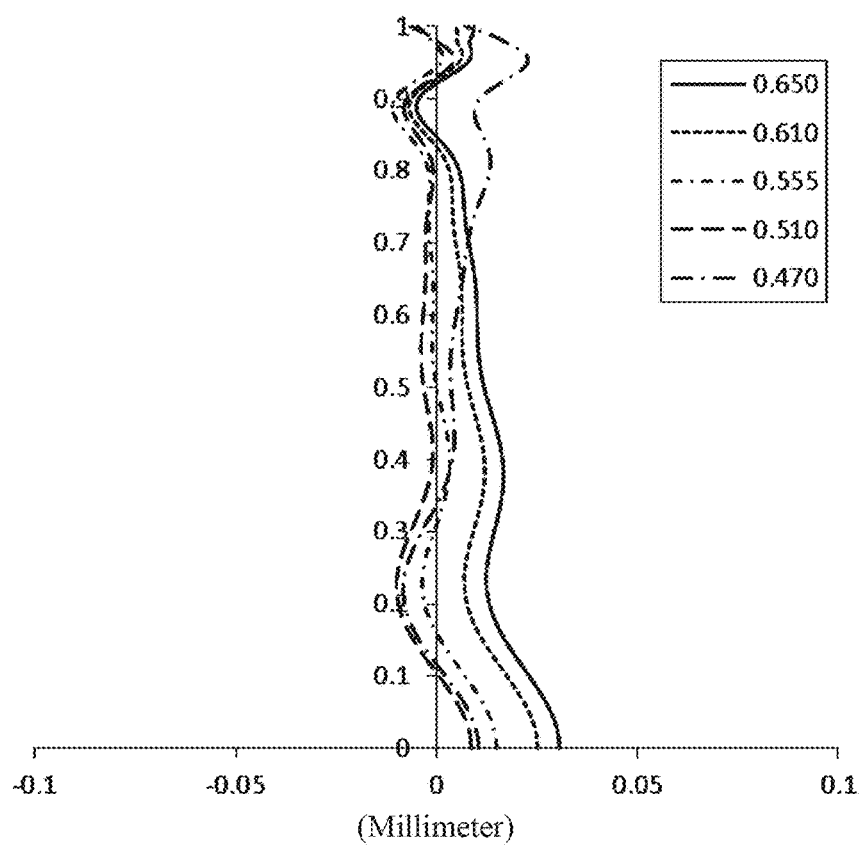
FIGS. 6A-6D illustrate a longitudinal aberration curve, an astigmatic curve, a distortion curve and a lateral color curve of the optical imaging lens assembly according to embodiment 3, respectively.
Figure 6B:
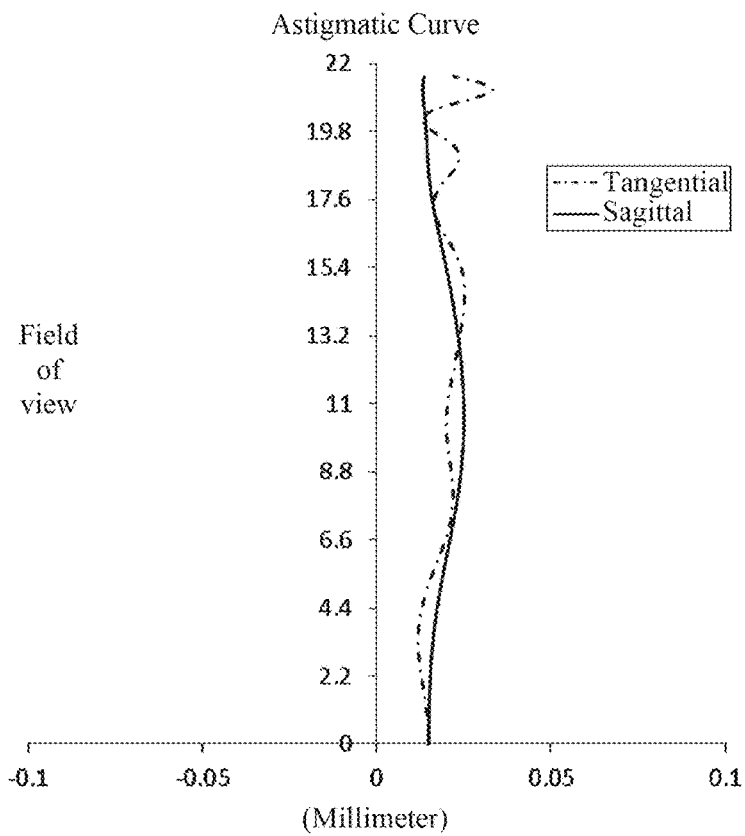
Figure 6C:
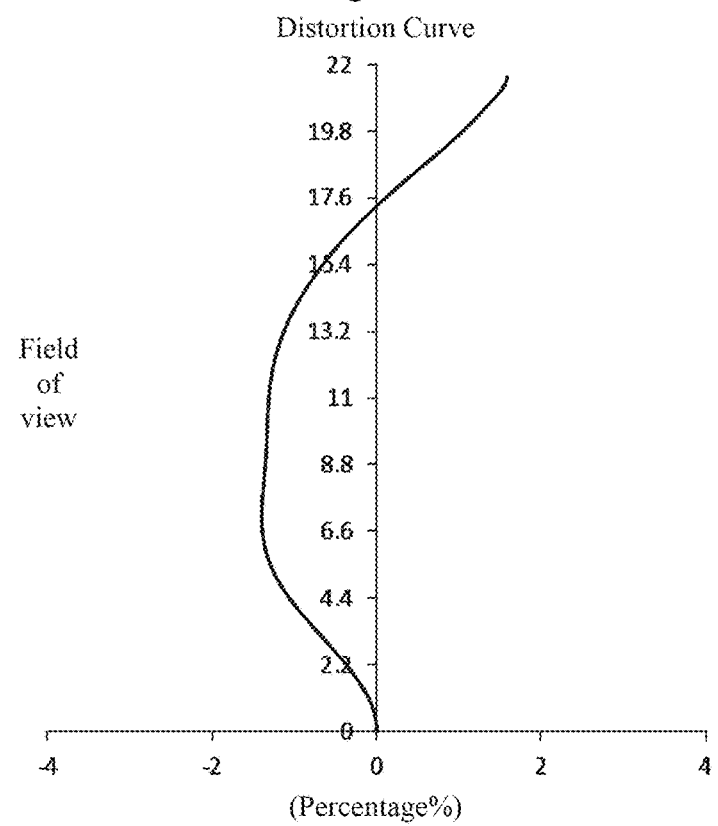
Figure 6D:
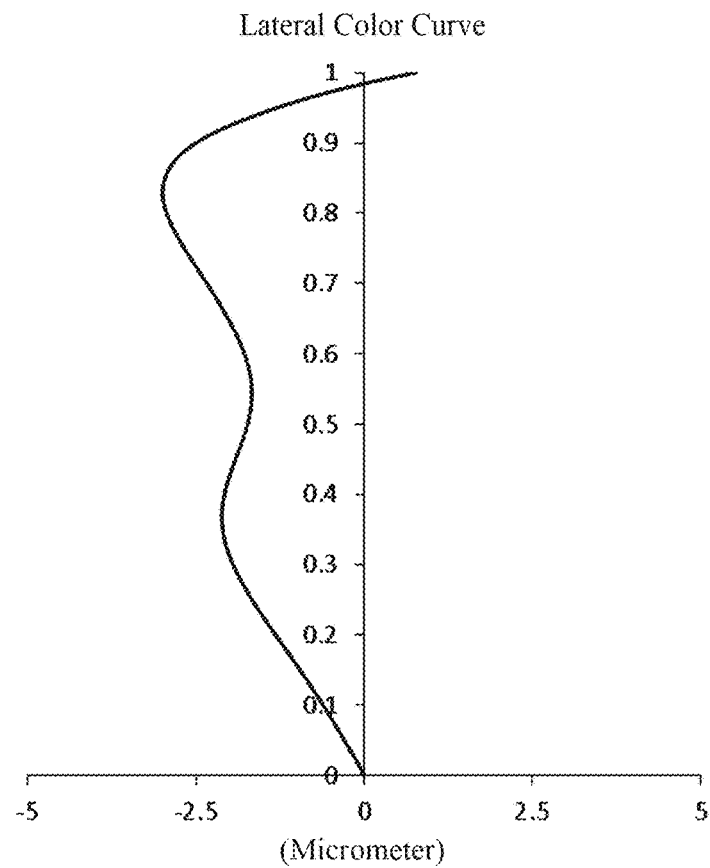

FIG. 6A illustrates a longitudinal aberration curve of the optical imaging lens assembly according to embodiment 3, representing deviations of focal points converged by light of different wavelengths after passing through the optical imaging lens assembly. FIG. 6B illustrates an astigmatic curve of the optical imaging lens assembly according to embodiment 3, representing a curvature of a tangential plane and a curvature of a sagittal plane. FIG. 6C illustrates a distortion curve of the optical imaging lens assembly according to embodiment 3, representing amounts of distortion corresponding to different field-of-view angle. FIG. 6D illustrates a lateral color curve of the optical imaging lens assembly according to embodiment 3, representing deviations of different image heights on an imaging plane after light passes through the optical imaging lens assembly. It can be seen from FIG. 6A to FIG. 6D that the optical imaging lens assembly provided in embodiment 3 can achieve good image quality.

Embodiment 4

Figure 7:
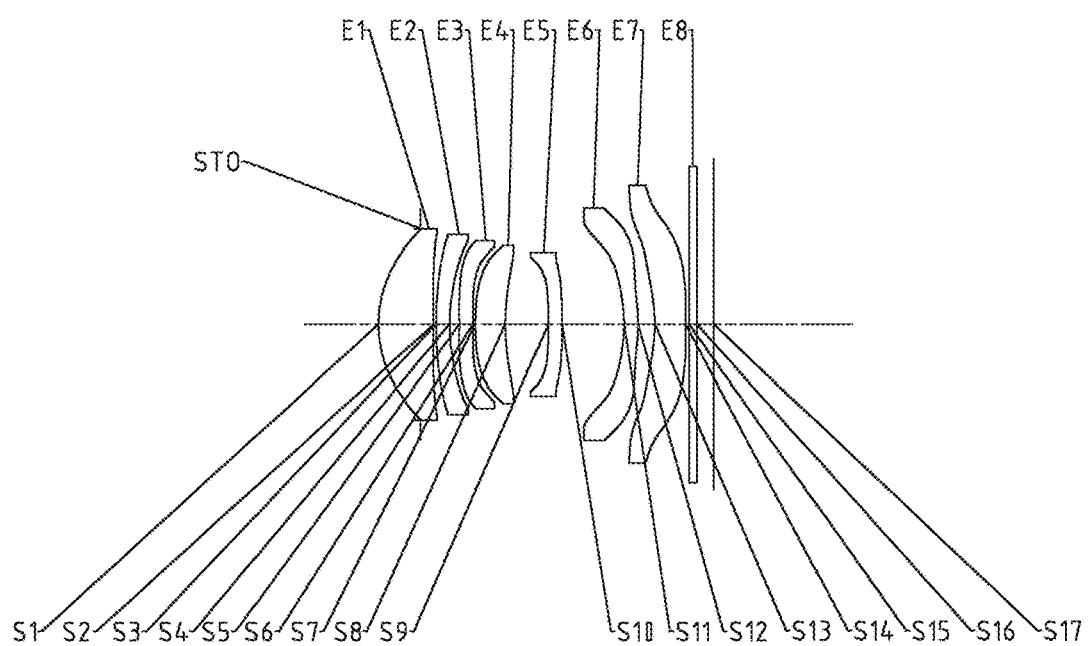
FIG. 7 is a schematic structural view of an optical imaging lens assembly according to embodiment 4 of the present disclosure.

An optical imaging lens assembly according to embodiment 4 of the present disclosure is described below with reference to FIG. 7 to FIG. 8D. FIG. 7 is a schematic structural view of the optical imaging lens assembly according to embodiment 4 of the present disclosure.

As shown in FIG. 7, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 10 shows surface type, radius of curvature, thickness, material and conic coefficient of each lens of the optical imaging lens assembly in embodiment 4, wherein the units for the radius of curvature and the thickness are millimeter (mm).

TABLE 10

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.6230 | | | |
| S1 | aspheric | 1.7578 | 0.8164 | 1.55 | 56.1 | −0.0817 |
| S2 | aspheric | −19.0862 | 0.0358 | | | −99.0000 |
| S3 | aspheric | 5.4327 | 0.2000 | 1.67 | 20.4 | 8.1119 |
| S4 | aspheric | 2.6440 | 0.1457 | | | 0.1194 |
| S5 | aspheric | −22.2504 | 0.2000 | 1.67 | 20.4 | 60.8210 |
| S6 | aspheric | −50.5046 | 0.0324 | | | −99.0000 |
| S7 | aspheric | 3.4774 | 0.4447 | 1.55 | 56.1 | 5.5321 |
| S8 | aspheric | 3.2708 | 0.6305 | | | −3.4005 |
| S9 | aspheric | −36.8882 | 0.2010 | 1.61 | 28.3 | 56.6945 |
| S10 | aspheric | −32.9583 | 0.9192 | | | −98.0175 |
| S11 | aspheric | −1.9681 | 0.2081 | 1.55 | 56.1 | 0.0707 |
| S12 | aspheric | −1.9354 | 0.2479 | | | −25.4299 |
| S13 | aspheric | −2.0367 | 0.4524 | 1.67 | 20.4 | −19.0544 |
| S14 | aspheric | 23.5034 | 0.0506 | | | −62.4216 |
| S15 | spherical | infinite | 0.1200 | 1.52 | 64.2 | |
| S16 | spherical | infinite | 0.2455 | | | |
| S17 | spherical | infinite | | | | |

As can be seen from Table 10, in embodiment 4, the object-side surface and the image-side surface of any one of the first lens E1 to the seventh lens E7 are aspheric. Table 11 below shows high-order coefficients applicable to each aspheric surface in embodiment 4, wherein the surface type of each aspheric surface may be defined by the formula (1) given above in embodiment 1.

Figure 8A:
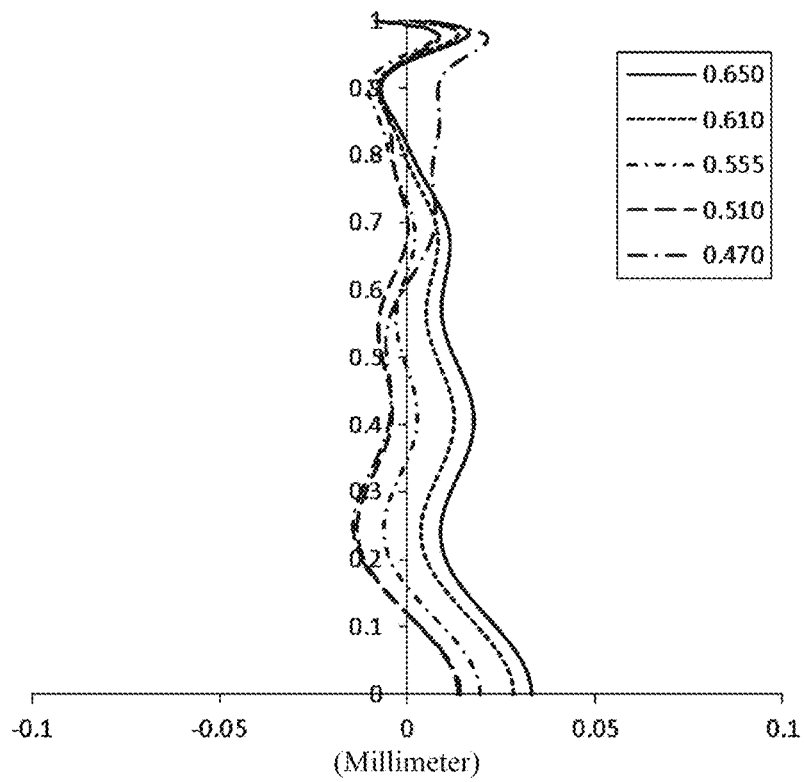
FIGS. 8A-8D illustrate a longitudinal aberration curve, an astigmatic curve, a distortion curve and a lateral color curve of the optical imaging lens assembly according to embodiment 4, respectively.
Figure 8B:
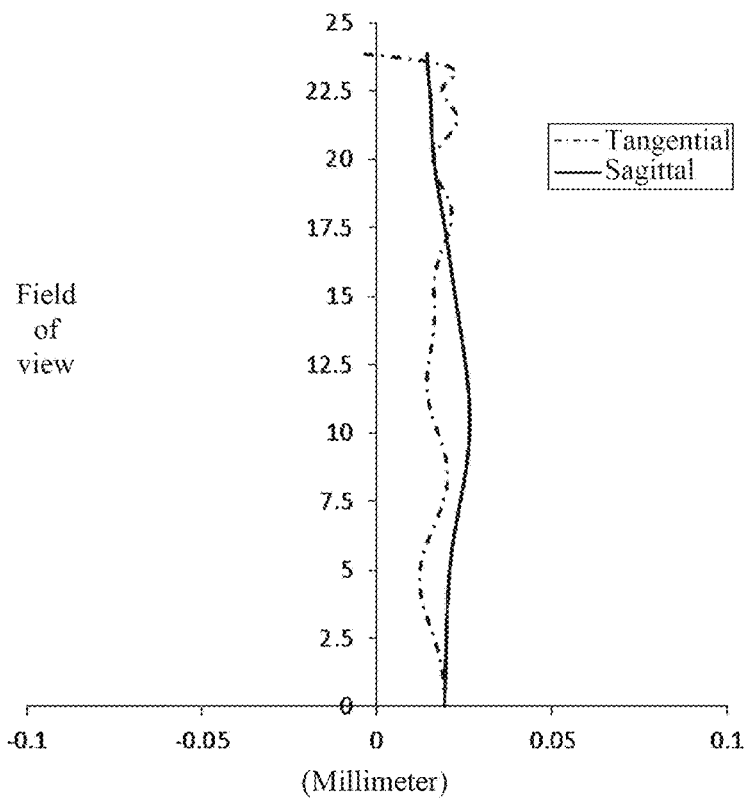

FIG. 8A illustrates a longitudinal aberration curve of the optical imaging lens assembly according to embodiment 4, representing deviations of focal points converged by light of different wavelengths after passing through the optical imaging lens assembly. FIG. 8B illustrates an astigmatic curve of the optical imaging lens assembly according to embodiment 4, representing a curvature of a tangential plane and a

TABLE 11

| Surface number | A4 | A6 | A8 | A10 | A12 | A14 | A16 | A18 | A20 |
|---|---|---|---|---|---|---|---|---|---|
| S1 | −5.7100E−03 | 5.5170E−03 | −4.1350E−02 | 1.1333E−01 | −1.7342E−01 | 1.4920E−01 | −7.2840E−02 | 1.8776E−02 | −1.9800E−03 |
| S2 | 2.7877E−02 | 2.0574E−01 | −7.5934E−01 | 1.3440E+00 | −1.4103E+00 | 9.2130E−01 | −3.7097E−01 | 8.4929E−02 | −8.4900E−03 |
| S3 | −6.4250E−02 | 3.5064E−01 | −1.1903E+00 | 2.2452E+00 | −2.4361E+00 | 1.5639E+00 | −5.8715E−01 | 1.1915E−01 | −1.0090E−02 |
| S4 | −1.2702E−01 | 6.1735E−01 | −2.6579E+00 | 6.6009E+00 | −9.4534E+00 | 8.0405E+00 | −4.0186E+00 | 1.0912E+00 | −1.2425E−01 |
| S5 | 8.2325E−02 | 4.5480E−01 | −2.1766E+00 | 5.5843E+00 | −8.6388E+00 | 8.1609E+00 | −4.5739E+00 | 1.3947E+00 | −1.7827E−01 |
| S6 | 6.2658E−02 | 8.7288E−01 | −3.1660E+00 | 7.5411E+00 | −1.2556E+01 | 1.3987E+01 | −9.5995E+00 | 3.6155E+00 | −5.7031E−01 |
| S7 | −8.0390E−02 | 7.2042E−01 | −1.9697E+00 | 3.6709E+00 | −5.0838E+00 | 5.3771E+00 | −3.9138E+00 | 1.6581E+00 | −3.0188E−01 |
| S8 | −3.8180E−02 | −1.0843E−01 | 9.4851E−01 | −3.2501E+00 | 6.3964E+00 | −7.7180E+00 | 5.6134E+00 | −2.2516E+00 | 3.8031E−01 |
| S9 | −1.7602E−01 | 8.0933E−02 | −1.3936E+00 | 5.8812E+00 | −1.4673E+01 | 2.2649E+01 | −2.1208E+01 | 1.0998E+01 | −2.4042E+00 |
| S10 | −1.0547E−01 | 1.4843E−01 | −1.3265E+00 | 4.9205E+00 | −1.0431E+01 | 1.3701E+01 | −1.0887E+01 | 4.8014E+00 | −8.9926E−01 |
| S11 | 2.7898E−01 | −4.1663E−01 | 7.6662E−01 | −1.8315E+00 | 2.6038E+00 | −2.0623E+00 | 9.1488E−01 | −2.1281E−01 | 2.0211E−02 |
| S12 | 1.2895E−01 | 1.1585E−01 | −3.6185E−01 | 1.9478E−01 | 6.3377E−02 | −1.1892E−01 | 5.6556E−02 | −1.2230E−02 | 1.0340E−03 |
| S13 | 5.6720E−03 | −1.3911E−01 | 4.4391E−01 | −5.5842E−01 | 3.5704E−01 | −1.2877E−01 | 2.6710E−02 | −2.9800E−03 | 1.3900E−04 |
| S14 | −2.0752E−01 | 2.9302E−01 | −3.8882E−01 | 3.5266E−01 | −2.0661E−01 | 7.5280E−02 | −1.6290E−02 | 1.9130E−03 | −9.4000E−05 |

Table 12 shows effective focal lengths f1 to f7 of the lenses, a total effective focal length f, a total optical length TTL, half of a diagonal length ImgH of an effective pixel area on the imaging plane S17 and half of a maximal field-of-view angle HFOV of the optical imaging lens assembly in embodiment 4.

TABLE 12

Figure 8C:
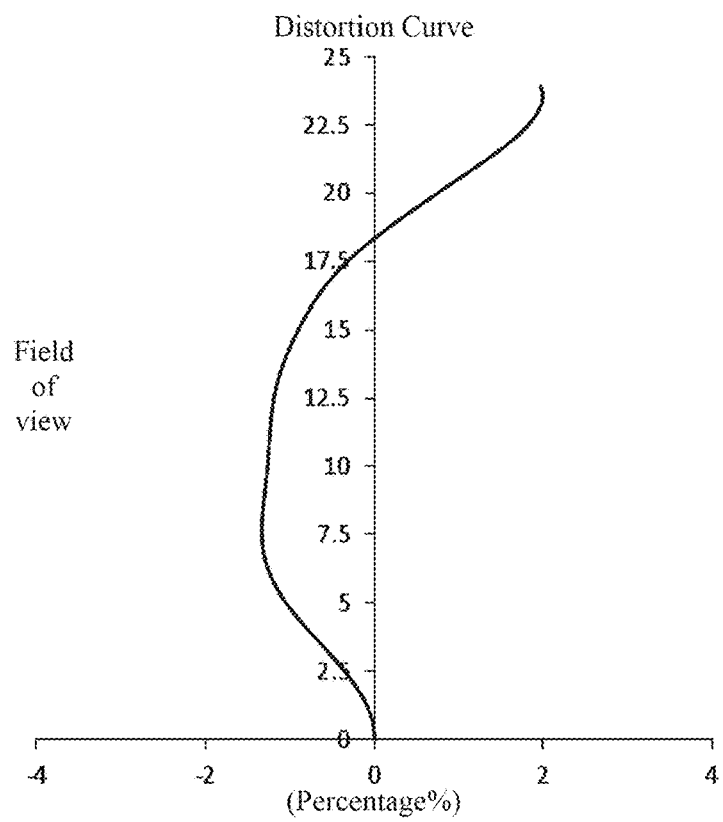
Figure 8D:
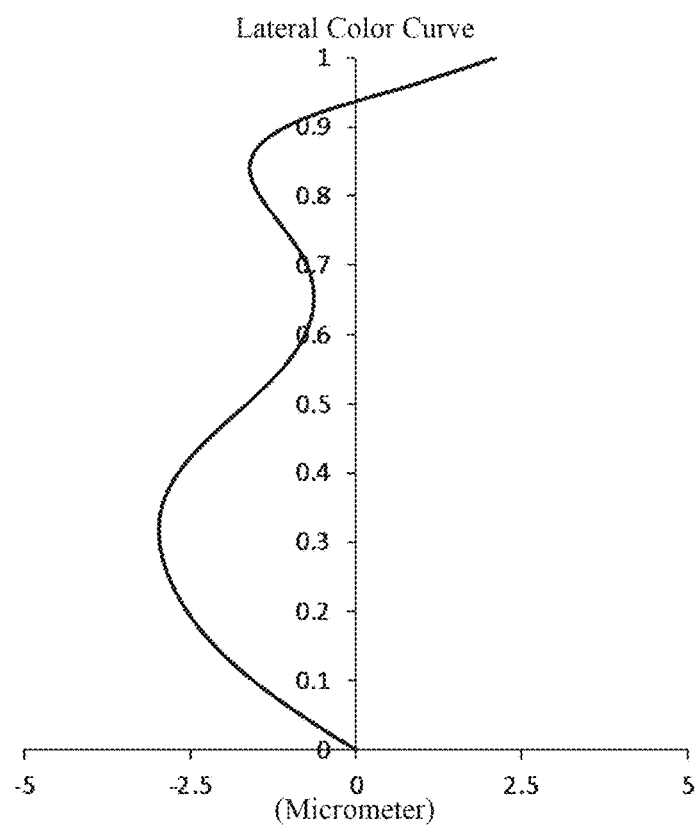

| f1 (mm) | 2.99 |
|---|---|
| f2 (mm) | −7.96 |
| f3 (mm) | −59.85 |
| f4 (mm) | −420.19 |
| f5 (mm) | 500.01 |
| f6 (mm) | 65.75 |
| f7 (mm) | −2.79 |
| f (mm) | 5.30 |
| TTL (mm) | 4.95 |
| ImgH (mm) | 2.40 |
| HFOV (°) | 24.2 | curvature of a sagittal plane. FIG. 8C illustrates a distortion curve of the optical imaging lens assembly according to embodiment 4, representing amounts of distortion corresponding to different field-of-view angle. FIG. 8D illustrates a lateral color curve of the optical imaging lens assembly according to embodiment 4, representing deviations of different image heights on an imaging plane after light passes through the optical imaging lens assembly. It can be seen from FIG. 8A to FIG. 8D that the optical imaging lens assembly provided in embodiment 4 can achieve good image quality.

Embodiment 5

Figure 9:
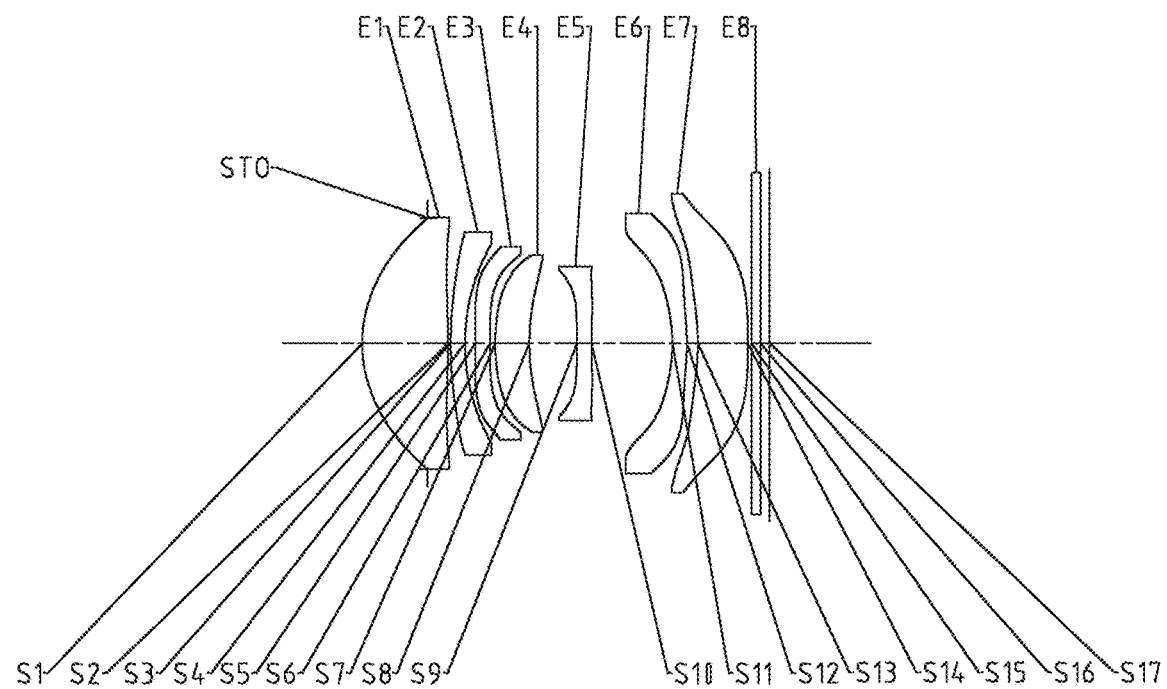
FIG. 9 is a schematic structural view of an optical imaging lens assembly according to embodiment 5 of the present disclosure.

An optical imaging lens assembly according to embodiment 5 of the present disclosure is described below with reference to FIG. 9 to FIG. 10D. FIG. 9 is a schematic structural view of the optical imaging lens assembly according to embodiment 5 of the present disclosure.

As shown in FIG. 9, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a concave surface, and an image-side surface S10 thereof is a concave surface. The sixth lens E6 has negative refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a convex surface. The optical filter E8 has an object-side surface S15 and an image-side surface S16. Light from an object sequentially passes through the respective surfaces S1 to S16 and is finally imaged on the imaging plane S17.

Table 13 shows surface type, radius of curvature, thickness, material and conic coefficient of each lens of the optical imaging lens assembly in embodiment 5, wherein the units for the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.8989 | | | |
| S1 | aspheric | 1.9128 | 1.1837 | 1.55 | 56.1 | 0.0006 |
| S2 | aspheric | −10.4640 | 0.0302 | | | −11.7688 |
| S3 | aspheric | 5.5248 | 0.2000 | 1.67 | 20.4 | 6.5238 |
| S4 | aspheric | 3.0304 | 0.1417 | | | 0.6454 |
| S5 | aspheric | −14.0859 | 0.2000 | 1.66 | 21.5 | 99.0000 |
| S6 | aspheric | 25.1331 | 0.0744 | | | −69.1794 |
| S7 | aspheric | 3.3160 | 0.4654 | 1.55 | 56.1 | 4.6386 |
| S8 | aspheric | 3.2167 | 0.6566 | | | 1.2651 |
| S9 | aspheric | −83.5141 | 0.2000 | 1.61 | 28.3 | −99.0000 |
| S10 | aspheric | 8.3270 | 1.1120 | | | 53.0993 |
| S11 | aspheric | −1.9510 | 0.2000 | 1.55 | 56.1 | 0.1101 |
| S12 | aspheric | −2.7686 | 0.1493 | | | −32.0167 |
| S13 | aspheric | −3.2207 | 0.6867 | 1.67 | 20.4 | −53.5780 |
| S14 | aspheric | −412.7738 | 0.0500 | | | −99.0000 |
| S15 | spherical | infinite | 0.1200 | 1.52 | 64.2 | |
| S16 | spherical | infinite | 0.1299 | | | |
| S17 | spherical | infinite | | | | |

As can be seen from Table 13, in embodiment 5, the object-side surface and the image-side surface of any one of the first lens E1 to the seventh lens E7 are aspheric. Table 14 below shows high-order coefficients applicable to each aspheric surface in embodiment 5, wherein the surface type of each aspheric surface may be defined by the formula (1) given above in embodiment 1.

TABLE 14

| Surface number | A4 | A6 | A8 | A10 | A12 | A14 | A16 | A18 | A20 |
|---|---|---|---|---|---|---|---|---|---|
| S1 | −7.4800E−03 | 6.6250E−03 | −2.3860E−02 | 3.5649E−02 | −3.1730E−02 | 1.7012E−02 | −5.4200E−03 | 9.3400E−04 | −6.7000E−05 |
| S2 | 3.3239E−02 | −9.1730E−02 | 2.9124E−01 | −4.4586E−01 | 3.9186E−01 | −2.1116E−01 | 6.9076E−02 | −1.2600E−02 | 9.8300E−04 |
| S3 | 2.2926E−02 | −2.5553E−01 | 7.5877E−01 | −1.1935E+00 | 1.1178E+00 | −6.5179E−01 | 2.3339E−01 | −4.7040E−02 | 4.0870E−03 |
| S4 | 1.6982E−02 | 7.0870E−03 | −4.0710E−02 | 9.0511E−02 | −1.4074E−01 | 1.0935E−01 | −3.2740E−02 | −1.2100E−03 | 1.6120E−03 |
| S5 | 9.6638E−02 | 3.7045E−01 | −1.2202E+00 | 2.2324E+00 | −2.4836E+00 | 1.6876E+00 | −6.6384E−01 | 1.3360E−01 | −1.0020E−02 |
| S6 | 5.9882E−02 | 6.6275E−01 | −2.4242E+00 | 5.3795E+00 | −7.4612E+00 | 6.4826E+00 | −3.3820E+00 | 9.6261E−01 | −1.1551E−01 |
| S7 | 1.6643E−01 | 4.2871E−01 | −1.8495E+00 | 5.0091E+00 | −8.6286E+00 | 9.3618E+00 | −6.1511E+00 | 2.2307E+00 | −3.4245E−01 |
| S8 | 9.7530E−03 | −7.5330E−02 | 2.3323E−01 | −4.6987E−01 | 4.6918E−01 | −1.6483E−01 | −7.7610E−02 | 8.0530E−02 | −1.9020E−02 |
| S9 | −1.6956E−01 | −6.1380E−02 | 1.4557E−02 | −7.3524E−01 | 3.2654E+00 | −6.5782E+00 | 7.1528E+00 | −4.0938E+00 | 9.7631E−01 |
| S10 | −6.7500E−02 | −2.7170E−01 | 9.4805E−01 | −2.2252E+00 | 3.4853E+00 | −3.3123E+00 | 1.7995E+00 | −4.8105E−01 | 3.9886E−02 |
| S11 | 1.9072E−01 | −2.0227E−01 | 2.4271E−01 | −6.5661E−01 | 1.0066E+00 | −8.0588E−01 | 3.5025E−01 | −7.8410E−02 | 7.0880E−03 |
| S12 | 3.3326E−02 | 2.6007E−01 | −5.3713E−01 | 4.6693E−01 | −2.3128E−01 | 6.7615E−02 | −1.0890E−02 | 7.3900E−04 | 1.9600E−06 |
| S13 | −1.3432E−01 | 3.0197E−01 | −2.7744E−01 | 1.3150E−01 | −3.7980E−02 | 7.7820E−03 | −1.2400E−03 | 1.3700E−04 | −7.0000E−06 |
| S14 | −2.3620E−01 | 2.6668E−01 | −2.3265E−01 | 1.2919E−01 | −4.3710E−02 | 7.7430E−03 | −2.9000E−04 | −1.1000E−04 | 1.1500E−05 |

Table 15 shows effective focal lengths f1 to f7 of the lenses, a total effective focal length f, a total optical length TTL, half of a diagonal length ImgH of an effective pixel area on the imaging plane S17 and half of a maximal field-of-view angle HFOV of the optical imaging lens assembly in embodiment 5.

TABLE 15

| | |
|---|---|
| f1 (mm) | 3.07 |
| f2 (mm) | −10.40 |
| f3 (mm) | −13.72 |
| f4 (mm) | 300.01 |
| f5 (mm) | −12.46 |
| f6 (mm) | −13.25 |
| f7 (mm) | −4.87 |
| f (mm) | 6.42 |
| TTL (mm) | 5.60 |
| ImgH (mm) | 2.40 |
| HFOV (°) | 20.4 |

Figure 10A:
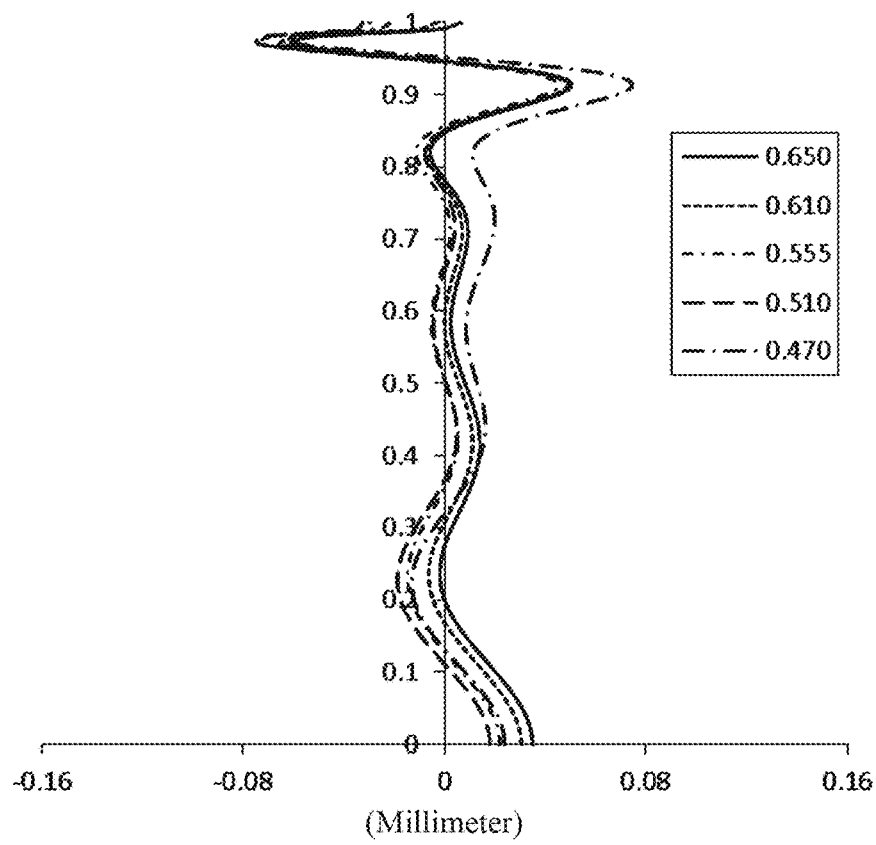
FIGS. 10A-10D illustrate a longitudinal aberration curve, an astigmatic curve, a distortion curve and a lateral color curve of the optical imaging lens assembly according to embodiment 5, respectively.
Figure 10B:
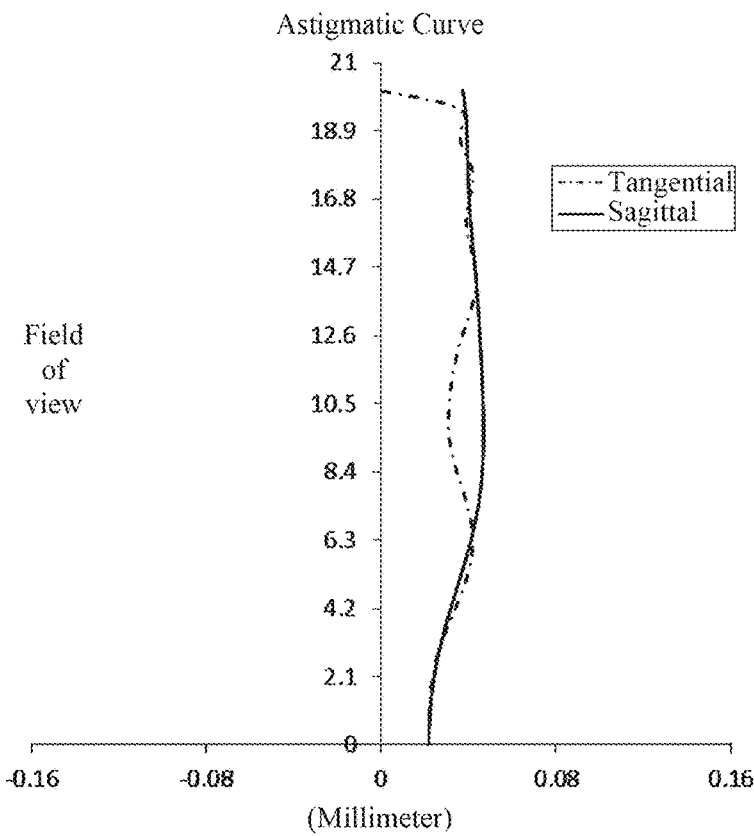
Figure 10C:
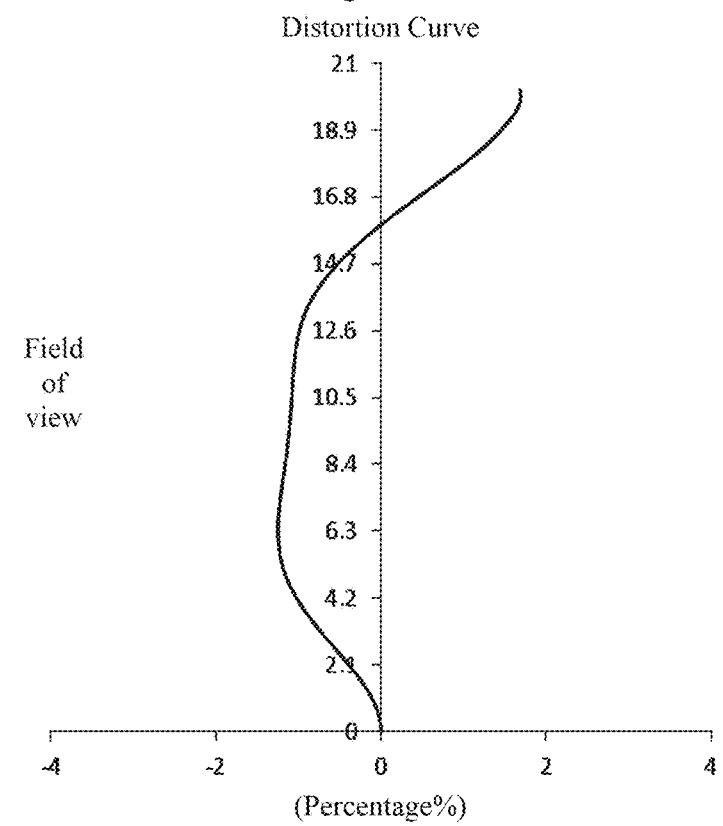
Figure 10D:
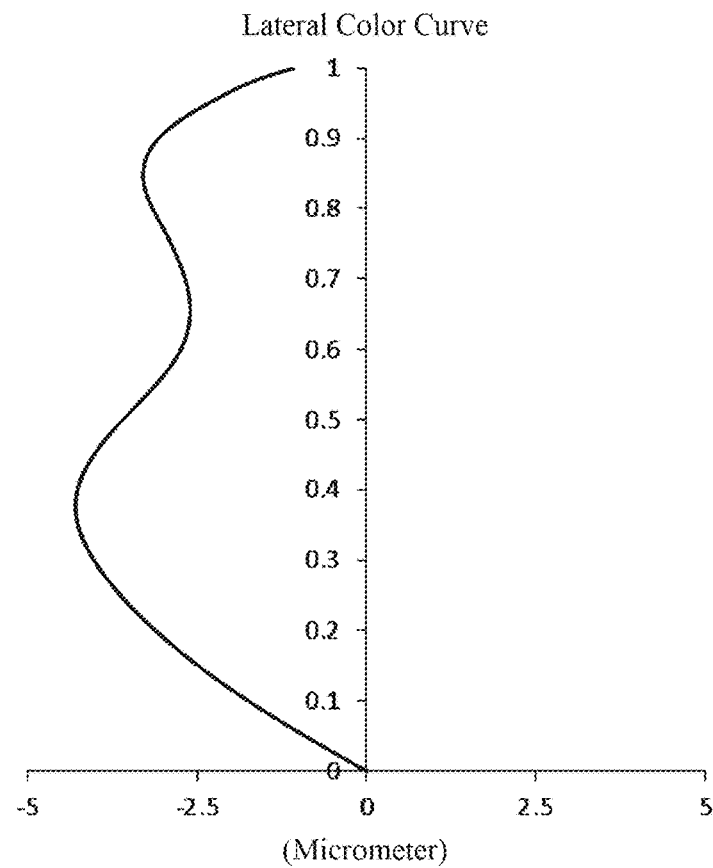

FIG. 10A illustrates a longitudinal aberration curve of the optical imaging lens assembly according to embodiment 5, representing deviations of focal points converged by light of different wavelengths after passing through the optical imaging lens assembly. FIG. 10B illustrates an astigmatic curve of the optical imaging lens assembly according to embodiment 5, representing a curvature of a tangential plane and a curvature of a sagittal plane. FIG. 10C illustrates a distortion curve of the optical imaging lens assembly according to embodiment 5, representing amounts of distortion corresponding to different field-of-view angle. FIG. 10D illustrates a lateral color curve of the optical imaging lens assembly according to embodiment 5, representing deviations of different image heights on an imaging plane after light passes through the optical imaging lens assembly. It can be seen from FIG. 10A to FIG. 10D that the optical imaging lens assembly provided in embodiment 5 can achieve good image quality.

Embodiment 6

Figure 11:
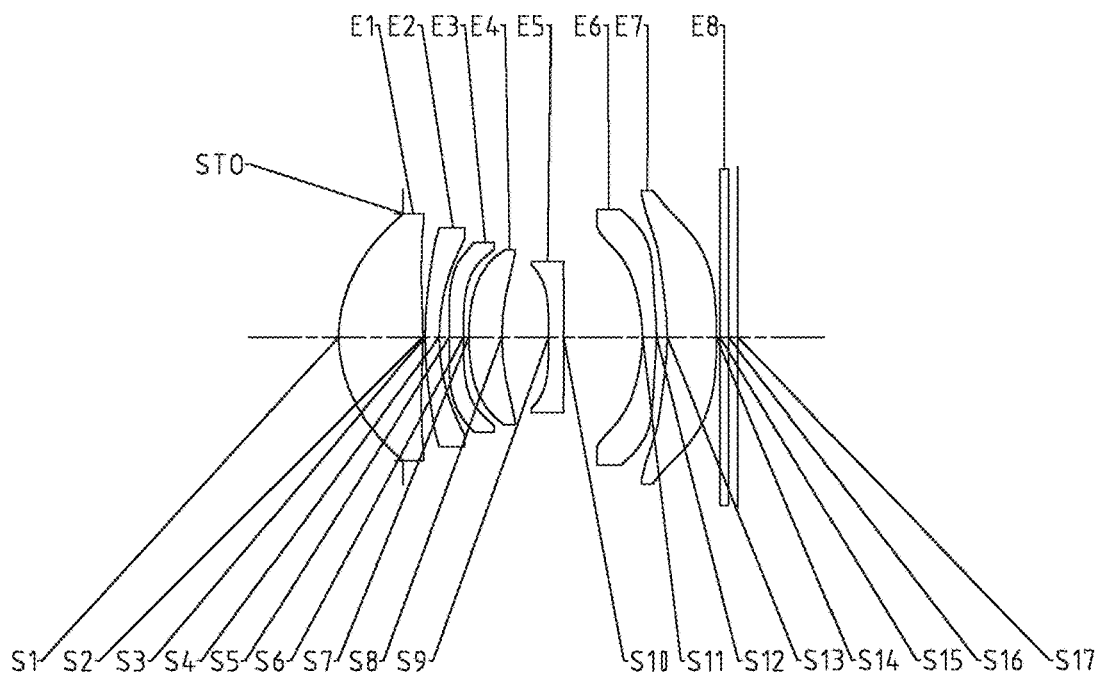
FIG. 11 is a schematic structural view of an optical imaging lens assembly according to embodiment 6 of the present disclosure.

An optical imaging lens assembly according to embodiment 6 of the present disclosure is described below with reference to FIG. 11 to FIG. 12D. FIG. 11 is a schematic structural view of the optical imaging lens assembly according to embodiment 6 of the present disclosure.

As shown in FIG. 11, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a concave surface, and an image-side surface S10 thereof is a concave surface. The sixth lens E6 has negative refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a convex surface. The optical filter E8 has an object-side surface S15 and an image-side surface S16. Light from an object sequentially passes through the respective surfaces S1 to S16 and is finally imaged on the imaging plane S17.

Table 16 shows surface type, radius of curvature, thickness, material and conic coefficient of each lens of the optical imaging lens assembly in embodiment 6, wherein the units for the radius of curvature and the thickness are millimeter (mm).

TABLE 16

| Surface number | Surface type | Radius of curvature | Thickness | Material | | Conic coefficient |
|---|---|---|---|---|---|---|
| | | | | Refractive index | Abbe number | |
| OBJ | spherical | infinite | infinite | | | |
| STO | spherical | infinite | −0.9070 | | | |
| S1 | aspheric | 1.9033 | 1.1025 | 1.55 | 56.1 | 0.0071 |
| S2 | aspheric | −11.5095 | 0.0334 | | | −99.0000 |
| S3 | aspheric | 5.5694 | 0.2000 | 1.67 | 20.4 | 8.3024 |
| S4 | aspheric | 2.3374 | 0.1412 | | | 0.4855 |
| S5 | aspheric | 24.6387 | 0.2575 | 1.67 | 20.4 | −98.9967 |
| S6 | aspheric | 27.9844 | 0.0300 | | | 72.1497 |
| S7 | aspheric | 3.6510 | 0.5703 | 1.55 | 56.1 | 5.3016 |
| S8 | aspheric | 3.5283 | 0.6371 | | | −2.0804 |
| S9 | aspheric | −499.8546 | 0.2000 | 1.61 | 28.3 | −99.0000 |
| S10 | aspheric | 10.9675 | 1.0270 | | | 59.8438 |
| S11 | aspheric | −1.9572 | 0.2000 | 1.55 | 56.1 | 0.1145 |
| S12 | aspheric | −2.4026 | 0.2119 | | | −47.5857 |
| S13 | aspheric | −2.2572 | 0.6892 | 1.67 | 20.4 | −32.5855 |
| S14 | aspheric | −18.9668 | 0.0306 | | | 79.7738 |
| S15 | spherical | infinite | 0.1200 | 1.52 | 64.2 | |
| S16 | spherical | infinite | 0.0994 | | | |
| S17 | spherical | infinite | | | | |

As can be seen from Table 16, in embodiment 6, the object-side surface and the image-side surface of any one of the first lens E1 to the seventh lens E7 are aspheric. Table 17 below shows high-order coefficients applicable to each aspheric surface in embodiment 6, wherein the surface type of each aspheric surface may be defined by the formula (1) given above in embodiment 1.

TABLE 17

| Surface number | A4 | A6 | A8 | A10 | A12 | A14 | A16 | A18 | A20 |
|---|---|---|---|---|---|---|---|---|---|
| S1 | −7.1400E−03 | 4.7800E−03 | −1.8280E−02 | 2.8262E−02 | −2.5240E−02 | 1.3155E−02 | −3.9800E−03 | 6.3800E−04 | −4.2000E−05 |
| S2 | 4.6839E−02 | −8.5810E−02 | 2.5225E−01 | −3.7954E−01 | 3.2560E−01 | −1.6921E−01 | 5.2790E−02 | −9.1100E−03 | 6.7000E−04 |
| S3 | −2.8900E−03 | −1.5224E−01 | 5.0556E−01 | −8.1362E−01 | 7.6827E−01 | −4.4572E−01 | 1.5606E−01 | −3.0200E−02 | 2.4780E−03 |
| S4 | −2.5310E−02 | 9.2674E−02 | −2.4634E−01 | 3.5391E−01 | −2.7815E−01 | 9.9679E−02 | 6.7040E−03 | −1.5210E−02 | 3.0110E−03 |
| S5 | 8.1203E−02 | 2.9809E−01 | −9.6227E−01 | 1.7655E+00 | −2.0320E+00 | 1.4589E+00 | −6.2231E−01 | 1.4341E−01 | −1.3850E−02 |
| S6 | 6.6055E−02 | 4.1989E−01 | −1.2419E+00 | 2.5555E+00 | −3.5636E+00 | 3.1481E+00 | −1.6223E+00 | 4.3616E−01 | −4.6850E−02 |
| S7 | 2.4201E−02 | 1.9426E−01 | −4.9586E−01 | 1.1441E+00 | −2.0955E+00 | 2.4535E+00 | −1.6496E+00 | 5.8074E−01 | −8.2950E−02 |
| S8 | −7.0800E−03 | −1.0275E−01 | 3.4118E−01 | −5.9449E−01 | 4.4265E−01 | 6.3773E−02 | −3.3597E−01 | 2.1333E−01 | −4.5330E−02 |
| S9 | −1.5514E−01 | −1.1020E−02 | −7.2296E−01 | 3.1077E+00 | −7.4521E+00 | 1.0887E+01 | −9.4691E+00 | 4.4912E+00 | −8.9048E−01 |
| S10 | −8.7480E−02 | 6.4475E−02 | −7.5596E−01 | 2.7765E+00 | −5.5566E+00 | 6.8551E+00 | −5.0997E+00 | 2.0962E+00 | −3.6512E−01 |
| S11 | 2.0292E−01 | −1.7203E−01 | 1.9602E−01 | −7.1023E−01 | 1.1539E+00 | −9.2701E−01 | 3.9720E−01 | −8.6720E−02 | 7.5650E−03 |
| S12 | −8.3100E−03 | 4.2898E−01 | −8.1604E−01 | 7.1197E−01 | −3.5929E−01 | 1.0810E−01 | −1.8270E−02 | 1.4020E−03 | −1.5000E−05 |
| S13 | −8.7220E−02 | 1.7174E−01 | −6.2100E−02 | −7.1280E−02 | 7.3016E−02 | −2.8330E−02 | 5.6490E−03 | −5.8000E−04 | 2.3600E−05 |
| S14 | −2.0509E−01 | 2.9814E−01 | −3.5526E−01 | 2.8006E−01 | −1.4210E−01 | 4.4878E−02 | −8.4000E−03 | 8.4800E−04 | −3.5000E−05 |

Table 18 shows effective focal lengths f1 to f7 of the lenses, a total effective focal length f, a total optical length TTL, half of a diagonal length ImgH of an effective pixel area on the imaging plane S17 and half of a maximal field-of-view angle HFOV of the optical imaging lens assembly in embodiment 6.

TABLE 18

| | |
|---|---|
| f1 (mm) | 3.08 |
| f2 (mm) | −6.20 |
| f3 (mm) | 300.00 |
| f4 (mm) | 299.99 |
| f5 (mm) | −17.68 |
| f6 (mm) | −22.98 |
| f7 (mm) | −3.91 |
| f (mm) | 6.15 |
| TTL (mm) | 5.55 |
| ImgH (mm) | 2.38 |
| HFOV (°) | 21.0 |

Figure 12A:
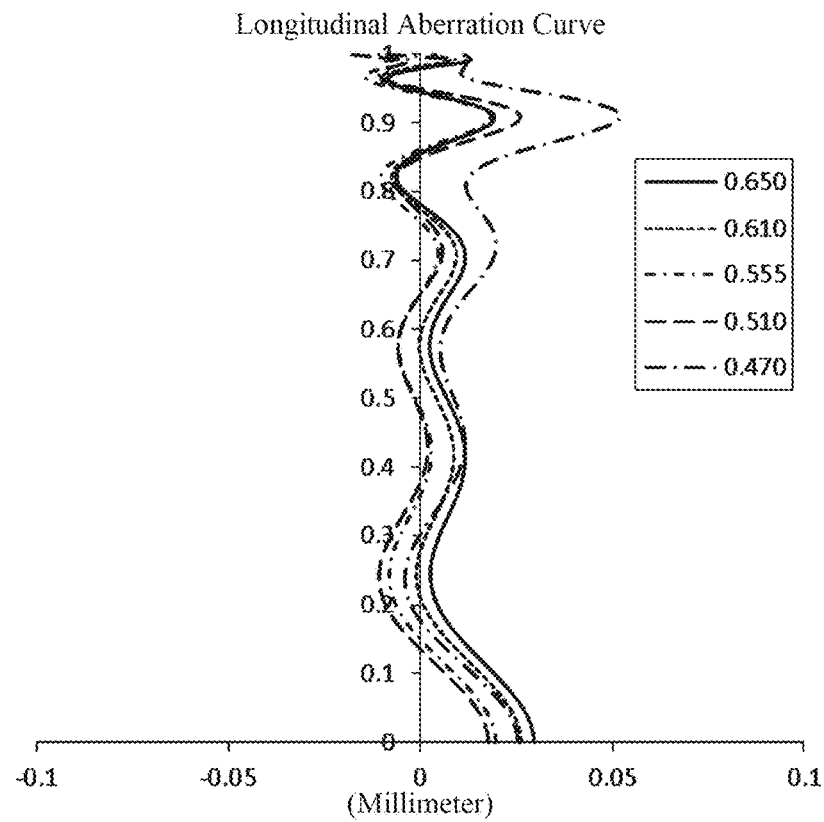
FIGS. 12A-12D illustrate a longitudinal aberration curve, an astigmatic curve, a distortion curve and a lateral color curve of the optical imaging lens assembly according to embodiment 6, respectively.
Figure 12B:
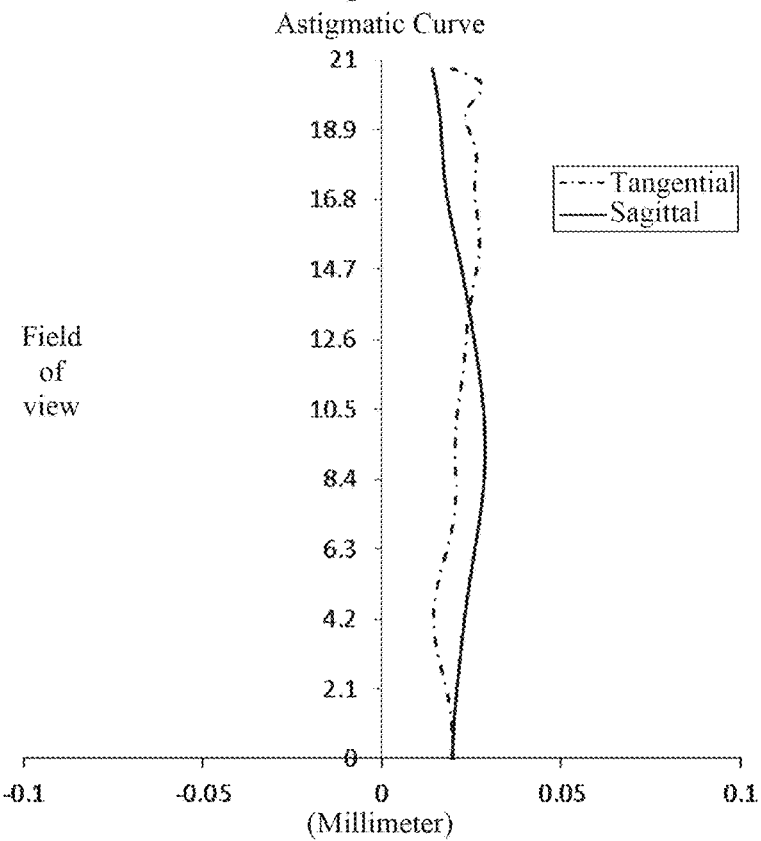
Figure 12C:
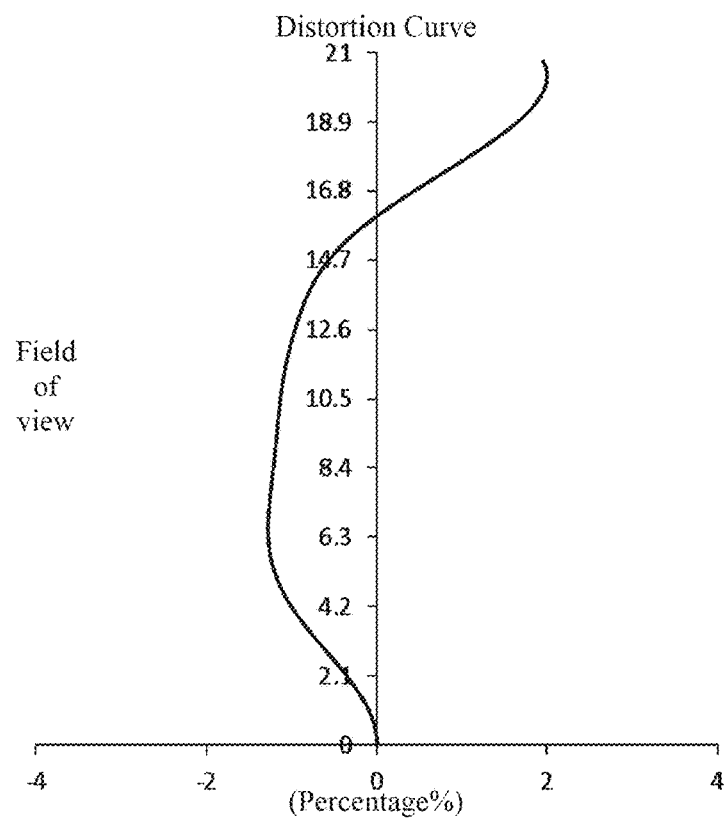
Figure 12D:
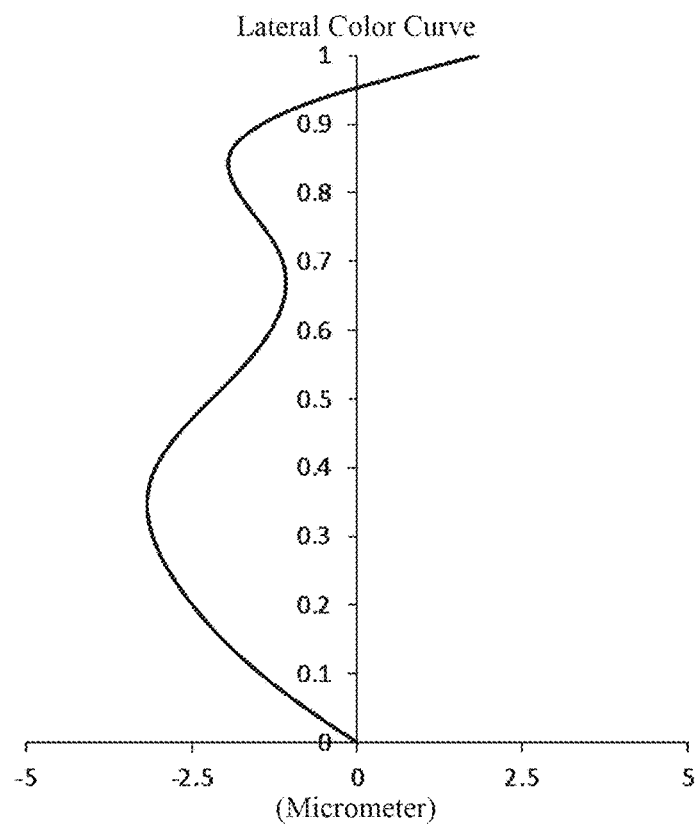

FIG. 12A illustrates a longitudinal aberration curve of the optical imaging lens assembly according to embodiment 6, representing deviations of focal points converged by light of different wavelengths after passing through the optical imaging lens assembly. FIG. 12B illustrates an astigmatic curve of the optical imaging lens assembly according to embodiment 6, representing a curvature of a tangential plane and a curvature of a sagittal plane. FIG. 12C illustrates a distortion curve of the optical imaging lens assembly according to embodiment 6, representing amounts of distortion corresponding to different field-of-view angle. FIG. 12D illustrates a lateral color curve of the optical imaging lens assembly according to embodiment 6, representing deviations of different image heights on an imaging plane after light passes through the optical imaging lens assembly. It can be seen from FIG. 12A to FIG. 12D that the optical imaging lens assembly provided in embodiment 6 can achieve good image quality.

Embodiment 7

Figure 13:
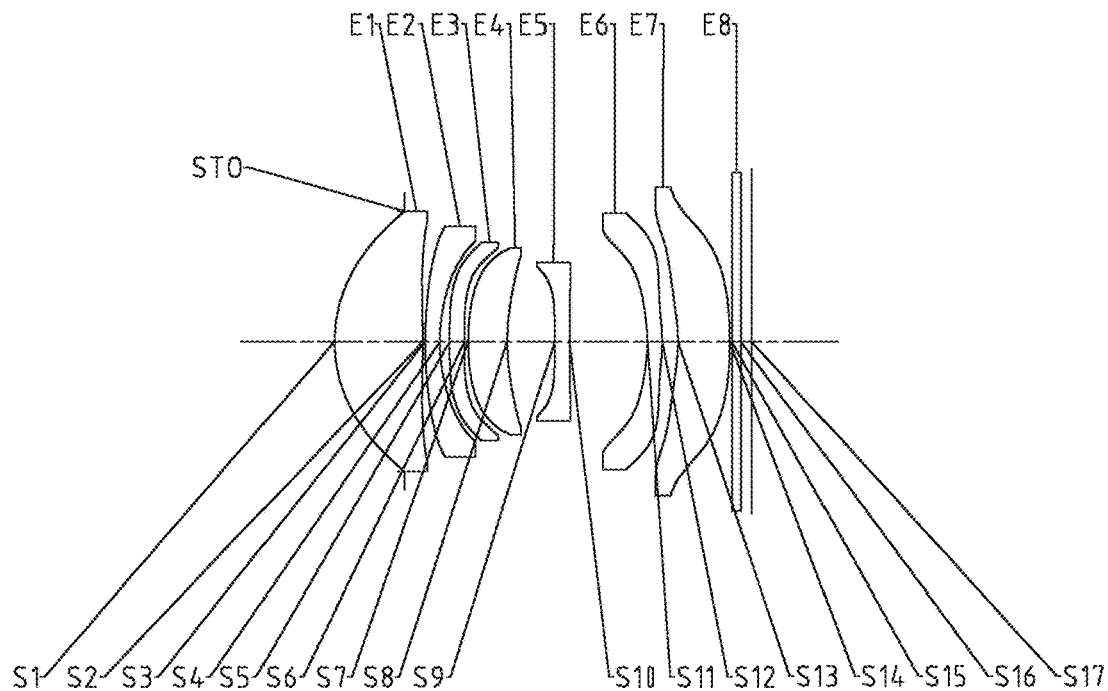
FIG. 13 is a schematic structural view of an optical imaging lens assembly according to embodiment 7 of the present disclosure.

An optical imaging lens assembly according to embodiment 7 of the present disclosure is described below with reference to FIG. 13 to FIG. 14D. FIG. 13 is a schematic structural view of the optical imaging lens assembly according to embodiment 7 of the present disclosure.

As shown in FIG. 13, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a convex surface. The optical filter E8 has an object-side surface S15 and an image-side surface S16. Light from an object sequentially passes through the respective surfaces S1 to S16 and is finally imaged on the imaging plane S17.

Table 19 shows surface type, radius of curvature, thickness, material and conic coefficient of each lens of the optical imaging lens assembly in embodiment 7, wherein the units for the radius of curvature and the thickness are millimeter (mm).

TABLE 19

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.9500 | | | |
| S1 | aspheric | 1.9157 | 1.1985 | 1.55 | 56.1 | 0.0125 |
| S2 | aspheric | −11.1454 | 0.0302 | | | −83.6451 |
| S3 | aspheric | 5.4598 | 0.2000 | 1.67 | 20.4 | 8.4415 |
| S4 | aspheric | 2.4099 | 0.1325 | | | 0.7236 |
| S5 | aspheric | 20.0098 | 0.2000 | 1.67 | 20.4 | −81.5588 |
| S6 | aspheric | 18.0275 | 0.0522 | | | −98.9817 |
| S7 | aspheric | 3.5225 | 0.5271 | 1.55 | 56.1 | 5.2365 |
| S8 | aspheric | 3.0437 | 0.6377 | | | −1.2506 |
| S9 | aspheric | 54.2770 | 0.2000 | 1.61 | 28.3 | 97.9472 |
| S10 | aspheric | 7.5689 | 1.0579 | | | 42.1384 |
| S11 | aspheric | −1.9724 | 0.2000 | 1.55 | 56.1 | 0.1115 |
| S12 | aspheric | −2.0284 | 0.2150 | | | −35.0919 |
| S13 | aspheric | −2.0220 | 0.6990 | 1.67 | 20.4 | −30.3228 |
| S14 | aspheric | −8.5166 | 0.0301 | | | −94.9264 |
| S15 | spherical | infinite | 0.1200 | 1.52 | 64.2 | |
| S16 | spherical | infinite | 0.1498 | | | |
| S17 | spherical | infinite | | | | |

As can be seen from Table 19, in embodiment 7, the object-side surface and the image-side surface of any one of the first lens E1 to the seventh lens E7 are aspheric. Table 20 below shows high-order coefficients applicable to each aspheric surface in embodiment 7, wherein the surface type of each aspheric surface may be defined by the formula (1) given above in embodiment 1.

TABLE 20

| Surface number | A4 | A6 | A8 | A10 | A12 | A14 | A16 | A18 | A20 |
|---|---|---|---|---|---|---|---|---|---|
| S1 | −7.1200E−03 | 7.3240E−03 | −2.2640E−02 | 3.1192E−02 | −2.5380E−02 | 1.2295E−02 | −3.5200E−03 | 5.4500E−04 | −3.5000E−05 |
| S2 | 4.4352E−02 | −8.6480E−02 | 2.4752E−01 | −3.6587E−01 | 3.0848E−01 | −1.5735E−01 | 4.8127E−02 | −8.1300E−03 | 5.8500E−04 |
| S3 | −1.0280E−02 | −1.2056E−01 | 4.0837E−01 | −6.3973E−01 | 5.9057E−01 | −3.3773E−01 | 1.1716E−01 | −2.2510E−02 | 1.8350E−03 |
| S4 | −3.3220E−02 | 1.3169E−01 | −2.7599E−01 | 1.5480E−01 | 2.8243E−01 | −5.1445E−01 | 3.3824E−01 | −1.0178E−01 | 1.1585E−02 |
| S5 | 8.1350E−02 | 3.0247E−01 | −8.0189E−01 | 1.0930E+00 | −8.4911E−01 | 3.6707E−01 | −7.3590E−02 | 2.6190E−03 | 3.6000E−04 |
| S6 | 6.6297E−02 | 3.5820E−01 | −8.6976E−01 | 1.5931E+00 | −2.1435E+00 | 1.8495E+00 | −8.8425E−01 | 1.9677E−01 | −1.3270E−02 |
| S7 | 2.2428E−02 | 8.2451E−02 | 4.8373E−01 | −2.6018E−01 | 1.1283E−01 | 2.7480E−01 | −3.3274E−01 | 1.3666E−01 | −1.9130E−02 |
| S8 | −7.7100E−03 | −7.4820E−02 | 2.0416E−01 | −1.7606E−01 | −4.2000E−01 | 1.1995E+00 | −1.2376E+00 | 6.0613E−01 | −1.1725E−01 |
| S9 | −1.7448E−01 | −5.0910E−02 | −1.8500E−02 | −4.7217E−01 | 2.3455E+00 | −4.7905E+00 | 5.1918E+00 | −2.9280E+00 | 6.7696E−01 |
| S10 | −1.1574E−01 | 1.1563E−01 | −9.5067E−01 | 3.4937E+00 | −7.3511E+00 | 9.6634E+00 | −7.7165E+00 | 3.4183E+00 | −6.4396E−01 |
| S11 | 2.8653E−01 | −4.4390E−01 | 7.7650E−01 | −1.6499E+00 | 2.2075E+00 | −1.6867E+00 | 7.2747E−01 | −1.6485E−01 | 1.5255E−02 |
| S12 | 8.1539E−02 | 2.4598E−01 | −5.8954E−01 | 4.8045E−01 | −1.7549E−01 | 8.2280E−03 | 1.4741E−02 | −4.6200E−03 | 4.4600E−04 |
| S13 | −6.8290E−02 | 1.7967E−01 | −1.0967E−01 | −2.1810E−02 | 4.7139E−02 | −2.0410E−02 | 4.2090E−03 | −4.3000E−04 | 1.7200E−05 |
| S14 | −1.8765E−01 | 2.8450E−01 | −3.5933E−01 | 2.9471E−01 | −1.5444E−01 | 5.0369E−02 | −9.8000E−03 | 1.0380E−03 | −4.6000E−05 |

Table 21 shows effective focal lengths f1 to f7 of the lenses, a total effective focal length f, a total optical length TTL, half of a diagonal length ImgH of an effective pixel area on the imaging plane S17 and half of a maximal field-of-view angle HFOV of the optical imaging lens assembly in embodiment 7.

TABLE 21

| | |
|---|---|
| f1 (mm) | 3.09 |
| f2 (mm) | −6.65 |
| f3 (mm) | −284.53 |
| f4 (mm) | −67.12 |
| f5 (mm) | −14.51 |
| f6 (mm) | 499.95 |
| f7 (mm) | −4.16 |
| f (mm) | 6.40 |
| TTL (mm) | 5.65 |
| ImgH (mm) | 2.33 |
| HFOV (°) | 19.8 |

Figure 14A:
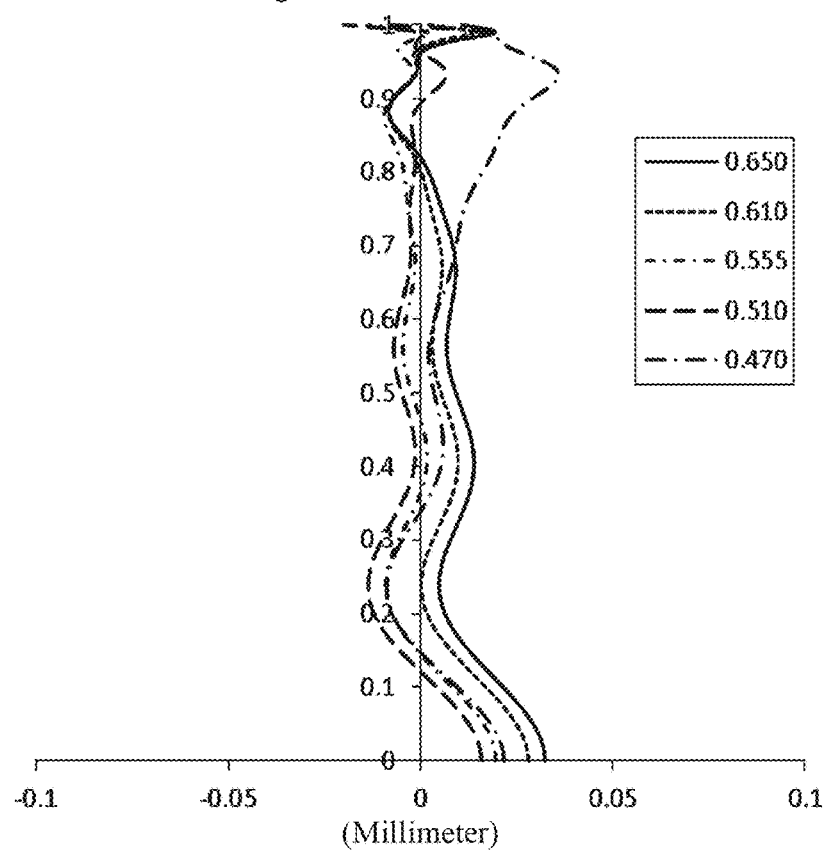
FIGS. 14A-14D illustrate a longitudinal aberration curve, an astigmatic curve, a distortion curve and a lateral color curve of the optical imaging lens assembly according to embodiment 7, respectively.
Figure 14B:
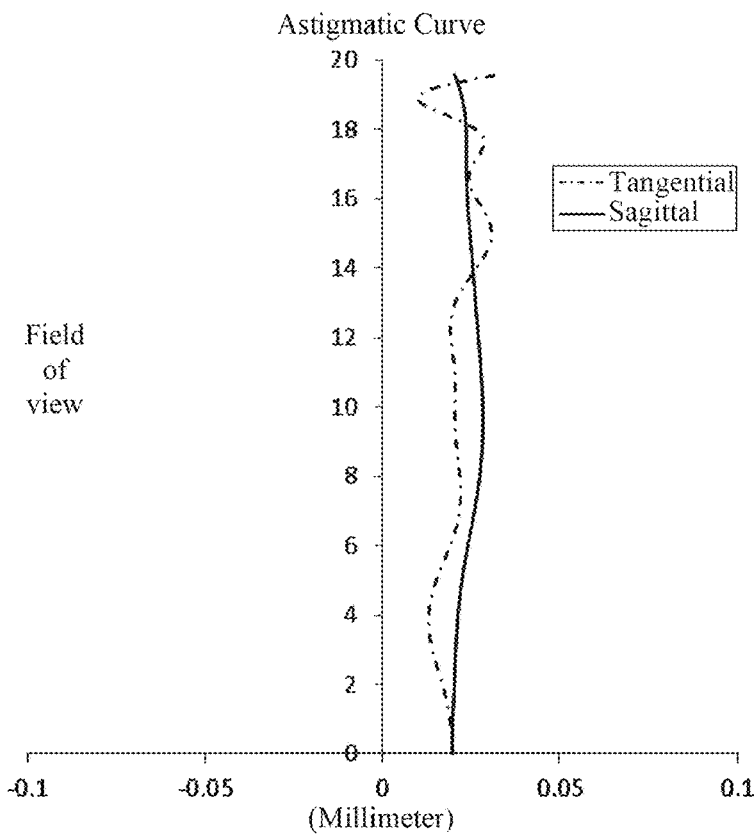
Figure 14C:
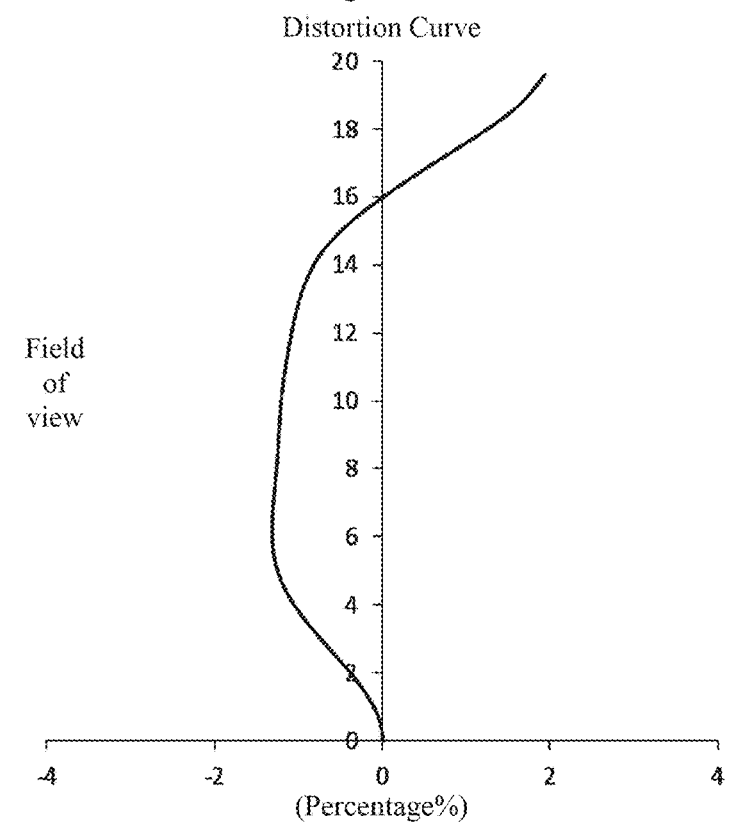
Figure 14D:
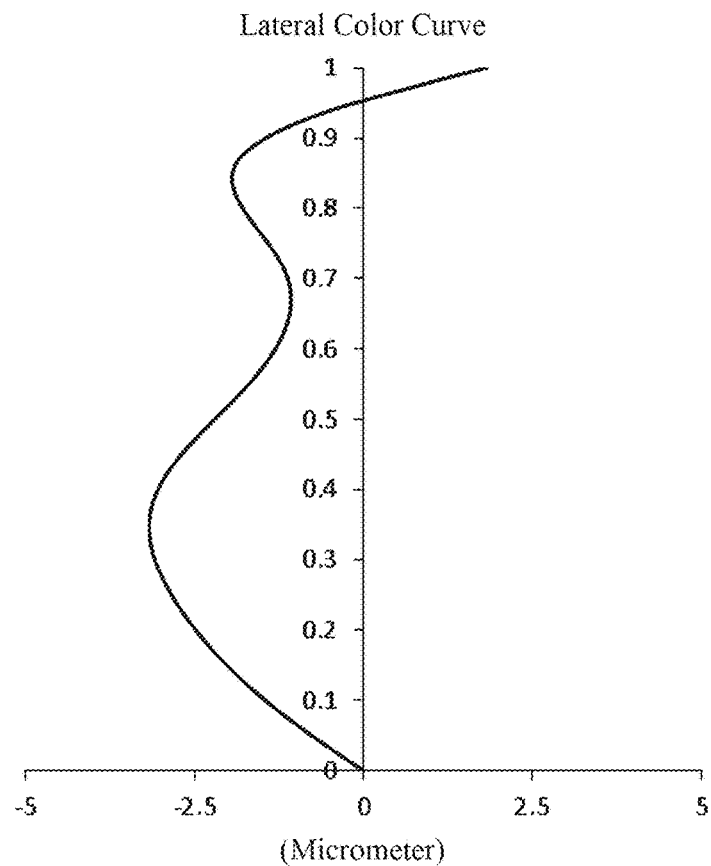

FIG. 14A illustrates a longitudinal aberration curve of the optical imaging lens assembly according to embodiment 7, representing deviations of focal points converged by light of different wavelengths after passing through the optical imaging lens assembly. FIG. 14B illustrates an astigmatic curve of the optical imaging lens assembly according to embodiment 7, representing a curvature of a tangential plane and a curvature of a sagittal plane. FIG. 14C illustrates a distortion curve of the optical imaging lens assembly according to embodiment 7, representing amounts of distortion corresponding to different field-of-view angle. FIG. 14D illustrates a lateral color curve of the optical imaging lens assembly according to embodiment 7, representing deviations of different image heights on an imaging plane after light passes through the optical imaging lens assembly. It can be seen from FIG. 14A to FIG. 14D that the optical imaging lens assembly provided in embodiment 7 can achieve good image quality.

Embodiment 8

Figure 15:
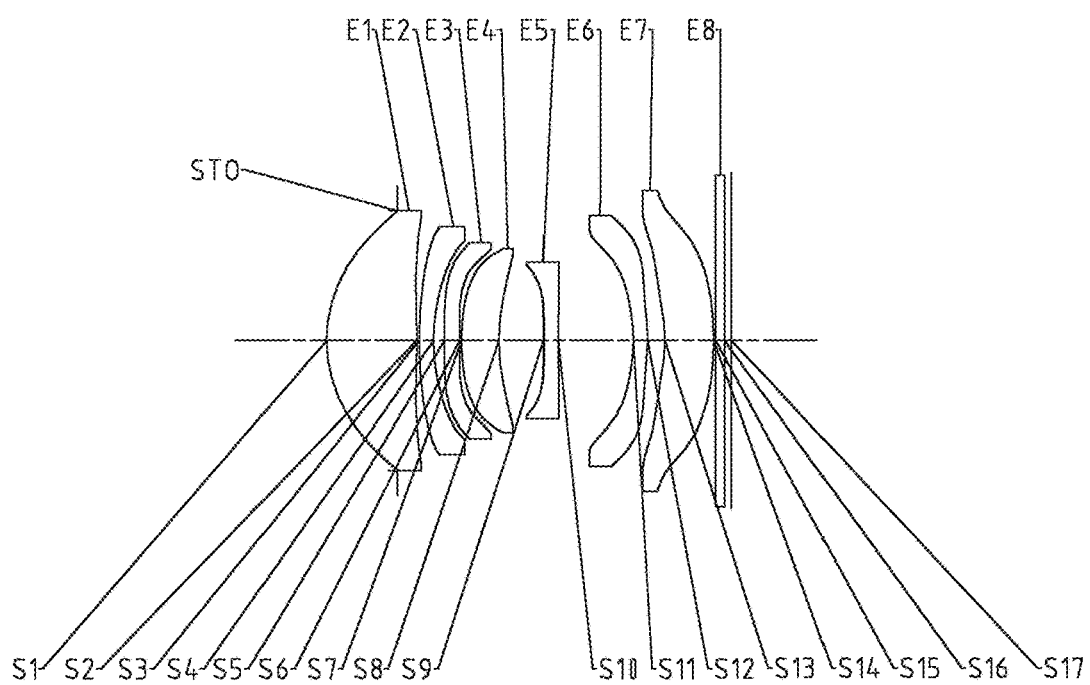
FIG. 15 is a schematic structural view of an optical imaging lens assembly according to embodiment 8 of the present disclosure.

An optical imaging lens assembly according to embodiment 8 of the present disclosure is described below with reference to FIG. 15 to FIG. 16D. FIG. 15 is a schematic structural view of the optical imaging lens assembly according to embodiment 8 of the present disclosure.

As shown in FIG. 15, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a convex surface. The optical filter E8 has an object-side surface S15 and an image-side surface S16. Light from an object sequentially passes through the respective surfaces S1 to S16 and is finally imaged on the imaging plane S17.

Table 22 shows surface type, radius of curvature, thickness, material and conic coefficient of each lens of the optical imaging lens assembly in embodiment 8, wherein the units for the radius of curvature and the thickness are millimeter (mm).

TABLE 22

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.9877 | | | |
| S1 | aspheric | 1.9214 | 1.2591 | 1.55 | 56.1 | 0.0044 |
| S2 | aspheric | −10.5603 | 0.0300 | | | −58.5335 |
| S3 | aspheric | 5.7414 | 0.2000 | 1.67 | 20.4 | 8.8267 |
| S4 | aspheric | 2.5366 | 0.1527 | | | 0.5459 |
| S5 | aspheric | −110.6229 | 0.2090 | 1.66 | 21.5 | 99.0000 |
| S6 | aspheric | −70.8838 | 0.0300 | | | −55.7460 |
| S7 | aspheric | 3.7222 | 0.5191 | 1.55 | 56.1 | 5.6406 |
| S8 | aspheric | 2.7237 | 0.6189 | | | −2.5094 |
| S9 | aspheric | 19.4037 | 0.2000 | 1.61 | 28.3 | 99.0000 |
| S10 | aspheric | 7.5292 | 1.0448 | | | 40.2594 |
| S11 | aspheric | −1.9849 | 0.2000 | 1.55 | 56.1 | 0.1234 |
| S12 | aspheric | −1.9942 | 0.2413 | | | −31.3738 |
| S13 | aspheric | −1.7017 | 0.6751 | 1.67 | 20.4 | −24.8401 |
| S14 | aspheric | −4.9436 | 0.0300 | | | −89.9411 |
| S15 | spherical | infinite | 0.1200 | 1.52 | 64.2 | |
| S16 | spherical | infinite | 0.1000 | | | |
| S17 | spherical | infinite | | | | |

As can be seen from Table 22, in embodiment 8, the object-side surface and the image-side surface of any one of the first lens E1 to the seventh lens E7 are aspheric. Table 23 below shows high-order coefficients applicable to each aspheric surface in embodiment 8, wherein the surface type of each aspheric surface may be defined by the formula (1) given above in embodiment 1.

TABLE 23

| Surface number | A4 | A6 | A8 | A10 | A12 | A14 | A16 | A18 | A20 |
|---|---|---|---|---|---|---|---|---|---|
| S1 | −7.4200E−03 | 9.8210E−03 | −2.8390E−02 | 3.8966E−02 | −3.1840E−02 | 1.5629E−02 | −4.5600E−03 | 7.2900E−04 | −5.0000E−05 |
| S2 | 4.0391E−02 | −7.7460E−02 | 2.4415E−01 | −3.8089E−01 | 3.3270E−01 | −1.7334E−01 | 5.3513E−02 | −9.0400E−03 | 6.4400E−04 |
| S3 | −1.3810E−02 | −1.2734E−01 | 4.9097E−01 | −8.3613E−01 | 8.2356E−01 | −4.9313E−01 | 1.7613E−01 | −3.4400E−02 | 2.8250E−03 |
| S4 | −6.1990E−02 | 2.0949E−01 | −6.5186E−01 | 1.1892E+00 | −1.3485E+00 | 1.0090E+00 | −4.9036E−01 | 1.3969E−01 | −1.7460E−02 |
| S5 | 7.2450E−02 | 2.8253E−01 | −9.7161E−01 | 1.9516E+00 | −2.5177E+00 | 2.0683E+00 | −1.0359E+00 | 2.8845E−01 | −3.4380E−02 |
| S6 | 1.4873E−01 | −1.3042E−01 | 8.2704E−01 | −1.5950E+00 | 1.4364E+00 | −6.9254E−01 | 2.6387E−01 | −1.0999E−01 | 2.3838E−02 |
| S7 | 8.9626E−02 | −4.2428E−01 | 1.9881E+00 | −4.2750E+00 | 5.0643E+00 | −3.4876E+00 | 1.3942E+00 | −3.0041E−01 | 2.7234E−02 |
| S8 | −1.0090E−02 | −1.5891E−01 | 6.7469E−01 | −1.5014E+00 | 1.8954E+00 | −1.3778E+00 | 5.2390E−01 | −6.4910E−02 | −8.4500E−03 |
| S9 | −1.7520E−01 | −8.4500E−03 | −4.7725E−01 | 1.8000E+00 | −3.8131E+00 | 5.0739E+00 | −4.1425E+00 | 1.8835E+00 | −3.6119E−01 |
| S10 | −1.1361E−01 | 7.6760E−02 | −7.7858E−01 | 2.9678E+00 | −6.1847E+00 | 7.9064E+00 | −6.0792E+00 | 2.5769E+00 | −4.6203E−01 |
| S11 | 2.5155E−01 | −4.1984E−01 | 7.4885E−01 | −1.5129E+00 | 1.9543E+00 | −1.4593E+00 | 6.1851E−01 | −1.3808E−01 | 1.2602E−02 |
| S12 | 7.7719E−02 | 1.7768E−01 | −4.1708E−01 | 2.6710E−01 | −1.5840E−02 | −6.5950E−02 | 3.6213E−02 | −8.0900E−03 | 6.8600E−04 |
| S13 | −7.1810E−02 | 2.1726E−01 | −1.8217E−01 | 4.7342E−02 | 9.8950E−03 | −8.5900E−03 | 2.0250E−03 | −2.1000E−04 | 8.5100E−06 |
| S14 | −1.4418E−01 | 1.6692E−01 | −1.7158E−01 | 1.2019E−01 | −5.6640E−02 | 1.6792E−02 | −2.8800E−03 | 2.5500E−04 | −8.7000E−06 |

Table 24 shows effective focal lengths f1 to f7 of the lenses, a total effective focal length f, a total optical length TTL, half of a diagonal length ImgH of an effective pixel area on the imaging plane S17 and half of a maximal field-of-view angle HFOV of the optical imaging lens assembly in embodiment 8.

TABLE 24

| | |
|---|---|
| f1 (mm) | 3.09 |
| f2 (mm) | −6.99 |
| f3 (mm) | 300.00 |
| f4 (mm) | −22.78 |
| f5 (mm) | −20.40 |
| f6 (mm) | 118.05 |
| f7 (mm) | −4.25 |
| f (mm) | 6.33 |
| TTL (mm) | 5.63 |
| ImgH (mm) | 2.32 |
| HFOV (°) | 19.9 |

Figure 16A:
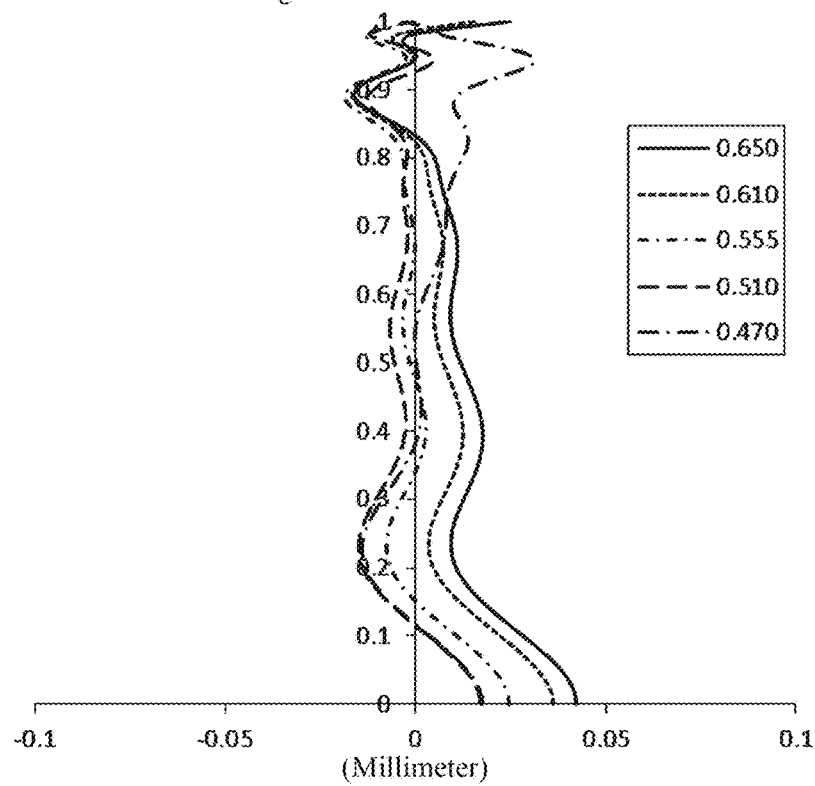
FIGS. 16A-16D illustrate a longitudinal aberration curve, an astigmatic curve, a distortion curve and a lateral color curve of the optical imaging lens assembly according to embodiment 8, respectively.
Figure 16B:
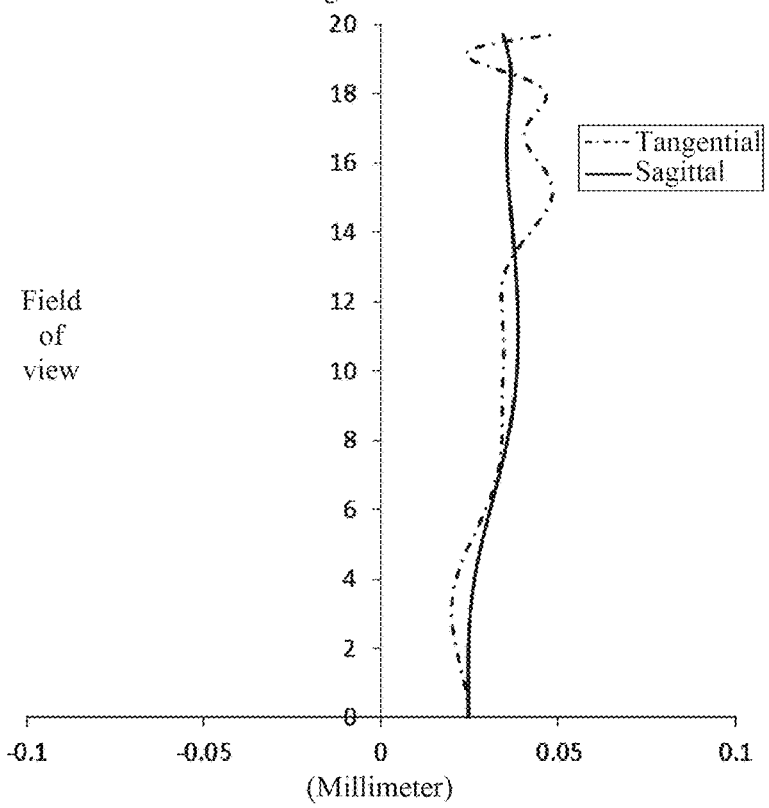
Figure 16C:
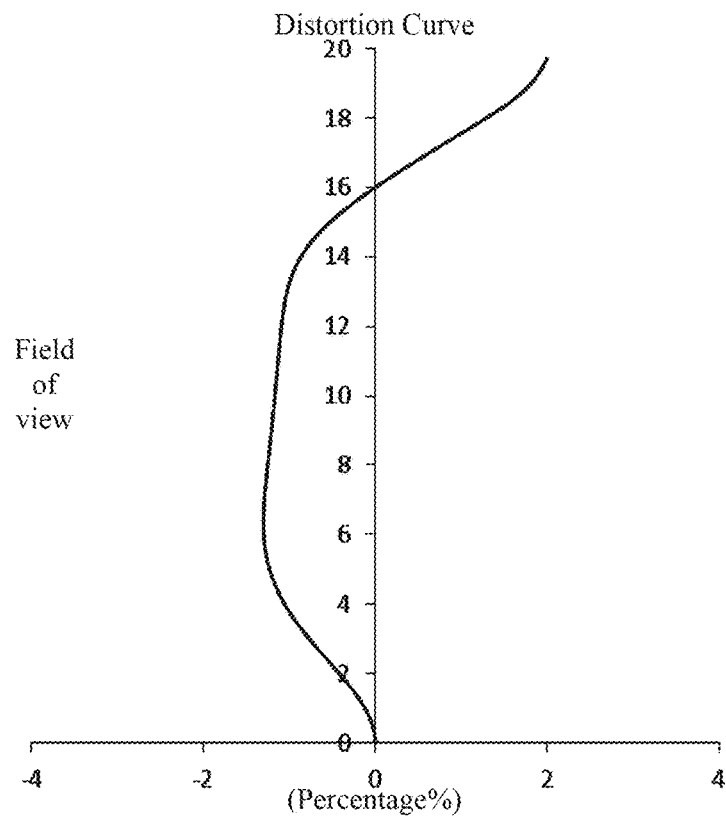
Figure 16D:
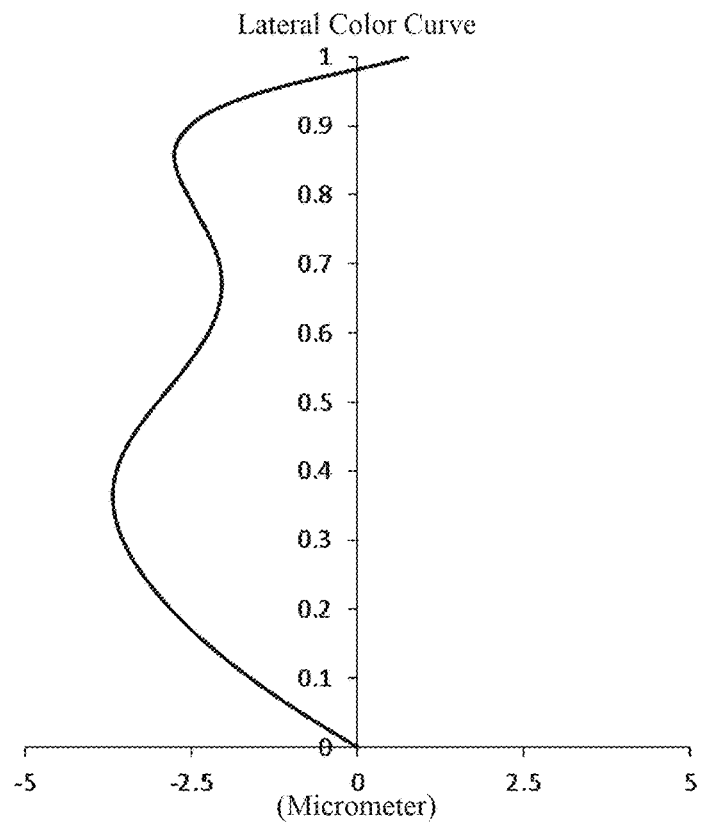

FIG. 16A illustrates a longitudinal aberration curve of the optical imaging lens assembly according to embodiment 8, representing deviations of focal points converged by light of different wavelengths after passing through the optical imaging lens assembly. FIG. 16B illustrates an astigmatic curve of the optical imaging lens assembly according to embodiment 8, representing a curvature of a tangential plane and a curvature of a sagittal plane. FIG. 16C illustrates a distortion curve of the optical imaging lens assembly according to embodiment 8, representing amounts of distortion corresponding to different field-of-view angle. FIG. 16D illustrates a lateral color curve of the optical imaging lens assembly according to embodiment 8, representing deviations of different image heights on an imaging plane after light passes through the optical imaging lens assembly. It can be seen from FIG. 16A to FIG. 16D that the optical imaging lens assembly provided in embodiment 8 can achieve good image quality.

Embodiment 9

Figure 17:
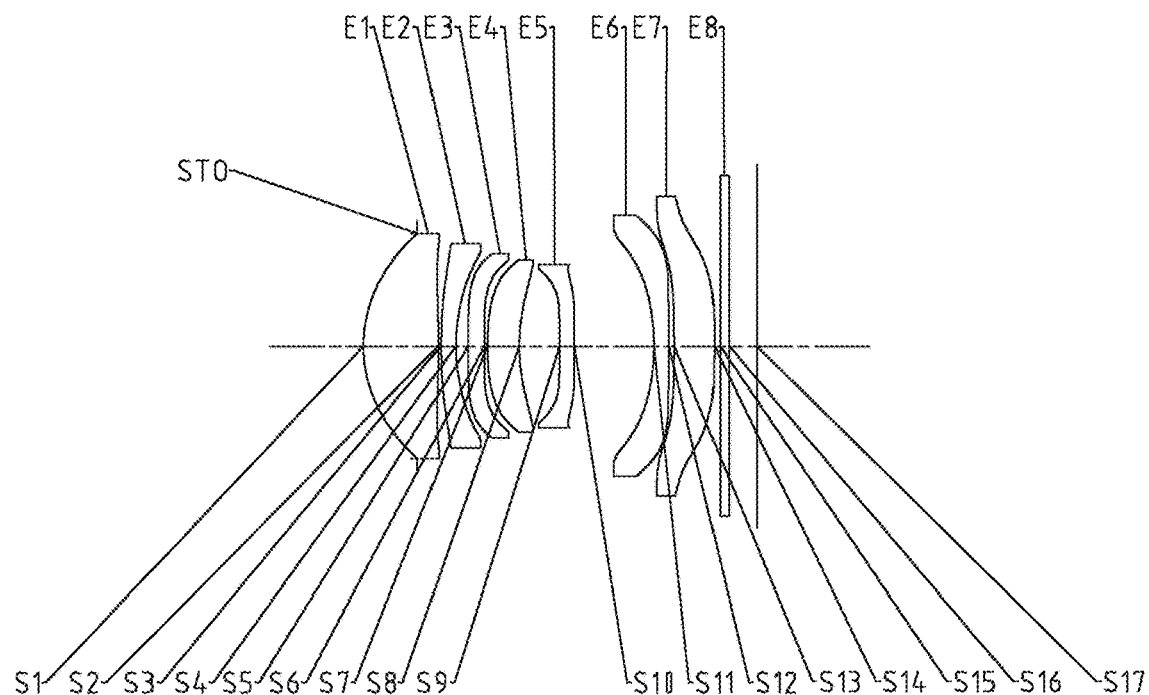
FIG. 17 is a schematic structural view of an optical imaging lens assembly according to embodiment 9 of the present disclosure.

An optical imaging lens assembly according to embodiment 9 of the present disclosure is described below with reference to FIG. 17 to FIG. 18D. FIG. 17 is a schematic structural view of the optical imaging lens assembly according to embodiment 9 of the present disclosure.

As shown in FIG. 17, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 25 shows surface type, radius of curvature, thickness, material and conic coefficient of each lens of the optical imaging lens assembly in embodiment 9, wherein the units for the radius of curvature and the thickness are millimeter (mm).

TABLE 25

| | | | | Material | | |
|---|---|---|---|---|---|---|
| Surface number | Surface type | Radius of curvature | Thickness | Refractive index | Abbe number | Conic coefficient |
| OBJ | spherical | infinite | infinite | | | |
| STO | spherical | infinite | −0.7283 | | | |
| S1 | aspheric | 1.8075 | 1.0122 | 1.55 | 56.1 | 0.0243 |
| S2 | aspheric | −9.8032 | 0.0300 | | | −34.1369 |
| S3 | aspheric | 6.0674 | 0.2000 | 1.67 | 20.4 | 8.6780 |
| S4 | aspheric | 2.5979 | 0.1670 | | | −0.0207 |
| S5 | aspheric | −11.5944 | 0.2188 | 1.64 | 23.8 | −99.0000 |
| S6 | aspheric | −10.2150 | 0.0383 | | | −72.3578 |
| S7 | aspheric | 4.0121 | 0.4293 | 1.55 | 56.1 | 8.8954 |
| S8 | aspheric | 2.4149 | 0.5454 | | | −1.9906 |
| S9 | aspheric | 15.9947 | 0.2008 | 1.61 | 28.3 | −33.8718 |
| S10 | aspheric | 25.8099 | 1.0761 | | | −98.9990 |
| S11 | aspheric | −2.6913 | 0.2000 | 1.55 | 56.1 | 0.8400 |
| S12 | aspheric | 274.9400 | 0.0710 | | | 99.0000 |
| S13 | aspheric | 16.0565 | 0.5376 | 1.67 | 20.4 | 52.3677 |
| S14 | aspheric | 16.6435 | 0.0773 | | | 63.2817 |
| S15 | spherical | infinite | 0.1200 | 1.52 | 64.2 | |
| S16 | spherical | infinite | 0.3764 | | | |
| S17 | spherical | infinite | | | | |

As can be seen from Table 25, in embodiment 9, the object-side surface and the image-side surface of any one of the first lens E1 to the seventh lens E7 are aspheric. Table 26 below shows high-order coefficients applicable to each aspheric surface in embodiment 9, wherein the surface type of each aspheric surface may be defined by the formula (1) given above in embodiment 1.

TABLE 26

| Surface number | A4 | A6 | A8 | A10 | A12 | A14 | A16 | A18 | A20 |
|---|---|---|---|---|---|---|---|---|---|
| S1 | −5.7100E−03 | −8.8800E−03 | 1.0751E−02 | −8.4500E−03 | 8.7800E−04 | 1.6500E−03 | −5.2000E−04 | −1.2000E−04 | 4.8100E−05 |
| S2 | −4.2650E−02 | 3.2297E−01 | −6.9210E−01 | 8.8812E−01 | −7.3781E−01 | 3.9795E−01 | −1.3444E−01 | 2.5797E−02 | −2.1300E−03 |
| S3 | −9.2520E−02 | 2.5309E−01 | −3.6508E−01 | 2.6966E−01 | −9.8800E−03 | −1.6586E−01 | 1.3774E−01 | −4.7070E−02 | 6.0620E−03 |
| S4 | 4.3190E−03 | 1.1691E−02 | −4.2535E−01 | 1.5155E+00 | −2.3677E+00 | 1.9872E+00 | −9.2991E−01 | 2.2788E−01 | −2.2710E−02 |
| S5 | 2.5174E−01 | −2.1380E−01 | −7.9411E−01 | 3.9625E+00 | −7.5065E+00 | 7.8196E+00 | −4.6936E+00 | 1.5274E+00 | −2.0974E−01 |
| S6 | 3.2715E−01 | −3.7957E−01 | −6.5608E−01 | 5.6455E+00 | −1.3496E+01 | 1.6913E+01 | −1.1962E+01 | 4.5369E+00 | −7.2289E−01 |
| S7 | 1.3389E−01 | −3.4904E−01 | 7.1399E−01 | 1.3000E−01 | −2.6800E+00 | 4.6188E+00 | −3.7541E+00 | 1.5351E+00 | −2.5493E−01 |
| S8 | −6.4670E−02 | 7.6939E−02 | 1.6869E−01 | −1.1359E+00 | 3.0782E+00 | −4.8974E+00 | 4.5913E+00 | −2.3365E+00 | 4.9403E−01 |
| S9 | −1.8038E−01 | −1.0740E−02 | −6.6267E−01 | 2.9318E+00 | −7.9175E+00 | 1.3126E+01 | −1.3104E+01 | 7.1857E+00 | −1.6389E+00 |
| S10 | −1.0310E−01 | −4.5000E−02 | −6.6290E−02 | 4.0137E−01 | −8.7060E−01 | 1.2222E+00 | −1.0454E+00 | 5.1614E−01 | −1.1041E−01 |
| S11 | 1.3915E−01 | −4.0811E−01 | 6.7083E−01 | −8.1060E−01 | 7.2269E−01 | −4.4001E−01 | 1.6569E−01 | −3.4020E−02 | 2.8900E−03 |
| S12 | −1.0671E−01 | 3.8555E−01 | −6.0601E−01 | 4.6635E−01 | −1.9042E−01 | 3.3348E−02 | 2.5770E−03 | −1.9200E−03 | 2.1500E−04 |
| S13 | −3.6759E−01 | 8.3240E−01 | −1.0542E+00 | 7.6620E−01 | −3.4514E−01 | 1.0012E−01 | −1.8460E−02 | 1.9860E−03 | −9.5000E−05 |
| S14 | −3.0344E−01 | 4.3583E−01 | −4.6873E−01 | 3.3687E−01 | −1.6565E−01 | 5.4822E−02 | −1.1450E−02 | 1.3470E−03 | −6.8000E−05 |

Table 27 shows effective focal lengths f1 to f7 of the lenses, a total effective focal length f, a total optical length TTL, half of a diagonal length ImgH of an effective pixel area on the imaging plane S17 and half of a maximal field-of-view angle HFOV of the optical imaging lens assembly in embodiment 9.

TABLE 27

| | |
|---|---|
| f1 (mm) | 2.88 |
| f2 (mm) | −6.98 |
| f3 (mm) | 126.27 |
| f4 (mm) | −12.28 |
| f5 (mm) | 68.76 |
| f6 (mm) | −4.88 |
| f7 (mm) | 499.99 |
| f (mm) | 5.58 |
| TTL (mm) | 5.30 |
| ImgH (mm) | 2.45 |
| HFOV (°) | 23.6 |

Figure 18A:
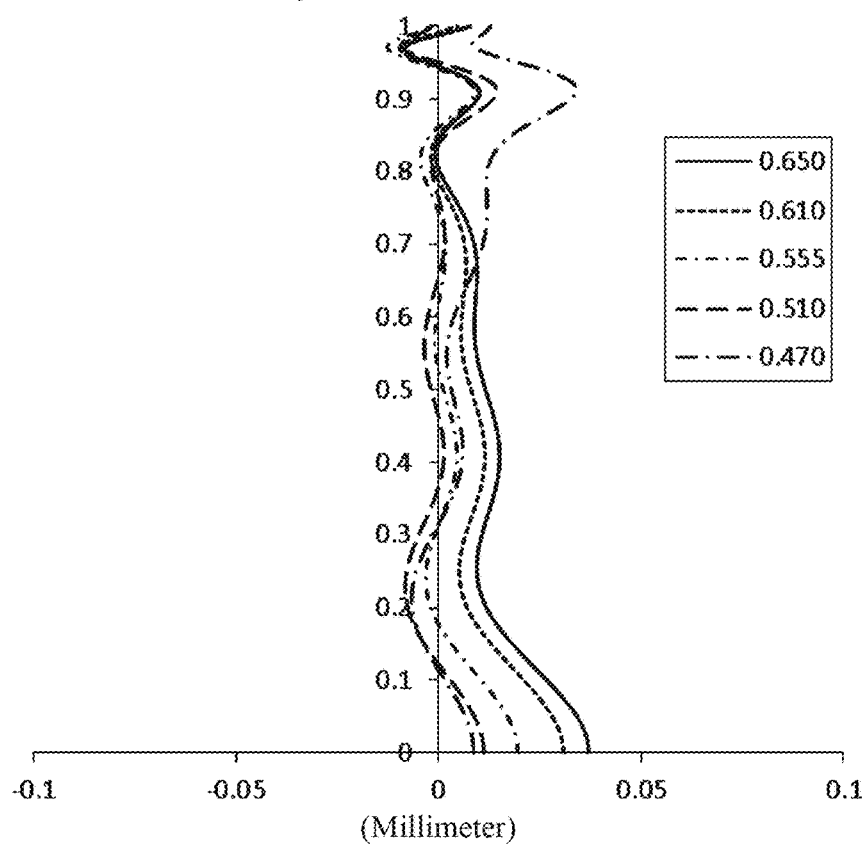
FIGS. 18A-18D illustrate a longitudinal aberration curve, an astigmatic curve, a distortion curve and a lateral color curve of the optical imaging lens assembly according to embodiment 9, respectively.
Figure 18B:
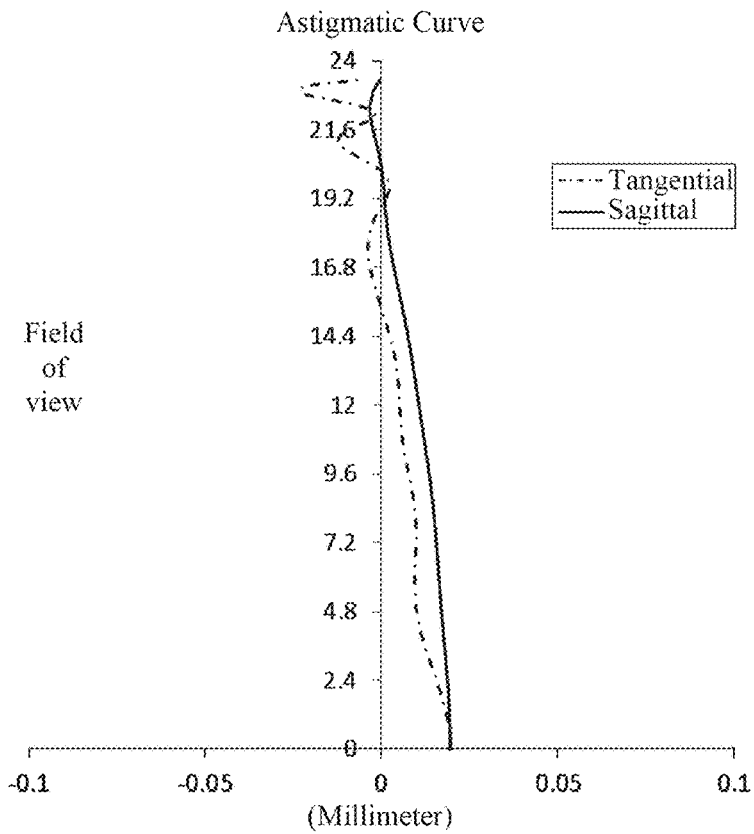
Figure 18C:
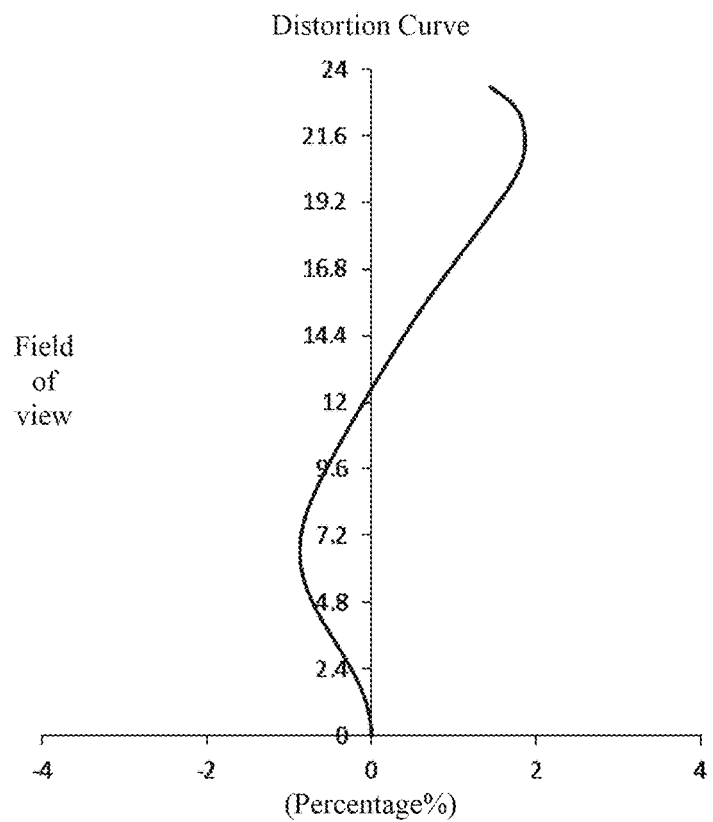
Figure 18D:
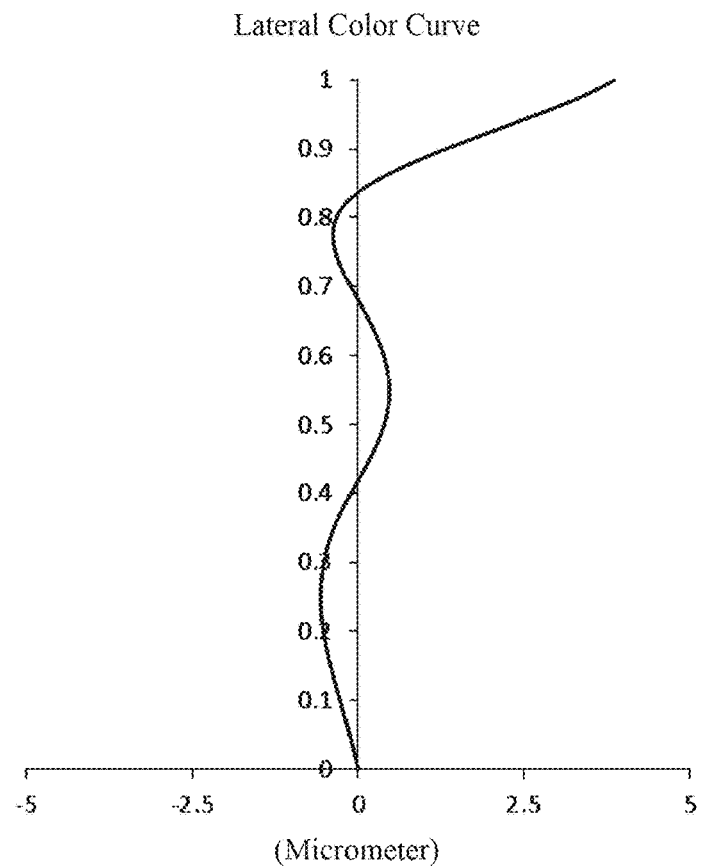

FIG. 18A illustrates a longitudinal aberration curve of the optical imaging lens assembly according to embodiment 9, representing deviations of focal points converged by light of different wavelengths after passing through the optical imaging lens assembly. FIG. 18B illustrates an astigmatic curve of the optical imaging lens assembly according to embodiment 9, representing a curvature of a tangential plane and a curvature of a sagittal plane. FIG. 18C illustrates a distortion curve of the optical imaging lens assembly according to embodiment 9, representing amounts of distortion corresponding to different field-of-view angle. FIG. 18D illustrates a lateral color curve of the optical imaging lens assembly according to embodiment 9, representing deviations of different image heights on an imaging plane after light passes through the optical imaging lens assembly. It can be seen from FIG. 18A to FIG. 18D that the optical imaging lens assembly provided in embodiment 9 can achieve good image quality.

Embodiment 10

Figure 19:
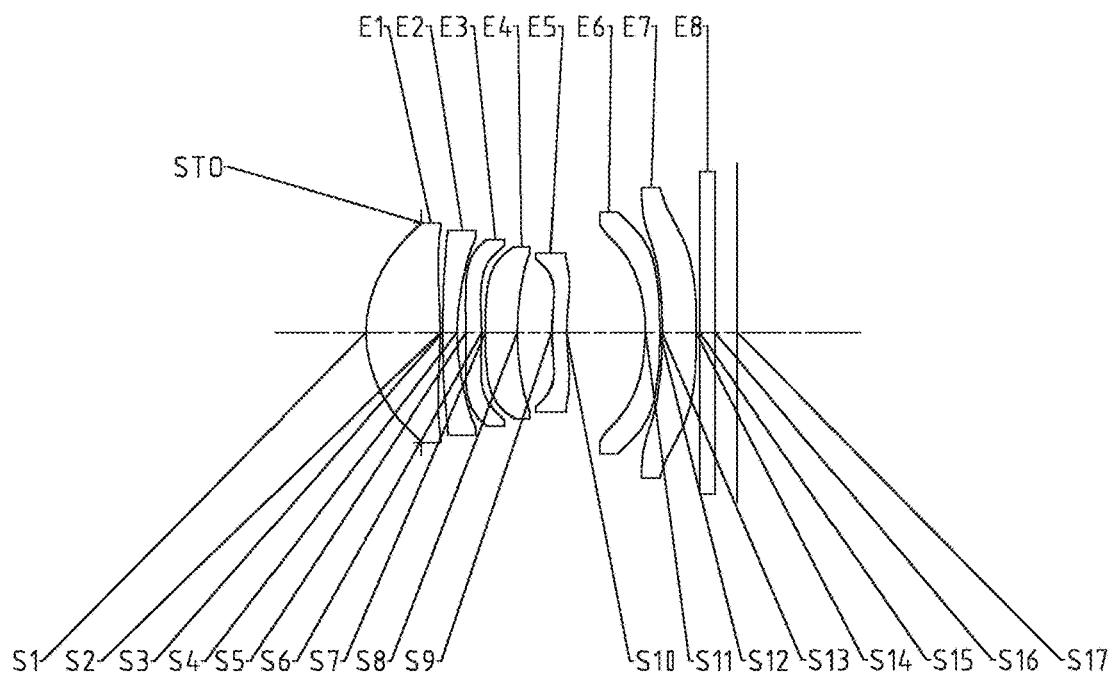
FIG. 19 is a schematic structural view of an optical imaging lens assembly according to embodiment 10 of the present disclosure.

An optical imaging lens assembly according to embodiment 10 of the present disclosure is described below with reference to FIG. 19 to FIG. 20D. FIG. 19 is a schematic structural view of the optical imaging lens assembly according to embodiment 10 of the present disclosure.

As shown in FIG. 19, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has negative refractive power, an object-side surface S7 thereof is a concave surface, and an image-side surface S8 thereof is a concave surface. The fifth lens E5 has negative refractive power, an object-side surface S9 thereof is a convex surface, and an image-side surface S10 thereof is a concave surface. The sixth lens E6 has negative refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 28 shows surface type, radius of curvature, thickness, material and conic coefficient of each lens of the optical imaging lens assembly in embodiment 10, wherein the units for the radius of curvature and the thickness are millimeter (mm).

TABLE 28

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.7659 | | | |
| S1 | aspheric | 1.7434 | 1.0267 | 1.55 | 56.1 | 0.0018 |
| S2 | aspheric | −8.1819 | 0.0300 | | | −35.8308 |
| S3 | aspheric | 8.8047 | 0.2000 | 1.67 | 20.4 | 10.9631 |
| S4 | aspheric | 3.0674 | 0.1246 | | | −1.1033 |
| S5 | aspheric | −5.7163 | 0.2171 | 1.64 | 23.8 | −30.3926 |
| S6 | aspheric | −3.5952 | 0.0530 | | | −38.8451 |
| S7 | aspheric | −500.0000 | 0.4396 | 1.55 | 56.1 | −99.0000 |
| S8 | aspheric | 3.5083 | 0.4705 | | | 3.3998 |
| S9 | aspheric | 2.7948 | 0.2000 | 1.61 | 28.3 | −29.8444 |
| S10 | aspheric | 2.6944 | 1.0919 | | | −59.7009 |
| S11 | aspheric | −2.5514 | 0.2000 | 1.55 | 56.1 | 1.0459 |
| S12 | aspheric | −11.9599 | 0.0300 | | | 45.4166 |
| S13 | aspheric | −115.9647 | 0.4700 | 1.67 | 20.4 | −99.0000 |
| S14 | aspheric | 15.2408 | 0.0521 | | | 53.9162 |
| S15 | spherical | infinite | 0.2100 | 1.52 | 64.2 | |
| S16 | spherical | infinite | 0.3045 | | | |
| S17 | spherical | infinite | | | | |

As can be seen from Table 28, in embodiment 10, the object-side surface and the image-side surface of any one of the first lens E1 to the seventh lens E7 are aspheric. Table 29 below shows high-order coefficients applicable to each aspheric surface in embodiment 10, wherein the surface type of each aspheric surface may be defined by the formula (1) given above in embodiment 1.

TABLE 29

| Surface number | A4 | A6 | A8 | A10 | A12 | A14 | A16 | A18 | A20 |
|---|---|---|---|---|---|---|---|---|---|
| S1 | −5.2400E−03 | −1.6150E−02 | 5.0708E−02 | −1.0450E−01 | 1.2844E−01 | −9.7630E−02 | 4.4314E−02 | −1.0990E−02 | 1.1390E−03 |
| S2 | −8.8700E−02 | 4.7217E−01 | −8.2228E−01 | 8.1952E−01 | −5.2382E−01 | 2.2646E−01 | −6.6810E−02 | 1.2256E−02 | −1.0000E−03 |
| S3 | −1.3608E−01 | 1.5211E−01 | 5.3181E−01 | −1.8731E+00 | 2.6300E+00 | −2.0377E+00 | 9.0624E−01 | −2.1651E−01 | 2.1554E−02 |
| S4 | 7.9614E−02 | −6.0436E−01 | 1.2905E+00 | −1.2531E+00 | 4.4622E−01 | 1.6587E−01 | −2.0316E−01 | 6.6119E−02 | −7.5000E−03 |
| S5 | 4.0721E−01 | −9.1655E−01 | 3.8332E−01 | 3.2183E+00 | −7.7114E+00 | 8.2299E+00 | −4.7257E+00 | 1.4211E+00 | −1.7656E−01 |
| S6 | 4.3714E−01 | −1.0702E+00 | 1.4398E+00 | 1.3065E+00 | −6.5239E+00 | 8.6079E+00 | −5.5739E+00 | 1.8189E+00 | −2.4204E−01 |
| S7 | 3.0901E−01 | −8.7900E−01 | 2.3451E+00 | −3.1540E+00 | 1.8183E+00 | 3.9068E−01 | −1.1510E+00 | 6.0351E−01 | −1.0848E−01 |
| S8 | −8.9630E−02 | 5.1732E−02 | 5.9061E−01 | −2.6449E+00 | 5.8706E+00 | −7.6486E+00 | 5.7983E+00 | −2.3367E+00 | 3.8375E−01 |
| S9 | −7.8390E−02 | −5.4822E−01 | 1.3210E+00 | −2.9117E+00 | 3.8092E+00 | −2.1064E+00 | −1.0406E+00 | 1.9130E+00 | −6.5897E−01 |
| S10 | 1.8148E−01 | −1.2674E+00 | 3.6334E+00 | −8.1167E+00 | 1.2980E+01 | −1.3935E+01 | 9.4683E+00 | −3.6436E+00 | 6.0393E−01 |
| S11 | 1.7817E−01 | −9.9175E−01 | 2.4430E+00 | −3.6637E+00 | 3.5309E+00 | −2.1881E+00 | 8.3380E−01 | −1.7600E−01 | 1.5659E−02 |
| S12 | −5.9980E−02 | −1.8471E−01 | 8.0820E−01 | −1.3641E+00 | 1.2394E+00 | −6.6722E−01 | 2.1382E−01 | −3.7770E−02 | 2.8360E−03 |
| S13 | −3.5739E−01 | 8.1152E−01 | −1.0105E+00 | 7.3083E−01 | −3.3151E−01 | 9.8042E−02 | −1.8660E−02 | 2.0960E−03 | −1.1000E−04 |
| S14 | −3.3782E−01 | 5.3595E−01 | −5.7357E−01 | 3.9589E−01 | −1.8171E−01 | 5.5197E−02 | −1.0610E−02 | 1.1640E−03 | −5.6000E−05 |

Table 30 shows effective focal lengths f1 to f7 of the lenses, a total effective focal length f, a total optical length TTL, half of a diagonal length ImgH of an effective pixel area on the imaging plane S17 and half of a maximal field-of-view angle HFOV of the optical imaging lens assembly in embodiment 10.

TABLE 30

| | |
|---|---|
| f1 (mm) | 2.73 |
| f2 (mm) | −7.16 |
| f3 (mm) | 14.55 |
| f4 (mm) | −6.38 |
| f5 (mm) | −499.99 |
| f6 (mm) | −5.99 |
| f7 (mm) | −20.18 |
| f (mm) | 5.33 |
| TTL (mm) | 5.12 |

TABLE 30-continued

| | |
|---|---|
| ImgH (mm) | 2.35 |
| HFOV (°) | 23.6 |

Figure 20A:
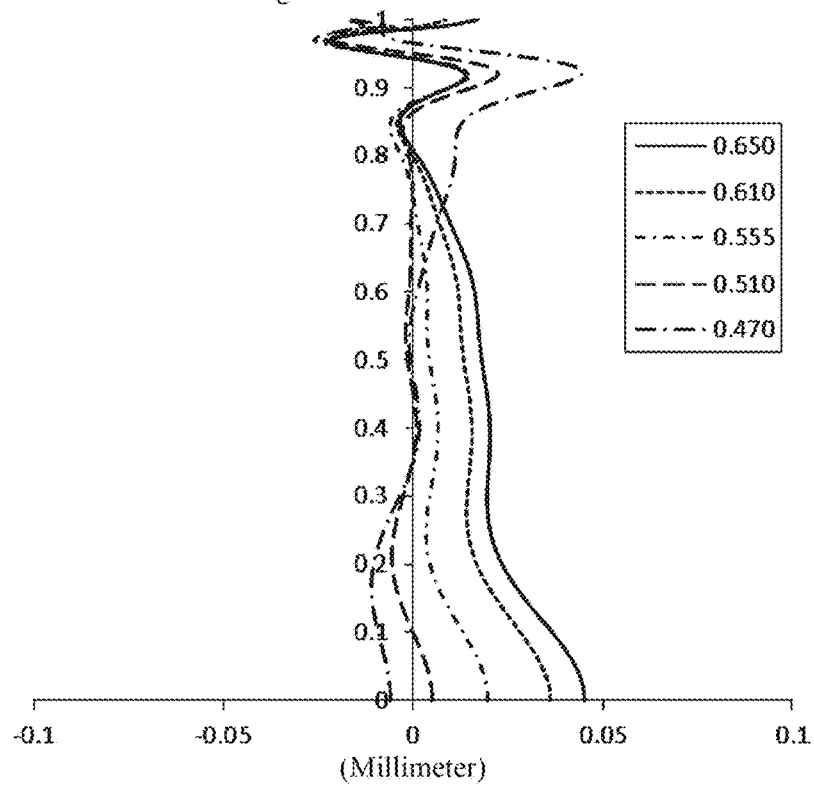
FIGS. 20A-20D illustrate a longitudinal aberration curve, an astigmatic curve, a distortion curve and a lateral color curve of the optical imaging lens assembly according to embodiment 10, respectively.
Figure 20B:
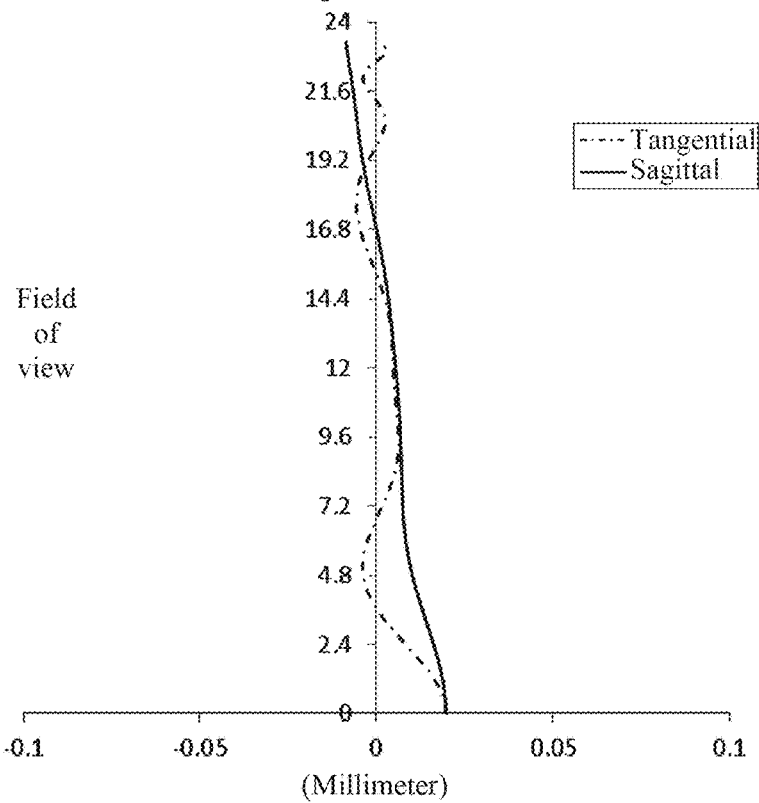
Figure 20C:
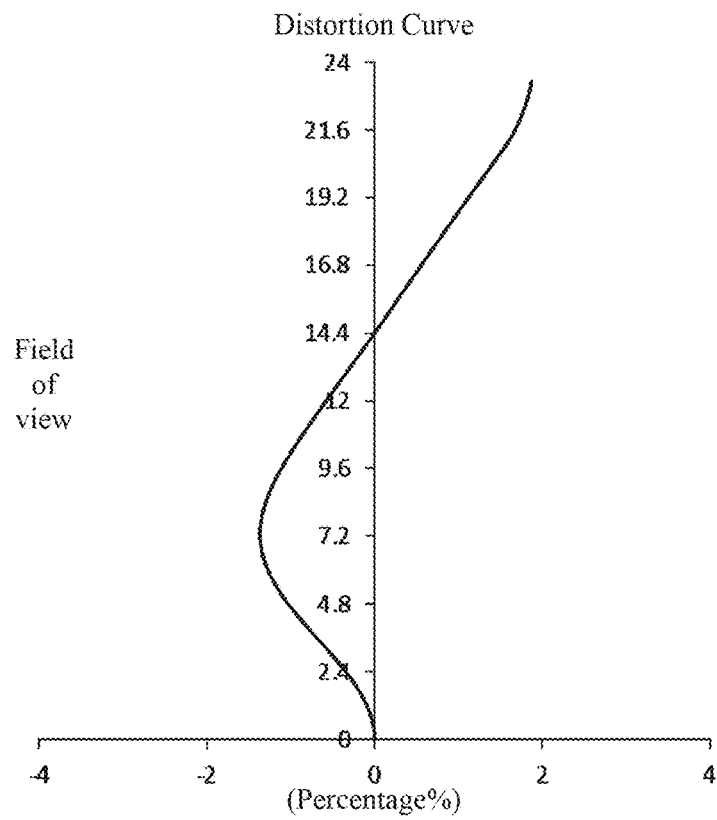
Figure 20D:
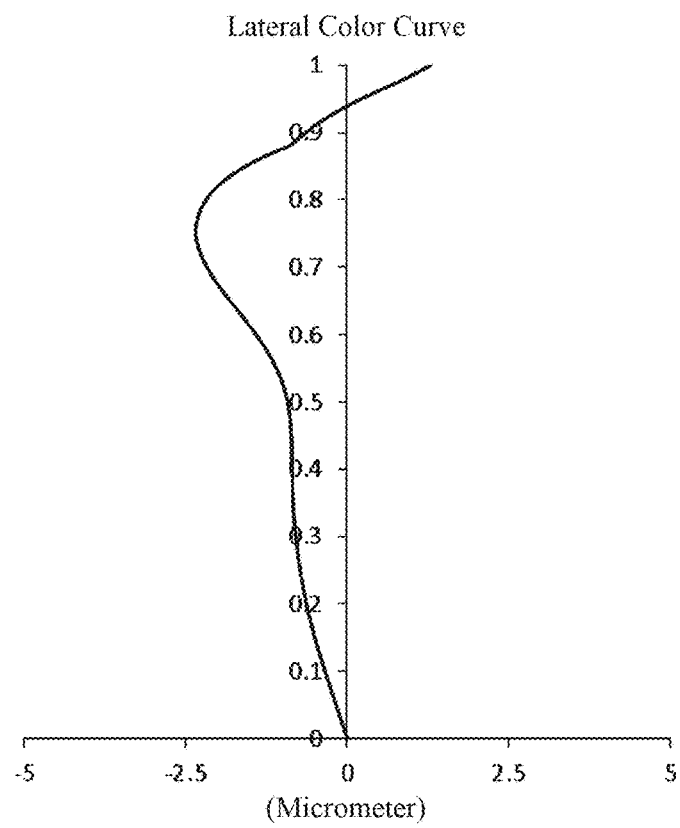

FIG. 20A illustrates a longitudinal aberration curve of the optical imaging lens assembly according to embodiment 10, representing deviations of focal points converged by light of different wavelengths after passing through the optical imaging lens assembly. FIG. 20B illustrates an astigmatic curve of the optical imaging lens assembly according to embodiment 10, representing a curvature of a tangential plane and a curvature of a sagittal plane. FIG. 20C illustrates a distortion curve of the optical imaging lens assembly according to embodiment 10, representing amounts of distortion corresponding to different field-of-view angle. FIG. 20D illustrates a lateral color curve of the optical imaging lens assembly according to embodiment 10, representing deviations of different image heights on an imaging plane after light passes through the optical imaging lens assembly. It can be seen from FIG. 20A to FIG. 20D that the optical imaging lens assembly provided in embodiment 10 can achieve good image quality.

Embodiment 11

Figure 21:
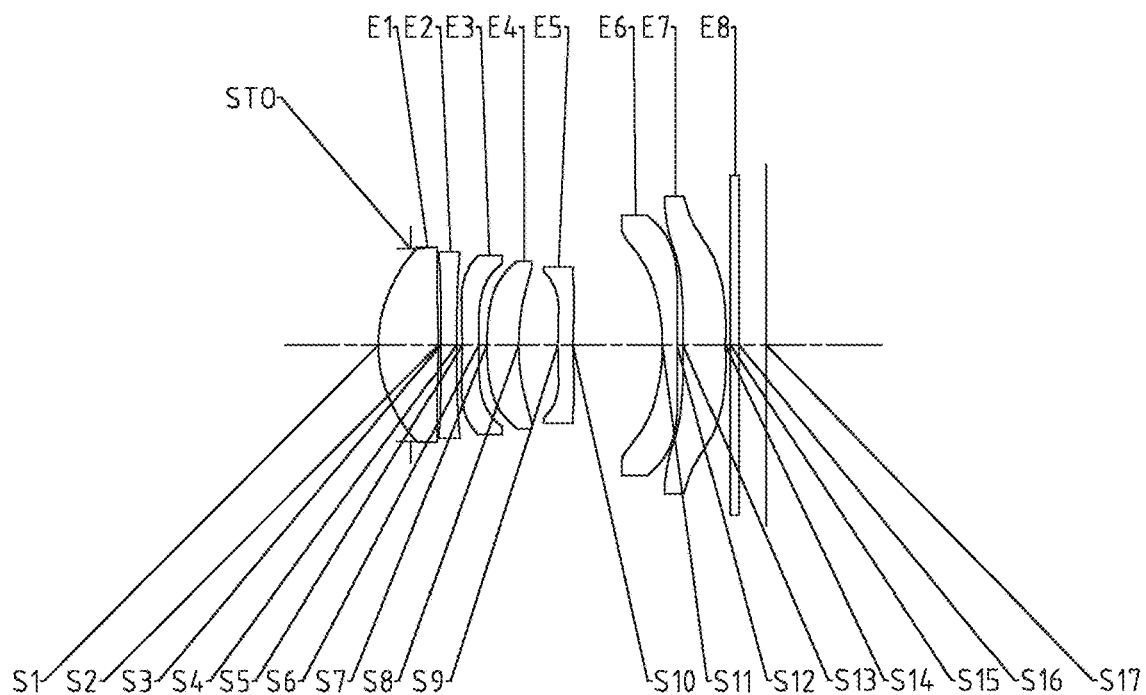
FIG. 21 is a schematic structural view of an optical imaging lens assembly according to Embodiment 11 of the present disclosure.

An optical imaging lens assembly according to embodiment 11 of the present disclosure is described below with reference to FIG. 21 to FIG. 22D. FIG. 21 is a schematic structural view of the optical imaging lens assembly according to embodiment 11 of the present disclosure.

As shown in FIG. 21, the optical imaging lens assembly includes, sequentially from an object side to an image side along an optical axis: a stop STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has negative refractive power, an object-side surface S11 thereof is a concave surface, and an image-side surface S12 thereof is a concave surface. The seventh lens E7 has positive refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 31 shows surface type, radius of curvature, thickness, material and conic coefficient of each lens of the optical imaging lens assembly in embodiment 11, wherein the units for the radius of curvature and the thickness are millimeter (mm).

TABLE 31

| Surface number | Surface type | Radius of curvature | Thickness | Refractive index | Abbe number | Conic coefficient |
|---|---|---|---|---|---|---|
| OBJ | spherical | infinite | infinite | | | |
| STO | spherical | infinite | −0.4408 | | | |
| S1 | aspheric | 1.7756 | 0.8095 | 1.55 | 56.1 | 0.0023 |
| S2 | aspheric | −17.8875 | 0.0389 | | | 99.0000 |
| S3 | aspheric | 100.0000 | 0.2072 | 1.67 | 20.4 | 99.0000 |
| S4 | aspheric | 30.0000 | 0.0768 | | | 99.0000 |
| S5 | aspheric | −4.5759 | 0.2246 | 1.64 | 23.8 | −68.3397 |
| S6 | aspheric | −18.2915 | 0.1082 | | | −99.0000 |
| S7 | aspheric | 3.7977 | 0.4323 | 1.55 | 56.1 | 8.6236 |
| S8 | aspheric | 2.7132 | 0.5340 | | | −1.2772 |
| S9 | aspheric | 4.3494 | 0.2000 | 1.61 | 28.3 | −85.5770 |
| S10 | aspheric | 3.8030 | 1.2169 | | | −22.4276 |
| S11 | aspheric | −2.6911 | 0.2000 | 1.55 | 56.1 | 0.9023 |
| S12 | aspheric | 129.7780 | 0.0827 | | | −99.0000 |
| S13 | aspheric | 15.0576 | 0.5669 | 1.67 | 20.4 | 41.1187 |
| S14 | aspheric | 16.6515 | 0.0665 | | | 63.1513 |
| S15 | spherical | infinite | 0.1200 | 1.52 | 64.2 | |
| S16 | spherical | infinite | 0.3656 | | | |
| S17 | spherical | infinite | | | | |

As can be seen from Table 31, in embodiment 11, the object-side surface and the image-side surface of any one of the first lens E1 to the seventh lens E7 are aspheric. Table 32 below shows high-order coefficients applicable to each aspheric surface in embodiment 11, wherein the surface type of each aspheric surface may be defined by the formula (1) given above in embodiment 1.

TABLE 32

| Surface number | A4 | A6 | A8 | A10 | A12 | A14 | A16 | A18 | A20 |
|---|---|---|---|---|---|---|---|---|---|
| S1 | −2.9326E−03 | −3.7276E−02 | 1.0117E−01 | −1.7852E−01 | 1.8656E−01 | −1.2055E−01 | 4.7375E−02 | −1.0356E−02 | 9.6332E−04 |
| S2 | −1.8376E−01 | 8.5946E−01 | −1.8573E+00 | 2.4213E+00 | −2.0004E+00 | 1.0505E+00 | −3.3884E−01 | 6.1044E−02 | −4.6890E−03 |
| S3 | −2.6681E−01 | 1.1578E+00 | −2.5791E+00 | 3.4622E+00 | −2.9246E+00 | 1.5189E+00 | −4.4815E−01 | 6.1547E−02 | −1.7668E−03 |
| S4 | −4.7876E−02 | 5.3319E−01 | −2.0221E+00 | 4.1311E+00 | −4.9706E+00 | 3.5991E+00 | −1.5327E+00 | 3.5186E−01 | −3.3458E−02 |
| S5 | 2.8631E−01 | −5.1879E−01 | 3.6754E−01 | 8.3817E−01 | −1.9815E+00 | 1.8371E+00 | −9.0327E−01 | 2.3620E−01 | −2.6774E−02 |
| S6 | 4.2228E−01 | −8.7542E−01 | 1.4479E+00 | −2.8996E−01 | −3.1197E+00 | 6.2373E+00 | −5.8448E+00 | 2.8101E+00 | −5.5553E−01 |
| S7 | 1.2999E−01 | −3.3666E−01 | 1.0421E+00 | −1.7466E+00 | 1.8523E+00 | −1.2196E+00 | 4.4151E−01 | −5.9776E−02 | −3.9149E−03 |
| S8 | −7.0412E−02 | 1.8642E−01 | −4.7340E−01 | 1.2488E+00 | −2.4095E+00 | 2.9500E+00 | −2.1367E+00 | 8.0635E−01 | −1.1795E−01 |
| S9 | −1.5321E−01 | −2.4765E−01 | 2.0754E−02 | 1.5384E+00 | −5.6623E+00 | 1.0565E+01 | −1.1190E+01 | 6.3164E+00 | −1.4598E+00 |
| S10 | −1.4340E−01 | −2.4830E−02 | −1.5132E−01 | 1.0748E+00 | −2.7297E+00 | 4.1411E+00 | −3.7444E+00 | 1.8700E+00 | −3.9440E−01 |
| S11 | 1.3574E−01 | −3.5687E−01 | 4.7140E−01 | −4.5513E−01 | 3.5455E−01 | −2.0770E−01 | 7.8063E−02 | −1.5876E−02 | 1.3048E−03 |
| S12 | −8.5670E−02 | 3.5446E−01 | −5.9143E−01 | 4.8121E−01 | −2.1398E−01 | 4.6993E−02 | −1.5154E−03 | −1.2944E−03 | 1.7646E−04 |

TABLE 32-continued

| Surface number | A4 | A6 | A8 | A10 | A12 | A14 | A16 | A18 | A20 |
|---|---|---|---|---|---|---|---|---|---|
| S13 | −3.6360E−01 | 8.2148E−01 | −1.0388E+00 | 7.5573E−01 | −3.4212E−01 | 1.0018E−01 | −1.8714E−02 | 2.0424E−03 | −9.9336E−05 |
| S14 | −3.2267E−01 | 4.8540E−01 | −5.4239E−01 | 4.0397E−01 | −2.0486E−01 | 6.9250E−02 | −1.4646E−02 | 1.7328E−03 | −8.7144E−05 |

Table 33 shows effective focal lengths f1 to f7 of the lenses, a total effective focal length f, a total optical length TTL, half of a diagonal length ImgH of an effective pixel area on the imaging plane S17 and half of a maximal field-of-view angle HFOV of the optical imaging lens assembly in embodiment 11.

TABLE 33

| f1 (mm) | 3.00 |
|---|---|
| f2 (mm) | −64.38 |
| f3 (mm) | −9.59 |
| f4 (mm) | −20.25 |
| f5 (mm) | −57.87 |
| f6 (mm) | −4.83 |
| f7 (mm) | 206.65 |
| f (mm) | 5.61 |
| TTL (mm) | 5.25 |
| ImgH (mm) | 2.45 |
| HFOV (°) | 23.5 |

Figure 22A:
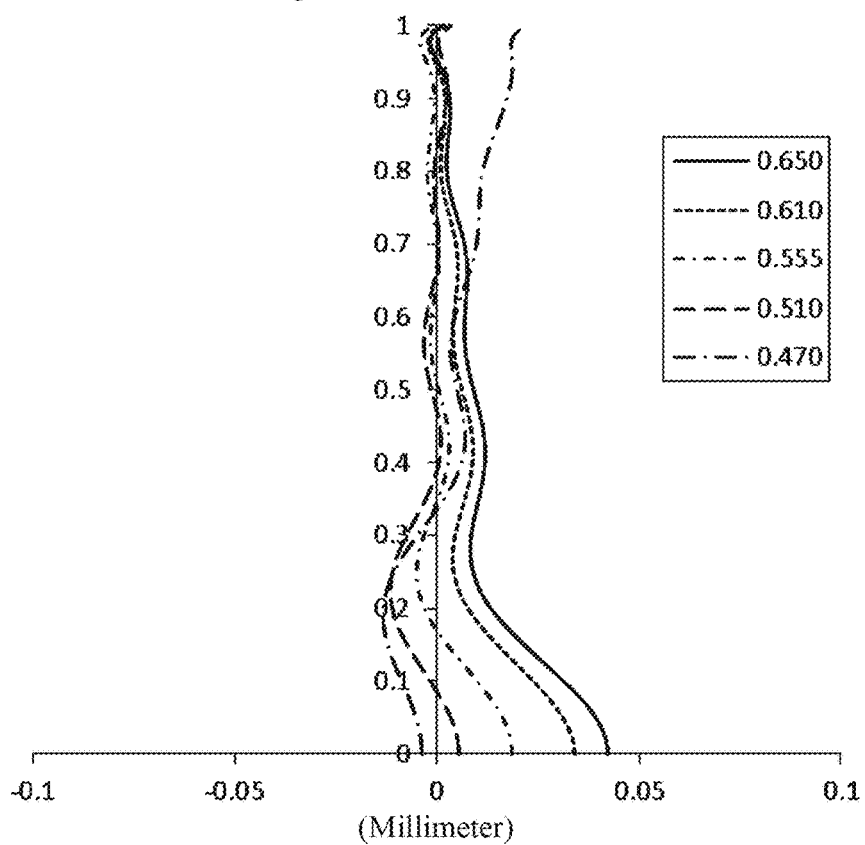
FIGS. 22A, 22B, 22C and 22D illustrate a longitudinal aberration curve, an astigmatic curve, a distortion curve and a lateral color curve, respectively, of the optical imaging lens assennblyaccording to Embodiment 11.
Figure 22B:
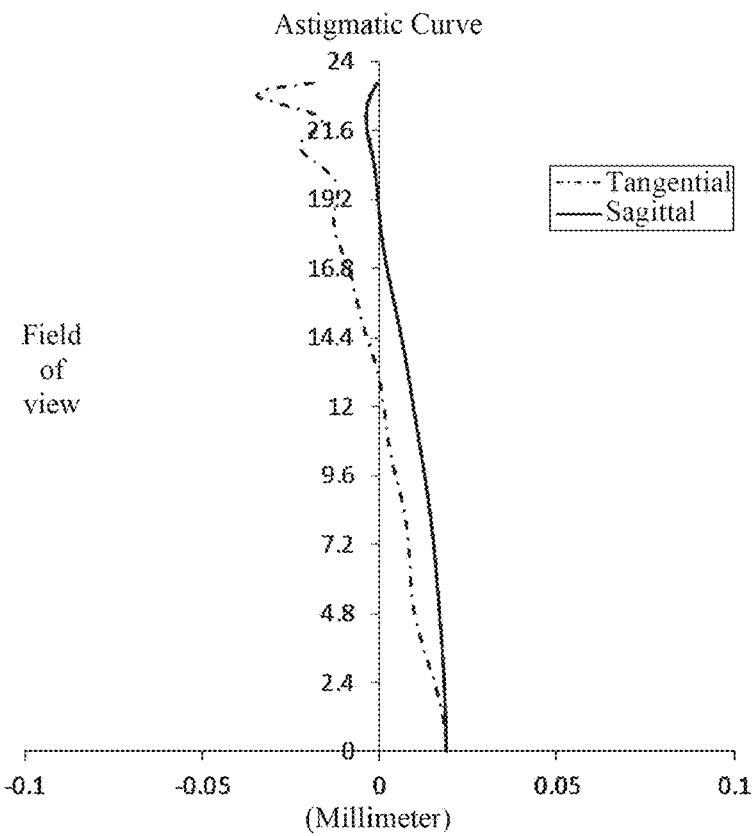
Figure 22C:
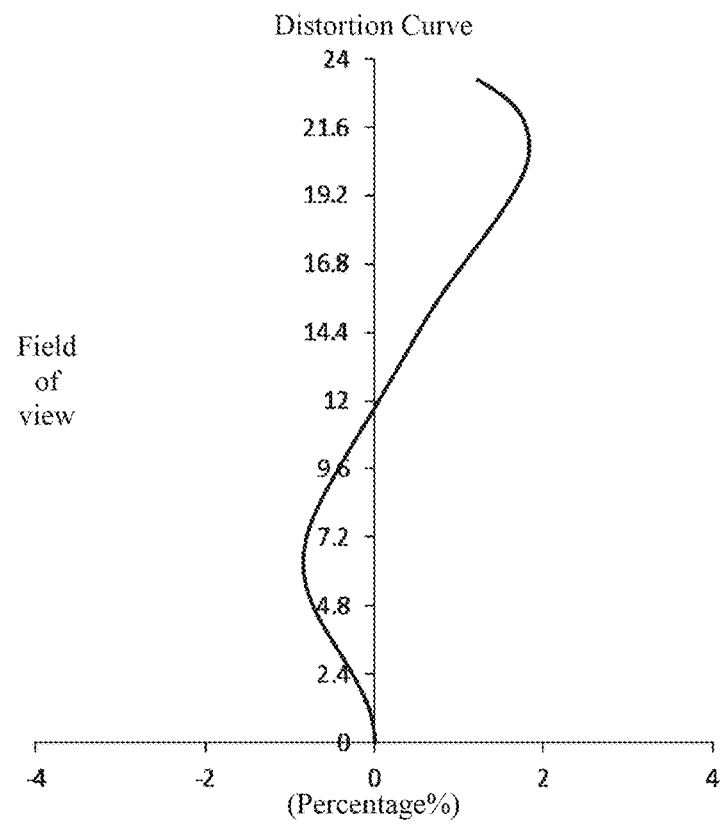
Figure 22D:
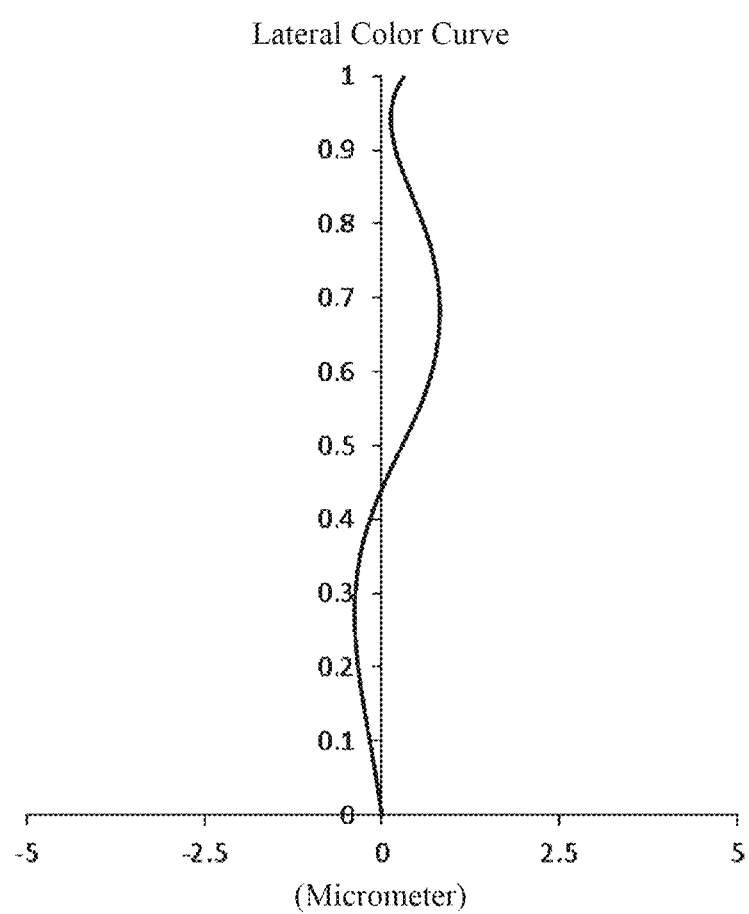

FIG. 22A illustrates a longitudinal aberration curve of the optical imaging lens assembly according to embodiment 11, representing deviations of focal points converged by light of different wavelengths after passing through the optical imaging lens assembly. FIG. 22B illustrates an astigmatic curve of the optical imaging lens assembly according to embodiment 11, representing a curvature of a tangential plane and a curvature of a sagittal plane. FIG. 22C illustrates a distortion curve of the optical imaging lens assembly according to embodiment 11, representing amounts of distortion corresponding to different field-of-view angle. FIG. 22D illustrates a lateral color curve of the optical imaging lens assembly according to embodiment 11, representing deviations of different image heights on an imaging plane after light passes through the optical imaging lens assembly. It can be seen from FIG. 22A to FIG. 22D that the optical imaging lens assembly provided in embodiment 11 can achieve good image quality.

In view of the above, embodiments 1 to 11 respectively satisfy the relationship shown in Table 34.

TABLE 34

| Conditional | embodiment | | | | | | | | | | |
|---|---|---|---|---|---|---|---|---|---|---|---|
| | 1 | 2 | 3 | 4 | 5 | 6 | 7 | 8 | 9 | 10 | 11 |
| TTL/f | 0.94 | 0.92 | 0.91 | 0.93 | 0.87 | 0.90 | 0.88 | 0.89 | 0.95 | 0.96 | 0.94 |
| f/EPD | 1.89 | 1.88 | 1.87 | 1.87 | 1.85 | 1.78 | 1.81 | 1.76 | 1.83 | 1.75 | 2.15 |
| (T56 + CT6)/(T45 + CT5) | 1.59 | 1.50 | 1.67 | 1.36 | 1.53 | 1.47 | 1.50 | 1.52 | 1.71 | 1.93 | 1.93 |
| DT71/DT51 | 2.01 | 1.90 | 1.88 | 1.97 | 1.97 | 1.85 | 1.96 | 1.93 | 1.86 | 1.84 | 1.93 |
| SAG41/CT4 | 0.91 | 0.97 | 1.12 | 0.95 | 1.07 | 1.02 | 1.09 | 1.11 | 0.98 | 0.93 | 0.95 |
| f1234/|f67| | 1.26 | 0.91 | 1.16 | 1.49 | 1.29 | 1.37 | 1.12 | 1.10 | 0.98 | 1.01 | 0.93 |
| f/(R1 + R4) | 1.29 | 1.22 | 1.21 | 1.20 | 1.30 | 1.45 | 1.48 | 1.42 | 1.27 | 1.11 | 0.18 |
| f1/f + |f/f2| | 1.32 | 1.18 | 1.12 | 1.23 | 1.09 | 1.49 | 1.45 | 1.39 | 1.32 | 1.26 | 0.62 |
| CT2/T23 | 1.17 | 1.45 | 1.32 | 1.37 | 1.41 | 1.42 | 1.51 | 1.31 | 1.20 | 1.61 | 2.70 |
| (CT1 + CT2)/(CT3 + CT7) | 1.37 | 1.55 | 1.46 | 1.56 | 1.56 | 1.38 | 1.56 | 1.65 | 1.60 | 1.79 | 1.28 |
| R8/R11 | −1.51 | −1.27 | −1.57 | −1.66 | −1.65 | −1.80 | −1.54 | −1.37 | −0.90 | −1.38 | −1.01 |
| |(R2 + R3)/(R2 − R3)| | 0.45 | 0.19 | 0.16 | 0.56 | 0.31 | 0.35 | 0.34 | 0.30 | 0.24 | 0.04 | 0.70 |
| SAG11/SAG72 | −1.11 | −1.35 | −1.27 | −1.06 | −1.01 | −1.05 | −1.19 | −1.27 | −1.39 | −1.53 | −0.94 |

The present disclosure further provides an imaging apparatus, having an electronic photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising a first lens, a second lens, a third lens, a fourth lens, a fifth lens, a sixth lens and a seventh lens, which are sequentially arranged from an object side to an image side along an optical axis and each of which has refractive power,
wherein,
the first lens has positive refractive power, and both an object-side surface and an image-side surface of the first lens are convex surfaces;
the second lens has negative refractive power, and an object-side surface of the second lens is a convex surface; and an image-side surface of the fourth lens is a concave surface;

wherein TTL/f<1, where TTL is a distance along the optical axis from the object-side surface of the first lens to an imaging plane of the optical imaging lens assembly, and f is a total effective focal length of the optical imaging lens assembly; and wherein 0.8<SAG41/CT4<1.3, where SAG41 is a distance along the optical axis from an intersection of an object-side surface of the fourth lens and the optical axis to a vertex of a maximum effective radius of the object-side surface of the fourth lens, and CT4 is a center thickness along the optical axis of the fourth lens.

2. The optical imaging lens assembly according to claim 1, wherein 1.3<(T56+CT6)/(T45+CT5)<2, where CT5 is a center thickness along the optical axis of the fifth lens, CT6 is a center thickness along the optical axis of the sixth lens, T45 is a spaced interval along the optical axis between the fourth lens and the fifth lens, and T56 is a spaced interval along the optical axis between the fifth lens and the sixth lens.

3. The optical imaging lens assembly according to claim 1, wherein 1.7<DT71/DT51<2.2, where DT51 is a maximum effective radius of an object-side surface of the fifth lens, and DT71 is a maximum effective radius of an object-side surface of the seventh lens.

4. The optical imaging lens assembly according to claim 1, wherein −1.8<R8/R11≤−0.9, where R8 is a radius of curvature of the image-side surface of the fourth lens, and R11 is a radius of curvature of an object-side surface of the sixth lens.

5. The optical imaging lens assembly according to claim 1, wherein 0.1<f/(R1+R4)≤1.5, where f is the total effective focal length of the optical imaging lens assembly, R1 is a radius of curvature of the object-side surface of the first lens, and R4 is a radius of curvature of an image-side surface of the second lens.

6. The optical imaging lens assembly according to claim 1, wherein |(R2+R3)/(R2−R3)|<0.7, where R2 is a radius of curvature of the image-side surface of the first lens, and R3 is a radius of curvature of the object-side surface of the second lens.

7. The optical imaging lens assembly according to claim 1, wherein −1.6<SAG11/SAG72<−0.9, where SAG11 is a distance along the optical axis from an intersection of the object-side surface of the first lens and the optical axis to a vertex of an effective radius of the object-side surface of the first lens, and SAG72 is a distance along the optical axis from an intersection of an image-side surface of the seventh lens and the optical axis to a vertex of an effective radius of the image-side surface of the seventh lens.

8. The optical imaging lens assembly according to claim 1, wherein 0.5<f1/f+|f/f2|<1.5, where f is the total effective focal length of the optical imaging lens assembly, f1 is an effective focal length of the first lens, and f2 is an effective focal length of the second lens.

9. The optical imaging lens assembly according to claim 1, wherein 0.7<f123/|f67|<1.7, where f1234 is a combined focal length of the first lens, the second lens, the third lens and the fourth lens, and f67 is a combined focal length of the sixth lens and the seventh lens.

10. The optical imaging lens assembly according to claim 1, wherein 1.1<CT2/T23<2.8, where CT2 is a center thickness along the optical axis of the second lens, and T23 is a spaced interval along the optical axis between the second lens and the third lens.

11. The optical imaging lens assembly according to claim 1, wherein 1.2<(CT1+CT2)/(CT3+CT7)<1.8, where CT1 is a center thickness along the optical axis of the first lens, CT2 is a center thickness along the optical axis of the second lens, CT3 is a center thickness along the optical axis of the third lens, and CT7 is a center thickness along the optical axis of the seventh lens.

12. The optical imaging lens assembly according to claim 1, wherein f/EPD<2.2, where f is the total effective focal length of the optical imaging lens assembly, and EPD is an entrance pupil diameter of the optical imaging lens assembly.

13. An optical imaging lens assembly, comprising a first lens, a second lens, a third lens, a fourth lens, a fifth lens, a sixth lens and a seventh lens, which are sequentially arranged from an object side to an image side along an optical axis and each of which has refractive power, wherein, the first lens has positive refractive power, an object-side surface of the first lens is a convex surface, and an image-side surface of the first lens is a convex surface;

the second lens has negative refractive power, and an object-side surface of the second lens is a convex surface; and an image-side surface of the fourth lens is a concave surface;

wherein 0.7<f123/|f67|<1.7, where f1234 is a combined focal length of the first lens, the second lens, the third lens and the fourth lens, and f67 is a combined focal length of the sixth lens and the seventh lens;

wherein 0.8<SAG41/CT4<1.3, where SAG41 is a distance along the optical axis from an intersection of an object-side surface of the fourth lens and the optical axis to a vertex of a maximum effective radius of the object-side surface of the fourth lens, and CT4 is a center thickness along the optical axis of the fourth lens.

14. The optical imaging lens assembly according to claim 13, wherein 0.5<f1/f+|f/f2|<1.5, where f is the total effective focal length of the optical imaging lens assembly, f1 is an effective focal length of the first lens, and f2 is an effective focal length of the second lens.

15. The optical imaging lens assembly according to claim 13, wherein f/EPD<2.2, where f is a total effective focal length of the optical imaging lens assembly, and EPD is an entrance pupil diameter of the optical imaging lens assembly.

16. The optical imaging lens assembly according to claim 13, wherein 1.3<(T56+CT6)/(T45+CT5)<2, where CT5 is a center thickness along the optical axis of the fifth lens, CT6 is a center thickness along the optical axis of the sixth lens, T45 is a spaced interval along the optical axis between the fourth lens and the fifth lens, and T56 is a spaced interval along the optical axis between the fifth lens and the sixth lens.

17. The optical imaging lens assembly according to claim 13, wherein 1.2<(CT1+CT2)/(CT3+CT7)<1.8, where CT1 is a center thickness along the optical axis of the first lens, CT2 is a center thickness along the optical axis of the second lens, CT3 is a center thickness along the optical axis of the third lens, and CT7 is a center thickness along the optical axis of the seventh lens.

18. The optical imaging lens assembly according to claim 13, wherein $-1.6 < SAG11/SAG72 < -0.9$,
where SAG11 is a distance along the optical axis from an intersection of the object-side surface of the first lens and the optical axis to a vertex of an effective radius of the object-side surface of the first lens, and SAG72 is a distance along the optical axis from an intersection of an image-side surface of the seventh lens and the optical axis to a vertex of an effective radius of the image-side surface of the seventh lens.

* * * * *